(12) United States Patent
Kaihara et al.

(10) Patent No.: US 6,529,688 B2
(45) Date of Patent: Mar. 4, 2003

(54) DRIVING DEVICE AND APPARATUS HAVING THE SAME, AND CAMERA

(75) Inventors: Shoji Kaihara, Kanagawa (JP); Shigeru Yamagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,381

(22) Filed: Jul. 31, 2001

(65) Prior Publication Data

US 2002/0071673 A1 Jun. 13, 2002

(30) Foreign Application Priority Data

| Jul. 31, 2000 | (JP) | 2000-232472 |
| Jul. 31, 2000 | (JP) | 2000-232473 |
| Jul. 31, 2000 | (JP) | 2000-232474 |
| Jul. 31, 2000 | (JP) | 2000-232475 |

(51) Int. Cl.$^7$ .................................................. G03B 3/10
(52) U.S. Cl. ....................... 396/132; 396/358; 396/418
(58) Field of Search ................ 396/358, 387, 396/401, 402, 411, 418, 132

(56) References Cited

U.S. PATENT DOCUMENTS 5,168,295 A * 12/1992 Yoshihara et al. .......... 396/406
6,167,198 A * 12/2000 Ichino et al. ............... 396/132
6,377,754 B1 * 4/2002 Sugita et al. ............... 396/132

* cited by examiner

*Primary Examiner*—David M. Gray
(74) *Attorney, Agent, or Firm*—Robin, Blecker & Daley

(57) ABSTRACT

There is provided a camera which is compact in size and inexpensive even with the use of two motors, which allows relevant mechanisms to be laid out freely to thereby simplify motor controlling sequences, and which allows the user to quickly perform preliminary winding of a newly loaded film after film rewinding to thereby minimize the effects of film replacement during photographing. A first motor is used to drive a film winding driving system and a film rewinding driving system. A switching mechanism selectively switches between a winding state in which a driving force of the first motor can be transmitted to the film winding driving system, and a rewinding state in which the driving force of the first motor can be transmitted to the film rewinding driving system. A second motor is used to drive the switching mechanism for selective switching between the winding state and the rewinding state. A microcomputer CPU causes the switching mechanism to select the winding state after causing the switching mechanism to select the rewinding state to thereby carry out rewinding of a film, and thereafter terminates control of winding of the film.

76 Claims, 26 Drawing Sheets

DRIVING DEVICE AND APPARATUS HAVING THE SAME, AND CAMERA

BACKGROUND OF THE INVENTION

1. Field of the Invention

The present invention relates to a driving device for driving a plurality of driving systems using a plurality of motors as a driving source, an apparatus having the driving device, and a camera.

2. Description of the Related Art

Some single-lens reflex cameras use motors as a driving source to drive a mirror driving system, a shutter charge driving system, a film winding or rewinding driving system, an electronic flash pop-up or -down driving system, and the like.

For example, a camera proposed in Japanese Laid-Open Patent Publication (Kokai) No. 3-75626 incorporates two motors disposed such that the first motor is rotated in one direction to wind a film and in the other direction to drive a mirror and a shutter, whereas the second motor is rotated in one direction to rewind the film and in the other direction to drive an electronic flash.

Further, various cameras have been proposed which use one motor as a driving source to feed the film, charge the shutter, drive the mirror, and so on.

For example, a camera proposed in Japanese Laid-Open Patent Publication (Kokai) No. 1-202731 employs a preliminary winding system wherein the camera main body incorporates one motor disposed such that when a user opens a rear cover, charges a film cartridge into the camera, and then closes the rear cover, a full-amount winding spool winds a film in the film cartridge to set the camera in a photographing standby state. Thereafter, in photographing, this motor is used to rewind the film, charge the shutter, and drive the mirror through switching of a planetary clutch.

In this camera, when the motor is rotated in one direction, the planetary clutch is connected to a first transmission system on a film winding side, and as the motor continues to rotate in the same direction, the film is wound. Once the winding operation is completed, the motor is rotated in the other direction to connect the planetary clutch to a second transmission system. When the motor is rotated in the other direction with the planetary clutch connected to the second transmission system, a series of photographing operations including film rewinding, mirror popping-up and -down, and shutter charging are performed while a rotary cam member makes a turn.

Further, a motor driving device proposed in Japanese Laid-Open Patent Publication (Kokai) No. 1-287648 drives a plurality of planetary clutch mechanisms using one motor. The motor is rotated in one direction to cause a first planetary clutch to perform a switching operation to select a driving system to which power is transmitted when the motor rotates in the other direction. Once the driving system is selected in this manner, the motor is rotated in the other direction to transmit motor power to the selected driving system.

Moreover, a camera proposed in Japanese Laid-Open Patent Publication (Kokai) No. 8-328094 drives a plurality of planetary clutch mechanisms using one motor. The motor is rotated in one and the other directions to perform a series of photographing operations including mirror driving, shutter charge driving, and film winding, followed by performing a phase indexing operation for an electronic flash popping-up operation to be performed as a photographing preparing operation.

Further, a camera proposed in Japanese Laid-Open Patent Publication (Kokai) No. 7-270877 uses a motor that drives a taking lens barrel to distribute power to other motors.

Moreover, a camera proposed in Japanese Laid-Open Patent Publication (Kokai) No. 61-269129 includes a film winding mechanism having two types of gear ratios for high-speed winding and low-speed winding, which are switched depending on load, power supply, or the like or to switch from the low-speed winding to the high-speed-winding for preliminary winding.

However, in the camera proposed in Japanese Laid-Open Patent Publication (Kokai) No. 3-75626, the two motors each carry our the film driving, mirror driving, and shutter charge driving, but since these driving systems undergo relatively heavy driving loads, large-sized motors of high power are employed for these motors if a camera having a high continuous photographing speed is to be provided. Thus, the camera will be expensive and large in size.

Further, the camera proposed in Japanese Laid-Open Patent Publication (Kokai) No. 2-202731 uses only one motor, thus making it possible to reduce its own size. The use of the preliminary film winding system, however, requires a rear cover interlocking mechanism and the like, thereby hindering the entire system or layout from being designed freely.

Moreover, the motor driving device proposed in Japanese Laid-Open Patent Publication (Kokai) No. 1-287648 also uses only one motor, but it requires as many planetary clutches as the number of the driving systems to which power is transmitted, thus requiring a large-sized mechanism. Further, since one operation is completed by a set of rotations of the motor in one and the other directions, a complicated sequence is required for a series of plural operations. If this motor driving device is applied to a camera, the continuous photographing speed will be low.

Furthermore, the camera proposed in Japanese Laid-Open Patent Publication (Kokai) No. 8-328094 uses only one motor, but the cam member for causing the series of photographing operations including mirror driving and shutter charge driving to be performed during one rotation thereof is provided with phases for phase indexing that allow the electronic flash to pop up after photographing operation has been completed. Consequently, this camera is not optimal for increasing the continuous photographing speed.

Further, the camera proposed in Japanese Laid-Open Patent Publication (Kokai) No. 7-270877 determines driving force transmitting paths for the motors other than the one for driving the lens barrel, based on a position in which the lens barrel is stopped, thereby hindering the driving force transmitting paths used from being selected freely.

With respect to the film winding operation, which significantly affects the speed of the continuous photographing operation, the load required for film winding varies with the type of the commercially available film. Further, at low temperature, the film winding load increases, so that the gear ratio of the film winding mechanism must be set to such a gear ratio as can deal with a high load of about 800 g. Consequently, the film winding speed necessarily decreases in normal photographing.

Furthermore, in all the above conventional constructions, the gear ratio of the film winding mechanism is set to a single gear ratio, thus limiting an increase in the continuous photographing speed.

To cope with this problem, the camera proposed in Japanese Laid-open Patent Publication (Kokai) No.

61-269129 is provided with a winding mechanism having two gear ratios for high and low speeds. However, it requires an exclusive motor for winding the film. Further, other relatively large-sized motors are required for driving mechanisms for mirror driving, shutter charging, film rewinding, and others which deal with relatively heavy loads. Thus, the camera has to be large in size.

SUMMARY OF THE INVENTION

It is a first object of the present invention to provide a driving device and a camera which are compact in size and inexpensive even with the use of two motors, which allow relevant mechanisms to be laid out freely to thereby simplify motor controlling sequences, and which allow the user to quickly perform preliminary winding of a newly loaded film after film rewinding to thereby minimize the effects of film replacement during photographing, as well as an apparatus having the driving device.

It is a second object of the present invention to provide a driving device and a camera which are capable of performing optimal and efficient driving according to driving loads or the like, that is, allow the user to select an optimal driving speed, as well as an apparatus having the driving device.

To attain the above objects, a first aspect of the present invention provides a camera comprising a film winding driving system, a film rewinding driving system, a first motor for driving the film winding driving system and the film rewinding driving system, a switching mechanism for selectively switching between a winding state in which a driving force of the first motor can be transmitted to the film winding driving system, and a rewinding state in which the driving force of the first motor can be transmitted to the film rewinding driving system, a second motor for driving the switching mechanism for selective switching between the winding state and the rewinding state, and control means for causing the switching mechanism to select the winding state after a film is rewound with the rewinding state selected by the switching mechanism, and thereafter terminating control of winding of the film.

To attain the above objects, a second aspect of the present invention provides a camera comprising a film winding driving system, a film rewinding driving system, a first motor for driving the film winding driving system and the film rewinding driving system, a switching mechanism for selectively switching between a first state in which a driving force of the first motor can be transmitted to the film winding driving system with a first reduction ratio, a second state in which the driving force of the first motor can be transmitted to the film winding driving system with a second reduction ratio greater than the first reduction ratio, and a third state in which the driving force of the first motor can be transmitted to the film rewinding driving system, a second motor for driving the switching mechanism for selective switching between the first, second and third states, and control means for causing the switching mechanism to select the second state after causing the switching mechanism to select the third state to carry out rewinding of a film, and thereafter terminating control of winding of the film.

With the arrangements according to the first and second aspects of the present invention, after the film has been rewound with the rewinding state selected by the switching mechanism, the second motor drives the switching mechanism to select a winding state (second state), and the film rewinding control is then terminated. Accordingly, the switching mechanism already selects the film winding state where the film can be wound, before the rewound film is taken out and a new film is then loaded, thereby making it possible to perform the preliminary film winding immediately after the new film has been loaded. As a result, the period of time during which the photographing is interrupted due to film replacement can be reduced.

Furthermore, the driving of the switching mechanism requires a relatively small driving load, so that the second motor can be a motor having a lower output (and a smaller size) than the first motor as a film feeding driving source. As a result, the camera can be made compact in size.

In a preferred embodiment of the present invention, there is provided a camera comprising first and second motors, first and second planetary mechanisms for transmitting a driving force of the first motor, a mirror disposed to advance into and recede from a photographic optical path, a shutter, a mirror and shutter driving system disposed to have the driving force of the first motor transmitted thereto via the first planetary mechanism, for driving the mirror for enabling finder observation when the mirror advances into the photographic optical path, and for driving charging of the shutter, a first film winding driving system disposed to be connected to the first planetary mechanism to have the driving force of the first motor transmitted thereto via the first planetary mechanism with a first reduction ratio to be driven thereby when the first motor rotates in a second direction, a film rewinding driving system disposed such that the driving system of the first motor is transmitted thereto via the second planetary mechanism when the first motor rotates in the first direction, a second film winding driving system disposed to be connected to the second planetary mechanism to have the driving force of the first motor transmitted thereto via the second planetary mechanism with a second reduction ratio greater than the first reduction ratio to be driven thereby when the first motor rotates in the second direction, a switching mechanism disposed to be driven by a driving force of the second motor, for selectively switching between a first state in which the driving force of the first motor can be transmitted to the first film winding driving system, a second state in which the driving force of the first motor can be transmitted to the second film winding driving system, and a third state in which the driving force of the first motor can be transmitted to the film rewinding driving system, and control means for causing the switching mechanism to select the second state after causing the switching mechanism to select the third state to carry out rewinding of a film, and thereafter terminating control of winding of the film.

With this arrangement, the film can be preliminarily wound immediately after a new film has been loaded, thus reducing the period of time during which the photographing operation is interrupted due to film replacement. If the new film is not loaded, the mirror driving and the shutter charge driving can be executed without performing the film winding operation.

Further, the first motor drives all the driving systems that cause execution of the photographing and film feeding operations for the camera, which require relatively high driving loads, and the second motor drives the switching mechanism which requires a relatively light driving load. As a result, a large number of driving systems can be driven, and the second motor can be selected to have a lower output (and a smaller size) than the first motor, thus reducing the size of the camera.

To attain the above objects, a third aspect of the present invention provides a camera comprising a film winding driving system, a film rewinding driving system, a first motor for driving the film winding driving system and the film rewinding driving system, a switching mechanism for selectively switching between a winding state in which a driving force of the first motor can be transmitted to the film winding driving system, and a rewinding state in which the driving force of the first motor can be transmitted to the film rewinding driving system, a second motor for driving the switching mechanism for selective switching between the winding state and the rewinding state, a film loading chamber, a cover member for closing and opening the film loading chamber, and control means for detecting closure of the cover member and for causing the switching mechanism to select the winding state upon detection of closure of the cover member.

To attain the above object a fourth aspect of the present invention provides a camera comprising a film winding driving system, a film rewinding driving system, a first motor for driving the film winding driving system and the film rewinding driving system, a switching mechanism for selectively switching between a first state in which a driving force of the first motor can be transmitted to the film winding driving system with a first reduction ratio, a second state in which the driving force of the first motor can be transmitted to the film winding driving system with a second reduction ratio greater than the first reduction ratio, and a third state in which the driving force of the first motor can be transmitted to the film rewinding driving system, a second motor for driving the switching mechanism for selective switching between the first, second and third states, a film loading chamber, a cover member for closing and opening the film loading chamber, and control means for detecting closure of the cover member and for causing the switching mechanism to select the second state upon detection of closure of the cover member.

With the arrangements according to the third and fourth aspects of the present invention, when the closure of the cover member for opening and closing the film loading chamber is detected, the second motor drives the switching mechanism to select the winding state (second state). Thus, when the user takes out the rewound film, loads a new film, and then closes the cover member, the switching mechanism automatically sets the state where the film can be wound. Consequently, the film can be preliminarily wound immediately after the new film has been loaded, thus reducing the period of time during which the photographing operation is interrupted due to film replacement.

Further, even if the user opens the cover member and takes out the film without rewinding, when the user loads a new film and closes the cover member, the switching mechanism automatically sets the state where the film can be wound. Accordingly, after the new film has been loaded, it can be immediately wound preliminarily.

Furthermore, the driving of the switching mechanism requires a relatively light driving load, so that the second motor can be selected to have a lower output (and a smaller size) than the first motor as a film feeding driving source.

In a preferred embodiment of the present invention, there is provided a camera comprising first and second motors, first and second planetary mechanisms for transmitting a driving force of the first motor, a mirror disposed to advance into and recede from a photographic optical path, a shutter, a mirror and shutter driving system disposed to have the driving force of the first motor transmitted thereto via the first planetary mechanism, for driving the mirror for enabling finder observation when the mirror advances into the photographic optical path, and for driving charging of the shutter, a first film winding driving system disposed to be connected to the first planetary mechanism to have the driving force of the first motor transmitted thereto via the first planetary mechanism with a first reduction ratio to be driven thereby when the first motor rotates in a second direction, a film rewinding driving system disposed such that the driving system of the first motor is transmitted thereto via the second planetary mechanism when the first motor rotates in the first direction, a second film winding driving system disposed to be connected to the second planetary mechanism to have the driving force of the first motor transmitted thereto via the second planetary mechanism with a second reduction ratio greater than the first reduction ratio to be driven thereby when the first motor rotates in the second direction, a switching mechanism disposed to be driven by a driving force of the second motor, for selectively switching between a first state in which the driving force of the first motor can be transmitted to the first film winding driving system, a second state in which the driving force of the first motor can be transmitted to the second film winding driving system, and a third state in which the driving force of the first motor can be transmitted to the film rewinding driving system, a film loading chamber, a cover member for closing and opening the film loading chamber, and control means for detecting closure of the cover member and for causing the switching mechanism to select the second state upon detection of closure of the cover member.

With this arrangement, if the user takes out the rewound film, loads a new film, and then closes the cover member, the switching mechanism is automatically set so as to wind the film, thus enabling the film to be preliminarily wound immediately after the new film has been loaded. If the new film is not loaded, the mirror driving and shutter charge driving can be executed without performing the film winding operation.

Further, even if the user opens the cover member and takes out the film without rewinding, when the user loads a new film and closes the cover member, the switching mechanism automatically sets the state where the film can be wound. Accordingly, after the new film has been loaded, it can be immediately wound preliminarily.

Furthermore, the first motor drives all the driving systems that cause execution of the photographing and film feeding operations for the camera, which require relatively high driving loads, and the second motor drives the switching mechanism which requires a relatively light driving load. Accordingly, the large number of driving systems can be driven, and the second motor can be selected to have a lower output (and a smaller size) than the first motor, thus reducing the size of the camera.

To attain the above objects, a fifth aspect of the present invention provides a camera comprising a film winding driving system, a film rewinding driving system, a first motor for driving the film winding driving system and the film rewinding driving system, a switching mechanism for selectively switching between a first state in which a driving force of the first motor can be transmitted to the film winding driving system with a first reduction ratio, a second state in which the driving force of the first motor can be transmitted to the film winding driving system with a second reduction ratio greater than the first reduction ratio, and a third state in which the driving force of the first motor can be transmitted to the film rewinding driving system, and a second motor for driving the switching mechanism for selective switching between the first, second and third states, wherein the switching mechanism is driven by rotation of the second motor in one direction, for cyclically selecting the second state, the first state, and the third state in an order mentioned.

With the arrangement according to the fifth aspect of the present invention, by rotation of the second motor in one direction, the state of the camera can be cyclically switched in the order of film low-speed winding, film high-speed winding, film rewinding, film low-speed winding, . . . Consequently, the switching operations can be performed promptly, for example, the from the film rewinding operation performed in the third state selected by the switching mechanism to the film low-speed winding operation performed in the second state selected by the switching mechanism when a new film is loaded, and from the film low-speed winding operation performed in the second state when the voltage of the power supply battery decreases to the film high-speed winding operation performed in the first state after the battery has been replaced with a new one. Thus, even if the film or the battery is replaced with a new one during photographing, the period of time during which the photographing operation is interrupted due to this replacement can be reduced.

Furthermore, the driving of the switching mechanism requires a relatively light driving load, so that the second motor can be selected to have a lower output (and a smaller size) than the first motor, which acts as a film feeding driving source.

In a preferred embodiment of the present invention, the includes a rotary member disposed to be rotatively driven by rotation of the second motor in one direction, for being cyclically rotated to a phase that causes the switching mechanism to select the second state, a phase that causes the switching mechanism to select the first state, and a phase that causes the switching mechanism to select the third state.

With this arrangement, the state can be switched in the above order by rotation of the rotary member through the minimum angle, thereby minimizing the period of time required to switch the state.

In a further preferred embodiment of the present invention, there is provided a camera comprising first and second motors, first and second planetary mechanisms for transmitting a driving force of the first motor, a mirror disposed to advance into and recede from a photographic optical path, a shutter, a mirror and shutter driving system disposed to have the driving force of the first motor transmitted thereto via the first planetary mechanism when the first motor rotates in a first direction, for driving the mirror for enabling finder observation when the mirror advances into the photographic optical path, and for driving charging of the shutter, a first film winding driving system disposed to be connected to the first planetary mechanism to have the driving force of the first motor transmitted thereto via the first planetary mechanism with a first reduction ratio to be driven thereby when the first motor rotates in a second direction, a film rewinding driving system disposed such that the driving system of the first motor is transmitted thereto via the second planetary mechanism when the first motor rotates in the first direction, a second film winding driving system disposed to be connected to the second planetary mechanism to have the driving force of the first motor transmitted thereto via the second planetary mechanism with a second reduction ratio greater than the first reduction ratio to be driven thereby when the first motor rotates in the second direction, and a switching mechanism disposed to be driven by a driving force of the second motor, for selectively switching between a first state in which the driving force of the first motor can be transmitted to the first film winding driving system, a second state in which the driving force of the first motor can be transmitted to the second film winding driving system, and a third state in which the driving force of the first motor can be transmitted to the film rewinding driving system, wherein the switching mechanism is driven by the second motor rotating in one direction, for cyclically selecting the second state, the first state, and the third state in an order mentioned.

According to this embodiment, the camera is generally constructed so that the mirror and shutter driving system is driven via the first planetary mechanism by rotation of the first motor in the first direction, the first film winding driving system for high-speed winding is driven via the first planetary mechanism by rotation of the first motor in the second direction, the film rewinding driving system is driven via the second planetary mechanism by rotation of the first motor in the first direction, the second film winding driving system for low-speed winding is driven via the second planetary mechanism by rotation of the first motor in the second direction, and the driving force of the two motors is used to drive the switching mechanism in one direction in order to cyclically switch the state of the camera in the order of film low-speed winding, film high-speed winding, film rewinding, film low-speed winding, . . . With this arrangement, the first motor drives all the driving systems that cause execution of the photographing and film feeding operations for the camera, which require relatively high driving loads, and the second motor drives the switching mechanism which requires relatively light driving loads. Accordingly, the large number of driving systems can be driven, and the second motor can be selected to have a lower output (and a smaller size) than the first motor, thus reducing the size of the camera.

To attain the above objects, a sixth aspect of the present invention provides a driving device provided in an apparatus for driving a plurality of driving systems by means of motors as driving sources, comprising first and second motors, first and second planetary mechanisms for transmitting a driving force of the first motor, a first driving system disposed to have the driving force of the first motor transmitted thereto via the first planetary mechanism when the first motor rotates in a first direction, a second driving system disposed to have the driving force of the first motor transmitted thereto via the first planetary mechanism when the first motor rotates in a second direction, a third driving system disposed to have the driving force of the first motor transmitted thereto via the second planetary mechanism when the first motor rotates in the first direction, a fourth driving system disposed to have the driving force of the first motor transmitted thereto via the second planetary mechanism when the first motor rotates in the second direction, and a switching mechanism responsive to rotation of the second motor, for switching between transmission of the driving force of the first motor via the first planetary mechanism, and transmission of the driving force of the first motor via the second planetary mechanism.

Preferably, the first to fourth driving systems cause execution of operations of the apparatus requiring greater driving loads than a driving load which the switching mechanism undergoes.

With the arrangement according to the sixth aspect of the present invention, the first motor drives all of the first to fourth driving systems that cause execution of the photographing and film feeding operations for the camera, which require relatively high driving loads, and the second motor drives the switching mechanism which requires a relatively light driving load. Consequently, the second motor can be selected to have a lower output (and a smaller size) than the first motor, thus reducing the size of the apparatus or camera and thus its costs.

In a preferred embodiment of the present invention, the switching mechanism is disposed to be driven by rotation of the second motor in a first direction, and the driving device includes a fifth driving system disposed to have the driving force of the second motor transmitted thereto when the second motor rotates in a second direction.

With this arrangement, if the fifth driving system is disposed to perform apparatus operations (those other than the photographing and film feeding operations, for example, operations of projecting the electronic flash device into a flash light emission enabled position and housing the same in the electronic flash case) that do not require heavy driving loads similarly to the switching mechanism, then the above described effects can be obtained, while a larger number of driving systems can be driven.

In a preferred embodiment of the present invention, the second driving system and the fourth driving system cause execution of the same operation of the apparatus, a reduction ratio between the first planetary mechanism and the second driving system being different from a reduction ratio between the second planetary mechanism and the fourth driving system.

If the second and fourth driving systems thus perform the same apparatus operation (for example, the film winding operation for the camera) at different speeds, optimal and efficient driving operations can be performed depending on the state of the power supply, driving loads, or the like. In particular, if the camera has normal levels of power supply voltage, film winding load, and the like, the film winding speed can be increased to increase the continues photographing frame speed.

In each of the above aspects of the present invention, two motors are used, so that the mechanisms can be laid out more freely and a relatively smaller number of planetary mechanisms are required than when only one motor is used. As a result, the entire size of the apparatus or camera and its costs can be reduced.

Furthermore, since one camera operation can be performed by rotation of the motor in only one direction, the motor controlling sequence can be simplified compared to a case where rotations in both directions are combined together to perform one operation. Therefore, the present invention is effective for reducing the period of time required to wind the film to thereby increase the continuous photographing frame speed.

In this connection, if the switching mechanism is driven for switching by rotation of the second motor in one direction, the electronic flash driving system, which requires a relatively light driving load, may be driven by rotation of the second motor in the other direction, so as to drive the electronic flash to project into the electronic flash light emission enabled position, for example. Thus, the second motor can be effectively used so that a larger number of driving systems can be driven by the two motors.

To attain the above objects, a seventh aspect of the present invention provides a driving device provided in an apparatus for driving a plurality of driving systems by means of motors as driving sources, comprising first and second motors, first and second planetary mechanisms for transmitting a driving force of the first motor, a first driving system for causing execution of an operation of the apparatus via the first planetary mechanism, a second driving system for causing execution of the operation of the apparatus caused to be executed by the first driving system, via the second planetary mechanism, and a switching mechanism disposed to be driven by a driving force of the second motor, for switching between transmission of the driving force of the first motor to the first driving system via the first planetary mechanism, and transmission of the driving force of the first motor to the second driving system via the second planetary mechanism, wherein a reduction ratio between the first planetary mechanism and the first driving system when the driving force of the first motor is transmitted to the first driving system via the first planetary mechanism and a reduction ratio between the second planetary mechanism and the second driving system when the driving force of the first motor is transmitted to the second driving system via the second planetary mechanism are different from each other.

Further, according to the seventh aspect, there is also provided a camera having the above driving device.

To attain the above objects, an eighth aspect of the present invention provides a driving device provided in an apparatus for driving a plurality of driving systems by means of motors as driving sources, comprising first and second motors, first and second planetary mechanisms for transmitting a driving force of the first motor, a first driving system disposed to have a driving force of the first motor transmitted thereto via the first planetary mechanism when the first motor rotates in a first direction, a second driving system disposed to have the driving force of the first motor transmitted thereto via the first planetary mechanism when the first motor rotates in a second direction, a third driving system disposed to have the driving force of the first motor transmitted thereto via the second planetary mechanism when the first motor rotates in the first direction, a fourth driving system disposed to have the driving force of the first motor transmitted thereto via the second planetary mechanism when the first motor rotates in the second direction, the second driving system and the fourth driving system causing execution of the same operation of the apparatus, and a switching mechanism disposed to be driven by a driving force of the second motor, for switching between transmission of the driving force of the first motor to the second driving system via the first planetary mechanism, and transmission of the driving force of the first motor to the fourth driving system via the second planetary mechanism, wherein a reduction ratio between the first planetary mechanism and the second driving system when the driving force of the first motor is transmitted to the second driving system via the first planetary mechanism and a reduction ratio between the second planetary mechanism and the fourth driving system when the driving force of the first motor is transmitted to the fourth driving system via the second planetary mechanism are different from each other.

Further, according to the eighth aspect, there is also provided a camera having the above driving device.

With the arrangements according to the seventh and eighth aspects of the present invention, the speed of the same apparatus operation such as the film winding operation which is driven by the driving force of the first motor can be switched by driving the switching mechanism by the second motor. Thus, optimal and efficient driving operations can be performed depending on the state of the power supply, driving loads, or the like. As a result, when the camera has normal levels of power supply voltage, film winding load, and the like, the apparatus operation speed (for example, the film winding speed) can be increased.

The driving load exerted on the switching mechanism is lighter than those required for driving the mirror and shutter charge, the film feeding, and other driving operations for the camera, and therefore the second motor can be selected to have a lower output (and a smaller size) than the first motor. Furthermore, since two motors are used, the mechanisms can be laid out more freely and a relatively smaller number of planetary mechanisms are required than when only one motor is used. As a result, the entire size of the apparatus or camera and its costs can be reduced.

Furthermore, since one camera operation can be performed by rotation of the motor in only one direction, the motor controlling sequence can be simplified compared to a case where rotations in both directions are combined together to perform one operation. Therefore, the present invention is effective for reducing the period of time required to wind the film to thereby increase the continuous photographing frame speed.

In a preferred embodiment of the eighth aspect of the invention, the switching mechanism selectively switches between a first state in which the first planetary mechanism is permitted to be drivingly connected to the second driving system, and a second state in which the second planetary mechanism is permitted to be drivingly connected to the fourth driving system, and in the first and second states, the first planetary mechanism is permitted to be drivingly connected to the first driving system.

With this arrangement, the first driving system can be driven by rotation of the first motor in the first direction regardless of selection of the above apparatus operation speed, thereby simplifying the control sequence.

Moreover, for example, in the camera, depending on the state of the switching mechanism, the film can be wound at a high or low speed by rotation of the first motor in the second direction, while the film rewinding operation, which is not related to the film winding operation, can be preformed by rotation of the first motor in the first direction. Furthermore, after the completion of film winding or the like, the mirror driving operation and the shutter charge driving operation can be performed by rotation of the first motor in the first direction. Thus, the first motor can be fully utilized to thereby restrain an increase in the number of required motors.

The above and other objects, features, and advantages of the present invention will be apparent from the following specification and drawings.

DETAILED DESCRIPTION OF PREFERRED EMBODIMENTS

The present invention will be described below in detail with reference to the drawings showing a preferred embodiment thereof.

Figure 1:
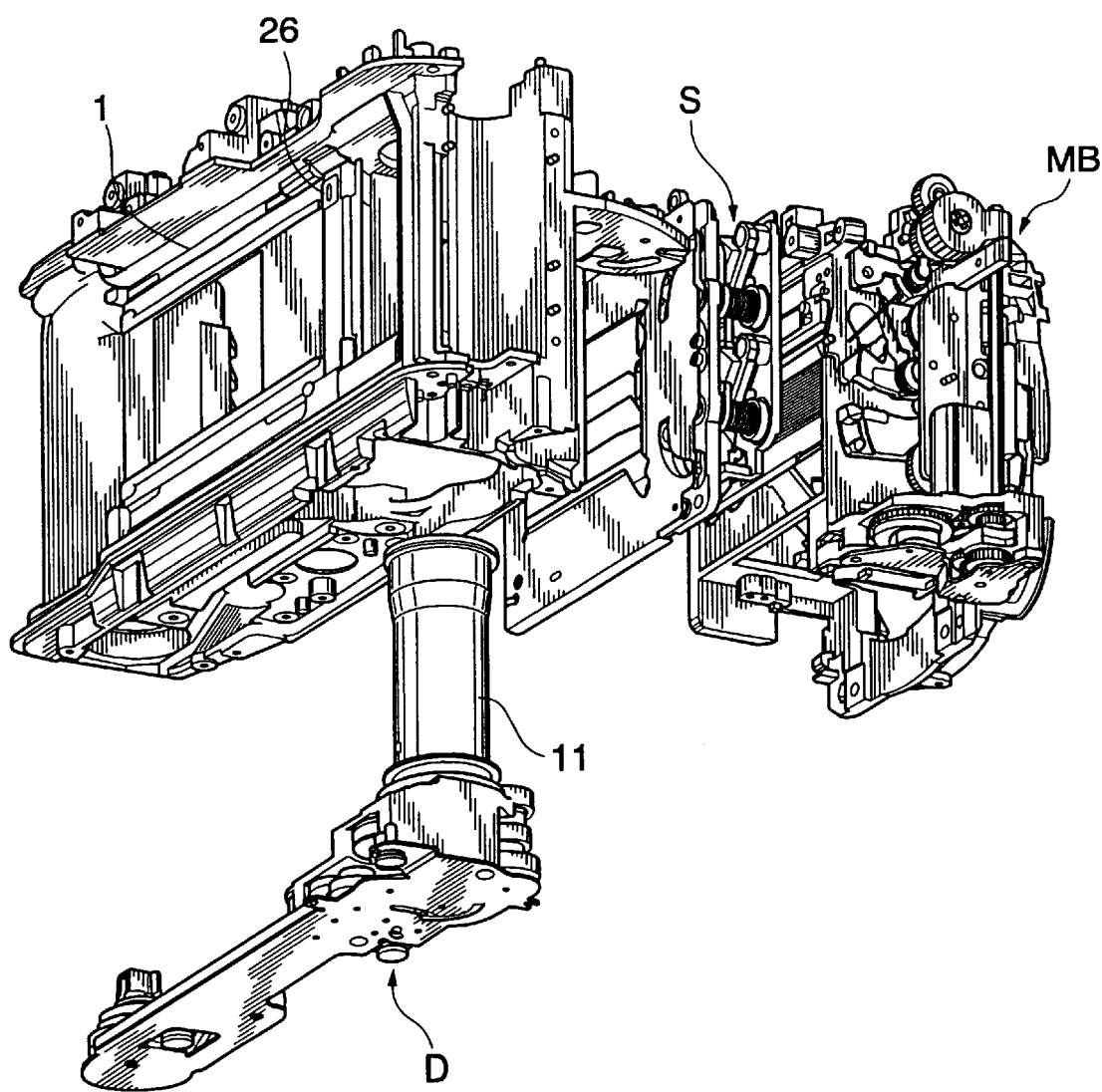
FIG. 1 is a perspective view schematically showing an entire internal mechanism of a single-lens reflex camera as a camera according to an embodiment of the present invention.
Figure 2:
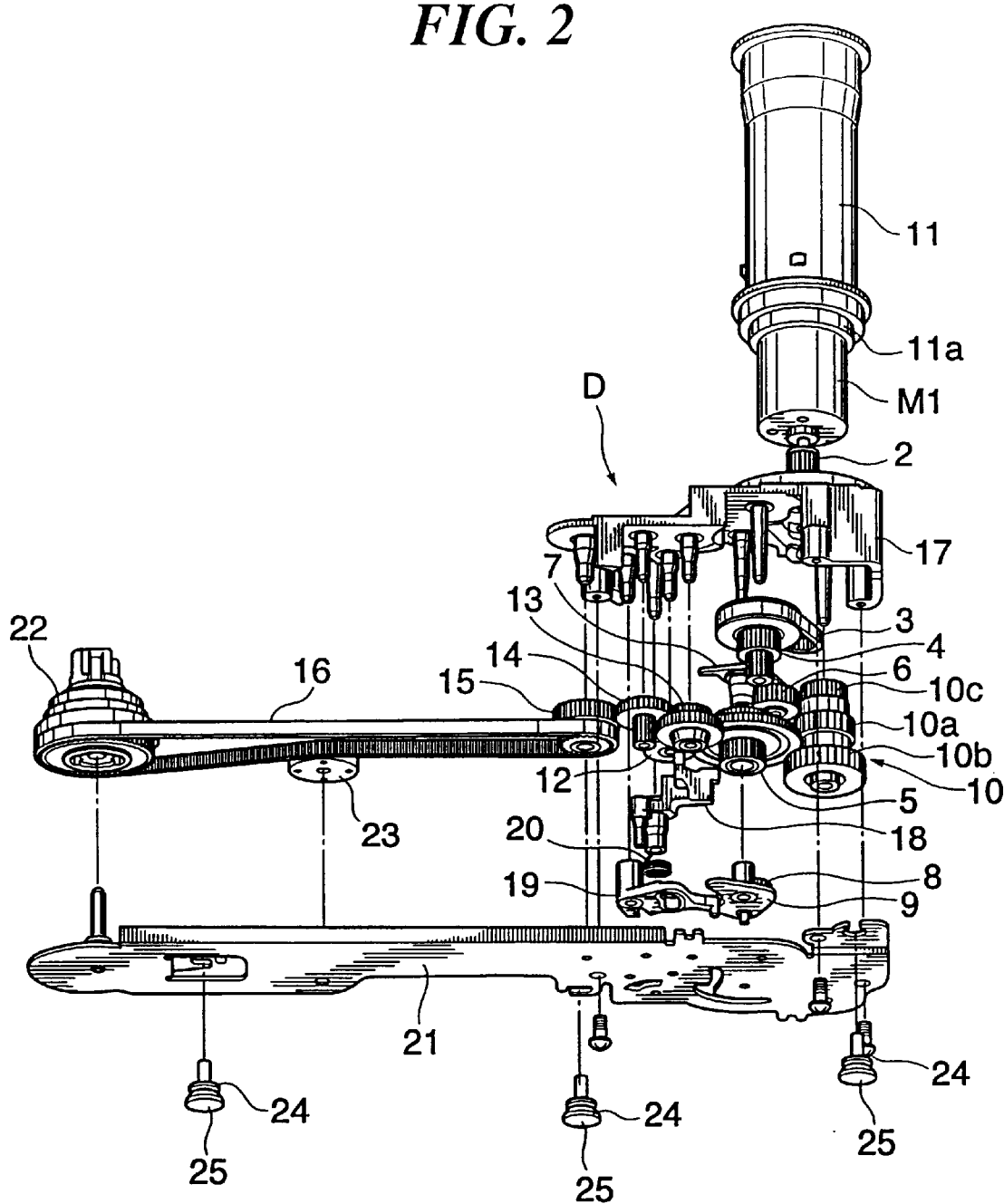
FIG. 2 is a perspective view showing the construction of a driving unit of the internal mechanism of FIG. 1.
Figure 3:
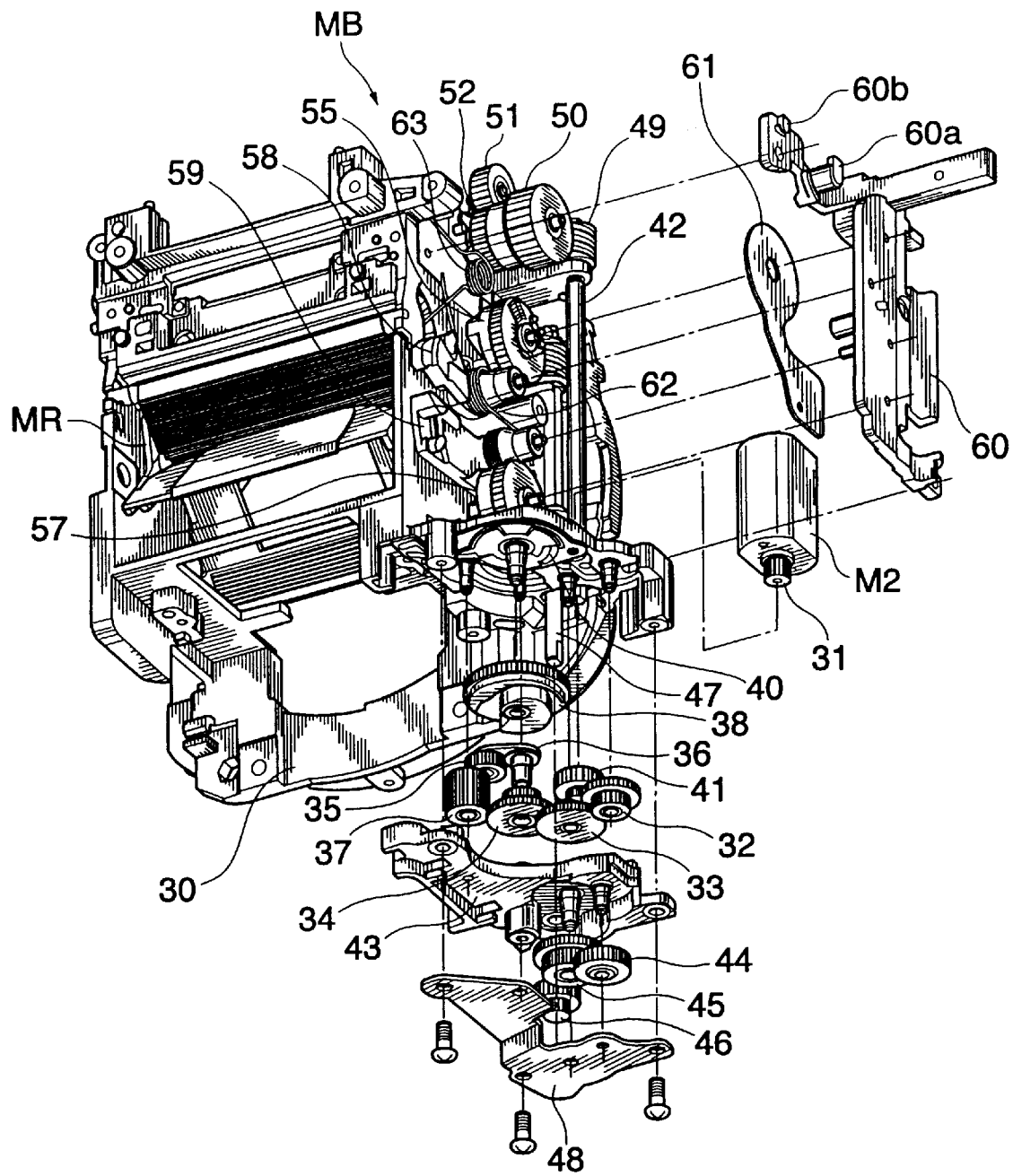
FIG. 3 is a perspective view of the construction of a mirror box unit of the internal mechanism of FIG. 1.
Figure 4:
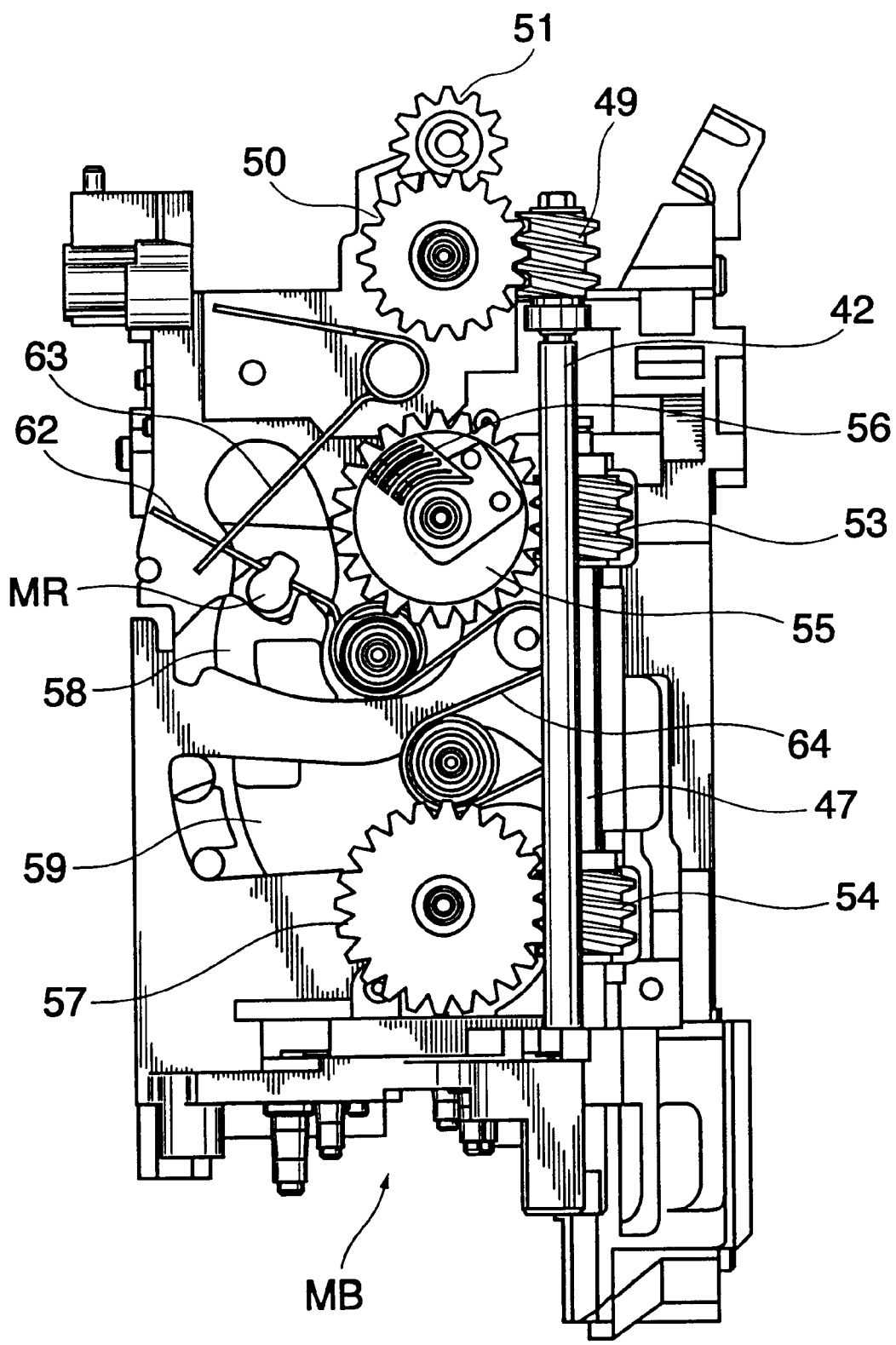
FIG. 4 is a side view showing the construction of the mirror box unit of FIG. 3.
Figure 5:
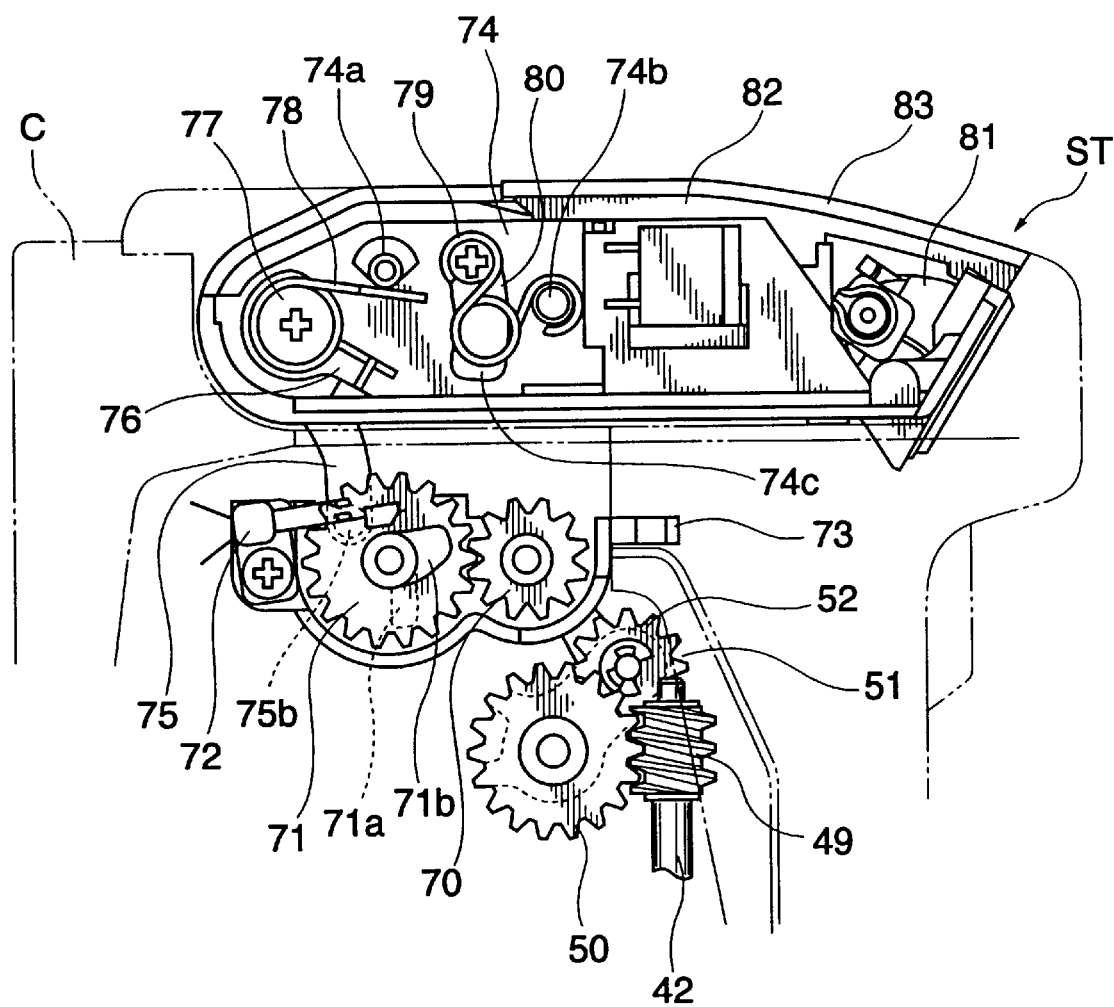
FIG. 5 is a view, partly in section, of the construction of an electronic flash popup mechanism of the internal mechanism of FIG. 1.

FIGS. 1 to 6 show the construction of an internal mechanism of a single-lens reflex camera as a camera according to an embodiment of the present invention. FIG. 1 is a perspective view schematically showing the entire internal mechanism, and FIGS. 2 and 3 are perspective views showing units constituting the internal mechanism shown in FIG. 1. Further, FIG. 4 is a side view showing the construction of a mirror box unit, shown in FIG. 3, and FIG. 5 is a partial sectional view showing the construction of an electronic flash popup mechanism. Furthermore, FIGS. 6A to 6O is a view showing the details of parts constituting the electronic flash popup mechanism.

In FIG. 1, reference numeral 1 denotes a camera main body which has a driving unit D mounted on a bottom surface thereof to cause some camera operations to be performed, including photographing operations such as a mirror driving operation, a shutter charging operation, and film winding and rewinding operations, as well as a film feeding operation. Further, the camera main body 1 has a shutter unit S and a mirror box unit MB mounted on an aperture front surface thereof.

First, in the driving unit D shown in FIG. 2, reference numeral M1 denotes a first motor which is a large-sized core-less motor of a relatively high output as a driving source for causing relatively high driving load-camera operations to be performed, including a film feeding operation, a mirror driving operation, and a shutter charge driving operation. The first motor M1 has a pulley 2 secured to an output shaft thereof.

Reference numeral 3 denotes a timing belt. Reference numeral 4 denotes a gear having a pulley on one side thereof and a gear on the other side thereof and to which rotation of the pulley 2 is transmitted by the timing belt 3.

Reference numeral 5 denotes a sun gear having a larger-sized gear portion meshing with the gear 4 and smaller-sized gear portions formed on opposite sides of the larger-sized gear portion. One of the smaller-sized gear portions meshes with a planetary gear 6 constituting a first planetary clutch (first planetary mechanism), whereas the other smaller-sized gear portion meshes with a planetary gear 8 constituting a second planetary clutch (second planetary mechanism).

The planetary gear 6 is supported by a planetary lever 7 so as to revolve around one of the smaller-sized gear portions of the sun gear 5. The planetary lever 7 is provided with stopper portions 7a and 7b for hindering the revolution of a first switching lever 18, described later. Further, the planetary gear 8 is supported by a planetary lever 9 so as to revolve around the other smaller-sized gear portion of the sun gear 5. The planetary lever 9 is provided with stopper portions 9a and 9b for hindering the revolution of a first switching lever 19, described later.

Reference numeral 10 denotes a winding transmitting gear comprised of three gear portions. When the planetary gear 6 revolved by rotation of the first motor M1 in a second direction (for example, a forward direction) is brought into mesh with a gear portion 10a, the rotation of the first motor M1 is transmitted to the gear portion 10a. Further, when the planetary gear 8 revolved by the rotation of the first motor M1 in the second direction is brought into mesh with the gear portion 10b, the rotation of the first motor M1 is transmitted to the gear portion 2b.

The gear portion 10b has more teeth. than the gear portion 10a. The rotations of the first motor M1 transmitted to the gear portions 10a and 10b are transmitted to film winding driving systems (second and fourth driving systems) via the gear portion 10c. The film winding driving system including the gear portion 10a corresponds to a first winding driving system set forth in relevant claims, and the film winding driving system including the gear portion 10b corresponds to a second winding driving system set forth in relevant claims.

Reference numeral 11 denotes a spool for winding a film drawn out from a film cartridge, not shown, and having a gear portion 11a meshing with the gear portion 10c of the winding transmitting gear 10. Accordingly, when the first motor M1 rotates in a first direction, rotation of the first motor M1 is transmitted to the spool 11 via the planetary gear 6 or 8 and the winding transmitting gear 10, to rotatively drive the spool 11.

The planetary gears 6 and 8 are selectively meshed with the winding transmitting gear 10 by a switching mechanism, described later. However, the gear ratio (first reduction ratio) with which the planetary gear 6 meshes with the gear portion 10a is smaller than the gear ratio (second reduction ratio) with which the planetary gear 8 meshes with the gear portion 10b, and causes the spool 11 to rotate at a higher speed. In the present embodiment, the gear ratio with which the planetary gear 6 meshes with the gear portion 10a is set at 1:24, whereas the gear ratio with which the planetary gear 8 meshes with the gear portion 10b is set at 1:42.

Reference numeral 12 denotes a rewinding transmitting gear. When the planetary gear 8 revolved by rotation of the first motor M1 in the first direction (for example, backward rotation) is brought into mesh with the rewinding transmitting gear 12, the rotation of the first motor M1 is transmitted to a film rewinding driving system (third driving system). Further, rotation of the rewinding transmitting gear 12 is transmitted to gears 13 and 14.

Reference numeral 15 denotes a gear meshing with the gear 14 and having a pulley on one side thereof around which a timing belt 16 is wound. Thus, when rotation of the first motor M1 is transmitted from the gear 14 to the gear 15, it is transmitted to a rewinding fork unit 22, described later, via the timing belt 16.

Reference numeral 17 denotes a bottom board to which the first motor M1 is fixed and on which the gears 4, 5 and 10, the spool 11 and the gears 12 to 15 are rotatably supported.

Figure 6A:
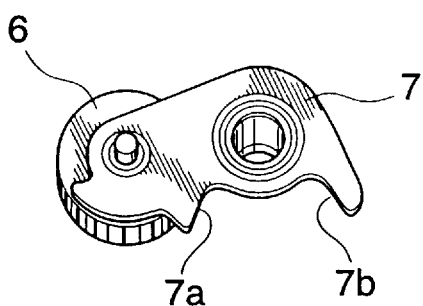
FIGS. 6A to 6O is a view showing the details of parts constituting the electronic flash popup mechanism of FIG. 5.
Figure 6B:
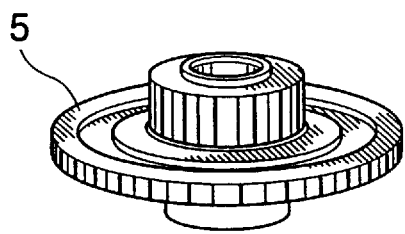
Figure 6C:
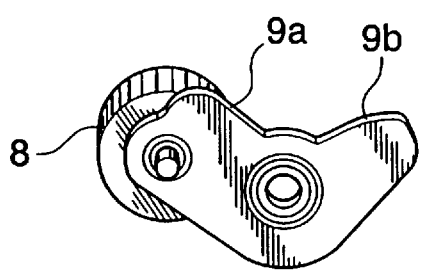
Figure 6D:
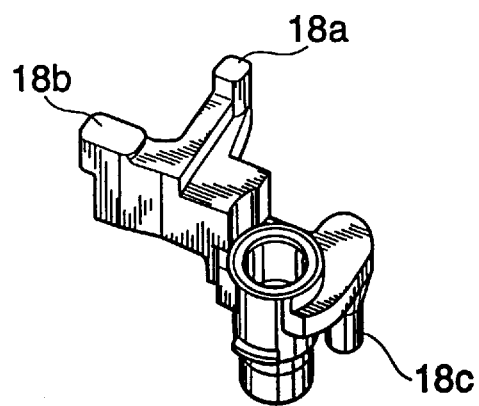
Figure 6E:
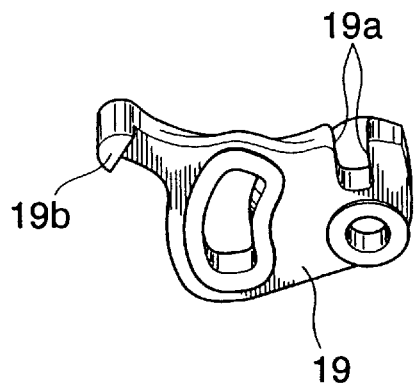
Figure 6F:
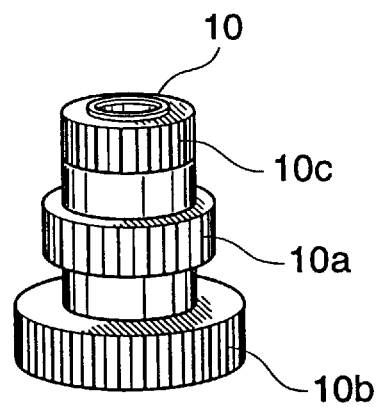
Figure 6G:
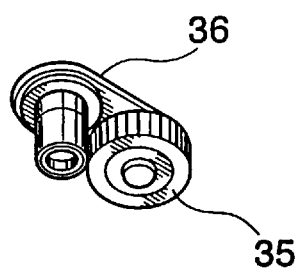
Figure 6H:
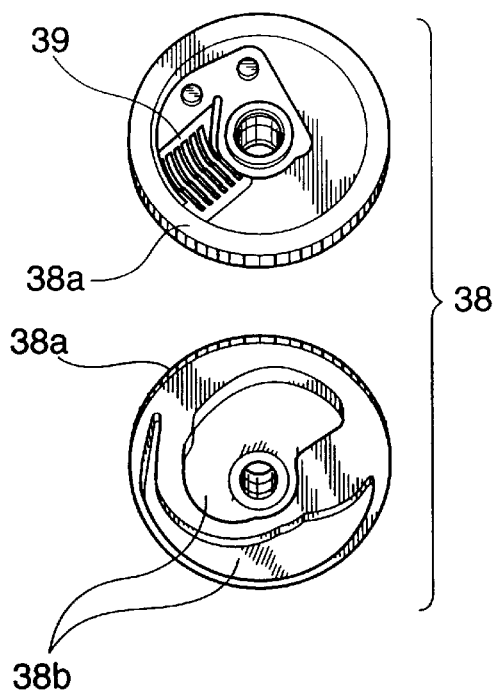
Figure 6J:
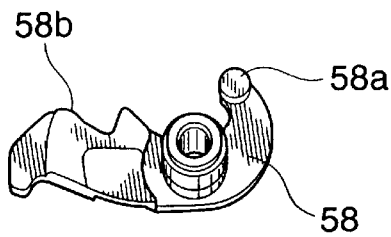
Figure 6K:
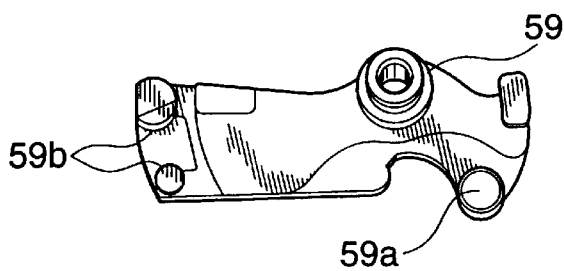
Figure 6I:
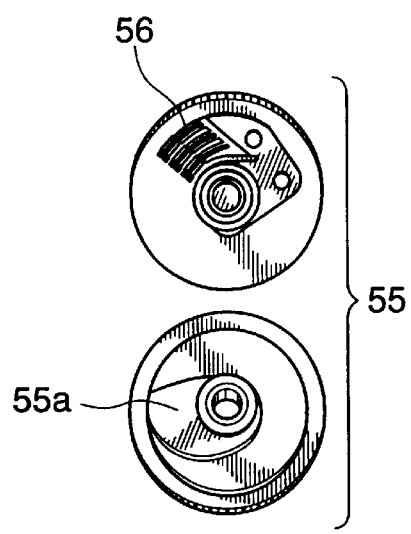
Figure 6L:
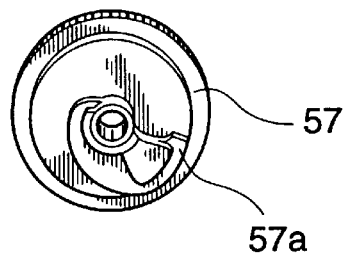
Figure 6M:
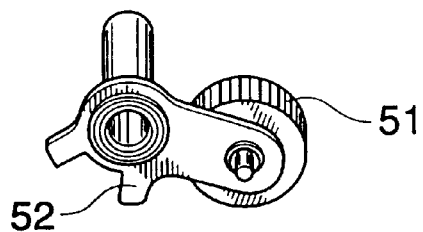
Figure 6N:
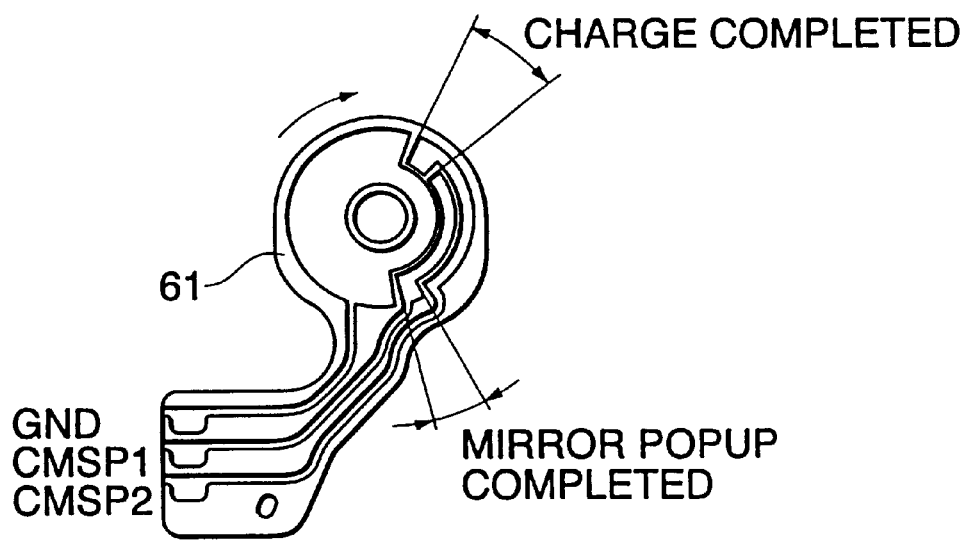

Reference numeral 18 is a first switching lever rotatably supported on the bottom board 17 and having arms 18a and 18b and a shaft 18c as shown in FIGS. 6A to 60. The first switching lever 18 is pivoted as the arm 18b traces a cam 38, described later. Further, the arm 18a abuts against the stopper portion 7a or 7b of the planetary lever 7 to hinder the revolution of the planetary lever 7.

Reference numeral 19 denotes a second switching lever rotatably supported on the bottom board 17 and having a cam portion 19a linked with the shaft 18c of the first switching lever 18, and an arm 19b abutting against the stopper portion 9a or 9b of the planetary lever 9 to hinder the revolution of the planetary lever 9.

Reference numeral 20 denotes a torsion spring that urges the first switching lever 18 to rotate counterclockwise as viewed from the bottom surface of the camera. The first and second switching levers 18 and 19 are pivoted in opposite directions based on the relationship between the shaft 18c and the cam portion 19a so that when one of the switching levers rotates clockwise, the other rotates counterclockwise.

Reference numeral 21 denotes a cover that serves to prevent the gears 4 and 5, the planetary levers 7 and 9, the gears 10 and 12 to 15 and the switching levers 18 and 19 from slipping off. The cover 21 is fixed to the bottom board 17 by screws.

Reference numeral 22 denotes the rewinding fork unit for rewinding the film into the film cartridge, which is rotatably supported on the cover 21. The rewinding fork unit 22 is provided with a pulley at a lower end thereof, around which the timing belt 16 is wound.

Reference numeral 23 denotes a roller for applying a predetermined tension to the timing belt 16, which is rotatably supported on the cover 21.

The components described above and including the first motor M1, the gear 2 to the roller 32 constitute one driving unit D, which is attached to the bottom surface of the camera main body 1 via three cylindrical damper rubbers 24 and staged screws 25 in a fashion floating from the bottom surface.

Reference numeral 26, shown in FIG. 1, denotes a photo reflector for optically detecting movement of perforations formed in the film. The photo reflector 26 is fixed to a right side of the aperture surface of the camera main body 1 at a predetermined location thereof.

Next, in the mirror box unit MB shown in FIGS. 1 and 3, reference numeral 30 denotes a mirror box. The mirror box 30 has a mirror unit MR mounted therein and which can advance into and recede from a photographic optical path; it advances into the photographic optical path at a location (hereinafter referred to as "the finder observing position") where it is obliquely disposed, to reflect a photographic light beam to a finder observing system, and recedes from the photographic optical path into a position above the same (photographing position) for film exposure. The mirror box 30 also has shafts and other parts integrally formed on side and bottom surfaces thereof to support gears, levers, and other parts constituting a mirror and shutter driving system (first driving system) for driving the mirror unit MR so as to advance or recede and for driving charging of the shutter unit S and an electronic flash popup driving system (fifth driving system) for driving popping-up of an electronic flash, described later.

Reference numeral M2 denotes a second motor which is a small-sized cored motor with a lower output than the first motor M1. The second motor M2 is fixed to the mirror box 30 and has a gear 31 secured to an output shaft thereof. Driving force of the second motor M2 is transmitted to a gear 33 via the gear 31 and a gear 32.

Reference numeral 34 denotes a sun gear having a larger-sized gear portion meshing with the gear 33 and a smaller-sized gear portion meshing with a planetary gear 35 constituting a third planetary clutch (third planetary mechanism). The planetary gear 35 is supported by a planetary lever 36 so as to revolve around the smaller-sized gear portion of the sun gear 34. Reference numeral 37 denotes a switching gear which is disposed to mesh with the planetary gear 35 revolved by rotation of the second motor M2 in the first direction (for example, backward rotation). The switching gear 37 also meshes with a cam gear 38.

Figure 6O:
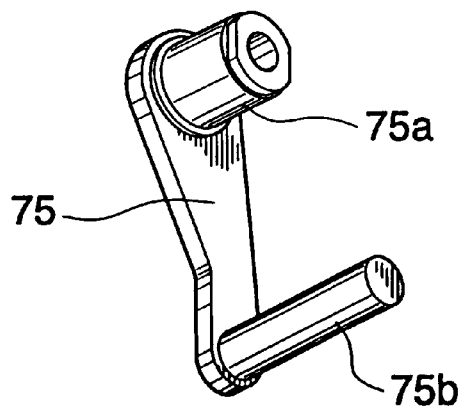

As shown in FIGS. 6A to 6O the cam gear 38 has a gear portion 38a meshing with the switching gear 37, and a cam portion 38b. The cam portion 38b is formed and disposed so as to be traced by the arm 18b of the first switching lever 18 described previously. Thus, while the cam gear 38 makes one rotation, the first switching lever 18, urged by the torsion spring 20, is pivoted due to the tracing of the cam portion 38b by the arm 18b, and the second switching lever 19 follows this oepration to be pivoted in a direction opposite to the one in which the first switching lever 18 is pivoted. In this connection, the first and second levers 18 and 19 and the cam gear 38 constitute a switching mechanism set forth in relevant claims.

Figure 7A:
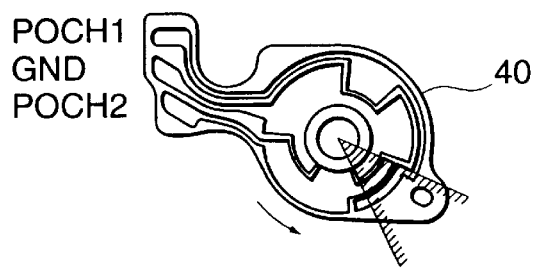
FIGS. 7A to 7E are views useful in explaining the operation of a switching mechanism of the internal mechanism of FIG. 1.

Further, reference numeral 40 denotes a phase substrate (see FIG. 7A). A brush 39 attached to the cam gear 38 slides over a pattern formed on the phase substrate 40 so that the rotational position of the cam gear 38 can be detected.

Reference numeral 41 denotes an electronic flash transmitting gear which is disposed to mesh with the planetary gear 35 revolved by rotation of the second motor M2 in the second direction (for example, forward rotation). The electronic flash transmitting gear 41 transmits the rotation of the second motor M2 to the electronic flash transmitting system.

The above described gears 32, 33, 34, and 37 and cam gear 38 are rotatably supported by shafts formed on a bottom surface of mirror box 30, and the gear 41 is fixed to a shaft 42 rotatably supported on a side surface of the mirror box 30.

Reference numeral 43 denotes a cover that prevents the gears 32, 33, 34, 37, and 41 from slipping off. Reference numeral 44 denotes a mirror and shutter transmitting gear which is disposed to mesh with the planetary gear 6 revolved by rotation of the first motor M1 of the driving unit D in the first direction (for example, backward rotation). The mirror and shutter transmitting gear 43 meshes with a gear 45 to transmit the rotation of the first motor M1 to the mirror and shutter driving system.

The gears 44 and 45 are both rotatably supported on shafts formed on the cover 43. Reference numeral 46 also denotes a gear rotatably supported on the cover 43 and on the mirror box 30 and fixed to a lower end of the shaft 47 rotatably supported on the side surface of the mirror box 30.

Reference numeral 48 denotes a cover that prevents the gears 44, 45, and 46 and the cam gear 38 from slipping off and is fixed to the bottom surface of the mirror box 30 by screws together with the cover 43.

Further, reference numeral 49 denotes a worm gear secured to an upper end of the shaft 42 above the side surface of the mirror box 30. Reference numeral 50 denotes a sun gear having a helical gear meshing with the worm gear 49 so as to shift the rotating direction of the latter through 90°. The sun gear 50 meshes with a planetary gear 51 constituting a fourth clutch. The planetary gear 51 is supported by a planetary lever 52 rotatably supported on a shaft located on an upper side of the side surface of the mirror box 52, so as to revolve around the sun gear 50. When the second motor M2 rotates in the second direction, the planetary gear 51 revolves counterclockwise with respect to the side surface of the mirror box 30.

Further, reference numerals 53 and 53 denote worm gears located on the side surface of the mirror box 30 shown in FIG. 4 and fixed to the shaft 47. Reference numeral 55 denotes a cam gear rotatably supported on a shaft formed on the side surface of the mirror box 30. As shown in FIGS. 6A to 6O, the cam gear 55 has a cam portion 55a for driving the mirror unit MR between the finder observing position and the photographing position, and a brush 56 secured to a side thereof opposite to the cam portion 55a and disposed to slide over a pattern of a phase substrate 61, described later. Moreover, the cam gear 55 has a helical gear portion formed thereon and meshing with the worm gear 53 so as to shift the rotating direction of the latter through 90°. The cam gear 55 is rotated counterclockwise as viewed from the side surface of the mirror box, by rotation of the first motor rotates M1 in the first direction.

Reference numeral 57 denotes a cam gear rotatably supported on a shaft formed on the side surface of the mirror box 30. As shown in FIGS. 6A to 6O, the cam gear 57 has a cam portion 57a for charging the shutter unit S after photographing, and a helical gear portion meshing with the worm gear 54 so as to shift the rotating direction of the latter through 90°. The cam gear 57 is rotated counterclockwise as viewed from the side surface of the mirror box, by rotation of the first motor M1 in the first direction.

The worm gears 53 and 54 and the helical gear portions of the cam gears 55 and 57 have the same gear configuration, that is, the same number of threads and the same number of teeth. Thus, the both pairs of the worm gears and the helical gear portions have the same gear ratio with which the rotation of the first motor M1 is transmitted while the motor M1 is rotated in the first direction. Consequently, the cam gears 55 and 57 are always kept in phase while they are rotating.

Reference numeral 58 denotes a mirror lever that is pivoted to transmit the phase of the cam portion 55a of the cam gear 55 to the mirror unit MR. As shown in FIGS. 6A to 6O, the mirror lever 58 has an arm 58a for tracing the cam portion 55a, and an arm 58b for driving the mirror unit MR, and is rotatably supported on a shaft formed on the side surface of the mirror box 30.

Reference numeral 59 denotes a charge lever that is pivoted to transmit the phase of the cam portion 57a of the cam gear 57 to the shutter unit S. As shown in FIGS. 6A to 6O, the charge lever 59 has an arm 59a for tracing the cam portion 57a, and an arm 59b for driving a charge driving section of the shutter unit S, and is rotatably supported on a shaft formed on the side surface of the mirror box 30 (FIG. 4).

Reference numeral 60, shown in FIG. 3, denotes a cover that serves to prevent the cam gears 55 and 57, the mirror lever 58, and the charge lever 59 from slipping off. The cover 60 is fixed to the side surface of the mirror box 30 by screws.

Reference numeral 61 denotes the phase substrate, already referred to (see FIGS. 6A to 6O), secured to the cover 60 and having a pattern over which the brush 56 attached to the cam gear 55 slides when the cam gear 55 is rotated. The phase substrate 61 indexes the movement of the mirror and the phase of the shutter charging operation.

Reference numeral 62 denotes a torsion spring comprised of a coil portion held around a rotary shaft of the mirror lever 58, and two arms one of which rests against a portion of the mirror box 30, with the other resting against the shaft of the mirror unit MR. Thus, the mirror unit MR is urged toward the mirror lever 58.

Reference numeral 63 denotes a torsion spring comprised of a coil portion held around a shaft 60*a* formed on the cover 60, and two arms one of which rests against shafts 60*a* and 60*b* formed on the cover 60, with the other resting against the shaft of the mirror unit MR. The torsion spring 63 urges the mirror unit MR toward the finder observing position (downward direction). Accordingly, when the mirror unit MR lowers, the lowering operation is switched such that the mirror unit MR is initially urged by the torsion spring 63 and subsequently by the torsion spring 62.

Reference numeral 64 denotes a torsion spring for urging the charge lever 59 against the cam gear 57, which is comprised of a coil portion held around a rotary shaft of the charge lever 59, and two arms one of which rests against a portion of the mirror box 30, with the other resting against the arm of the charge lever 59 (FIG. 4).

Referring next to FIG. 5, reference character C denotes an upper cover as an outer part of the camera which is fixed to an upper portion of the camera main body 1 so as to cover a penta prism, not shown, constituting a finder optical system.

Reference numeral 70 denotes a gear with which meshes the planetary gear 51 which revolves counterclockwise via a gear train consisting of the gears 31 to 35 and 41, the shaft 42, the worm gear 49, and the gear 50 when the second motor M2 rotates in the second direction, so that the rotation of the second motor M2 is transmitted to the gear 70 to rotate the same.

Reference numeral 71 denotes a cam gear which meshes with the gear 70 to rotate clockwise and has cam portions 71*a* and 71*b* arranged on a front and a rear surfaces thereof, respectively.

Reference numeral 72 denotes a normally-open type leaf switch that is turned on and off by the cam portion 71*b* of the cam gear 71 to output a signal for causing rotation of the cam gear 71 to be detected.

Reference numeral 73 denotes a bottom board that rotatably supports the gear 70 and the cam gear 71 and to which the leaf switch 72 is secured. The bottom board 73 is secured to the inside of the upper cover C.

Reference numeral 74 denotes an electronic flash case constituting a base of an electronic flash unit ST that can be popped up and down between a light emission enabled position and a housed position, wherein shafts formed on laterally (direction perpendicular to the sheet of the drawing) opposite sides of the electronic flash case are rotatably supported in an upper part of the upper cover C. One of the shafts is formed at a proximal end portion of a lever 75 attached to the electronic flash case 74.

As shown in FIGS. 6A to 6O, the lever 75 has a shaft 75*a*, and a pin 75*b* driven by the cam portion 71*a* of the cam gear 71, the shaft 75*a* and the pin 75*b* being arranged at opposite ends of the lever 75. The shaft 75*a* rotatably penetrates through the electronic flash case 74 from the inside of the upper cover C, and has a lever 76 secured thereto by a screw 77.

Thus, the lever 75 located inside the upper cover C and the lever 76 located inside the electronic flash unit ST are pivoted together. Further, the other shaft of the electronic flash case 74 is rotatably supported on the upper cover C by staged screws, not shown.

Reference numeral 78 denotes a torsion spring having two arms one of which rests against the lever 76, with the other resting against the shaft 74*a* of the electronic flash case 74. The torsion spring 78 rotatively urges the levers 75 and 76 clockwise with respect to the electronic flash case 74.

Reference numeral 79 denotes a stopper pin secured to a side surface of the upper cover C. Reference numeral 74*b* denotes a shaft formed on the electronic flash case 74. Reference numeral 74*c* denotes a fan-shaped slot formed in the electronic flash case 74 and through which the stopper pin 79 located on the side surface of the upper cover C is projected into the electronic flash unit ST when the latter is popped up or down between the light emission enabled position and the housed position. The light emission enabled position of the electronic flash unit ST is determined by the stopper pin 79 abutting against a trailing end of the fan-shaped slot 74*c*.

Reference numeral 80 denotes a toggle spring having two arms one of which rests against the stopper pin 79, with the other resting against the shaft 74*b*. The toggle spring 80 urges the electronic flash unit ST in an upward direction when the latter is located between an intermediate position and the light emission enabled position within the popping-up and -down range thereof, and urges it in a downward direction when it is located between the intermediate position and the housed position.

Reference numeral 81 denotes a flash light emitting section composed of a xenon tube, a reflector, an optical panel, and others. Reference numeral 82 denotes a plastic cover, and reference numeral 83 denotes an aluminum cover constituting an armor. The cover 82 is fitted inside the cover 83, which is in turn secured to the electronic flash case 74.

Here, the urging force of the torsion spring 78 is set to be always greater than that of the toggle spring 80. Thus, when the rotation of the second motor M2 in the second direction is transmitted to the cam gear 71 to drive the lever 75, the torsion 78 overcomes the toggle spring 80 to push up the electronic flash unit ST toward the light emission enabled position. When an area where the urging direction of the toggle spring 80 is inverted is exceeded, due to the drag force of the toggle spring 80, the electronic flash unit ST is further raised closer to the light emission enabled position.

If the popping-up operation is hindered by a photographer's hand or the like while the electronic flash unit T is popping up toward the light emission enabled position, the resulting force is absorbed by the torsion spring 78 to prevent the rotation of the lever 75 from being transmitted to the electronic flash unit ST. Thus, only the levers 75 and 76 are pivoted to protect the electronic flash unit ST.

Figure 7B:
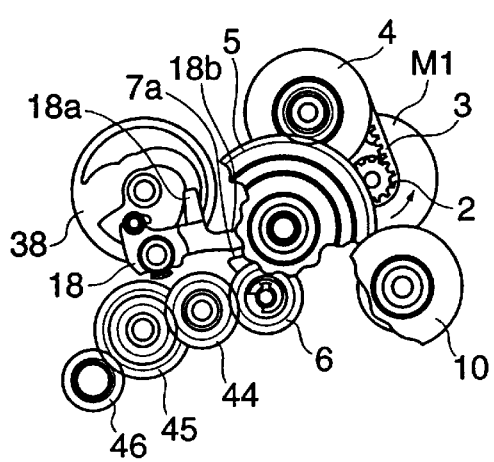
Figure 7C:
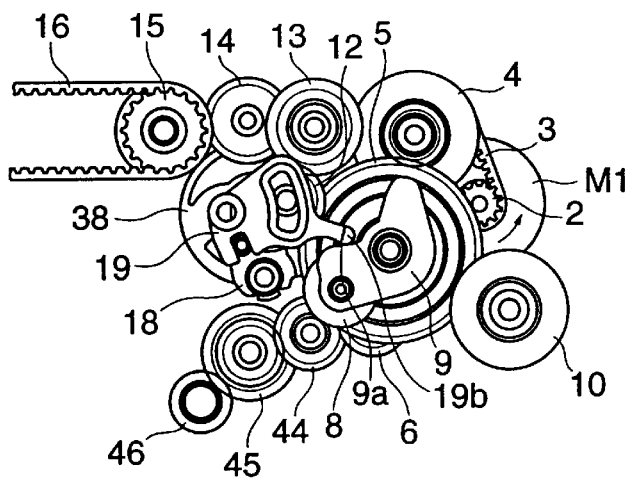

Next, the operation of the internal mechanism of the camera constructed as described above will be described. FIGS. 7A to 9C show the relationship between the transmission of the rotation of the first motor M1 and the phases of the switching levers 18 and 19 indexed by the cam gear 38 driven by rotation of the second motor M2 in the first direction. FIGS. 7A, 8A, and 9A show positions in which the cam gear 38 (brush 39) is stopped on the phase circuit 40, and FIGS. 7B, 8B, and 9B show how rotation of the first motor M1 is transmitted when the first motor M1 rotates in the first direction, with the cam gear 38 still stopped in the positions shown in FIGS. 7A, 8A, and 9A. Further, FIGS. 7C, 8C, and 9C show how rotation of the first motor M1 is transmitted when the first motor M1 rotates in the second direction, with the cam gear 38 still stopped in the positions shown in FIGS. 7A, 8A, and 9A.

In FIG. 7A, when the second motor M2 is rotated in the first direction so that the brush 39 of the cam gear 38 is stopped at a shaded portion of the phase substrate 40 (when a first state set forth in relevant claims is entered), a signal indicative of POCH1: Low POCH2: Low is output through the brush 39.

In this state, as shown in FIG. 7B, when the first motor rotates in the first direction, rotation of the pulley 2 is transmitted via the timing belt 3 to the sun gear 5, which thereby rotates clockwise. Thus, the planetary gear 6 and the planetary lever 7 also revolve clockwise. At this time, the arm 18b of the first switching lever 18 has already receded to a location where it does not abut against the stopper portion 7a of the planetary lever 7 with the planetary gear 6, so that the planetary gear 6 meshes with the gear 44. Thus, the rotation of the first motor M1 is transmitted via the gears 45 and 46, the shaft 47, and the worm gears 53 and 54 to the cam gears 55 and 57, which thereby rotate counterclockwise as viewed from the side surface of the mirror box 30. The mirror unit MR is thereby driven so as to pop down from the photographing position toward the finder observing position.

Subsequently, when the brush 56 attached to the cam gear 55 reaches a mirror popup stopping phase (CMSP1: Low, CMSP2: High) on the phase substrate 61 shown in FIGS. 6A to 6O and then the first motor M1 is braked and stopped, the mirror unit MR is stopped at the photographing position. Further, when the brush 56 attached to the cam gear 55 reaches a shutter charge completely stopping phase (CMSP1: High, CMSP2: Low) on the phase substrate 61 shown in FIGS. 6A to 6O an then the first motor M1 is braked and stopped, the mirror unit MR is stopped at the finder observing position and the device is brought into a shutter charge completed state, as shown in FIG. 4.

At this time, as shown in FIG. 7C, the planetary gear 8 and the planetary lever 9 also revolve clockwise like the planetary gear 6 and the planetary lever 7, but the arm 19b of the second switching lever 19 abuts against the stopper portion 9a of the planetary lever 9 with the planetary gear 6, so that the planetary gear 8 runs idle instead of revolving to a position where it meshes with the gear 12. Accordingly, no rotation of the first motor M1 is transmitted to the component from the rewinding transmitting gear 12 to the rewinding fork unit 22.

Figure 7D:
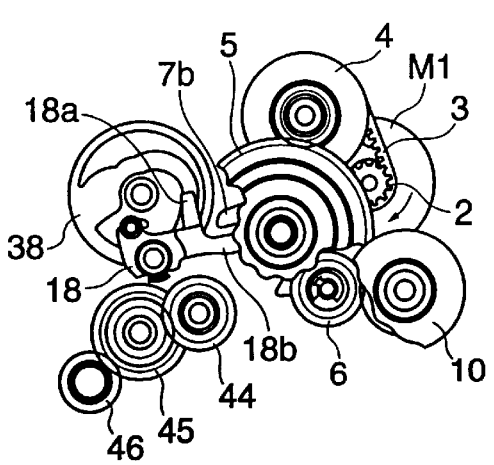
Figure 8A:
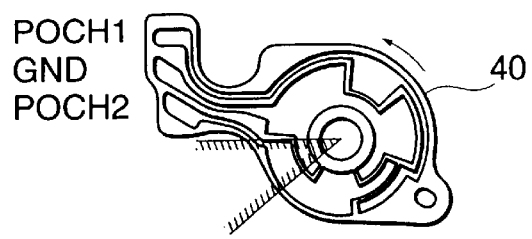
FIGS. 8A to 8E are views useful in explaining the operation of the switching mechanism of the internal mechanism of FIG. 1.
Figure 8B:
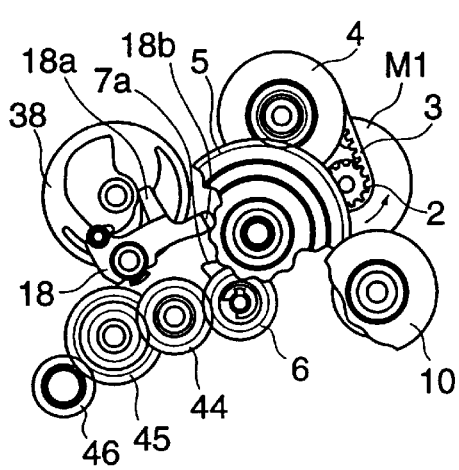
Figure 8C:
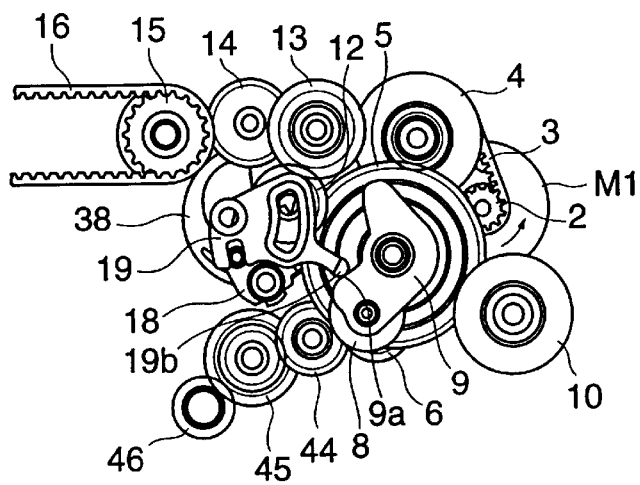

On the other hand, as shown in FIG. 7D, when the first motor M1 rotates in the second direction, the rotation of the pulley 2 is transmitted via the timing belt 3 to the sun gear 5, which thereby rotates counterclockwise. Thus, the planetary gear 6 and the planetary lever 7 also revolve counterclockwise. At this time, the arm 18b of the first switching lever 18 has already reached to a position where it does not abut against the stopper portion 7b of the planetary lever 7 with the planetary gear 6, which thereby meshes with the gear portion 10a of the gear 10. Thus, the rotation of the first motor M1 is transmitted via the gear 10c to the spool 11, which thereby rotates at a high speed in a film winding direction.

Figure 7E:
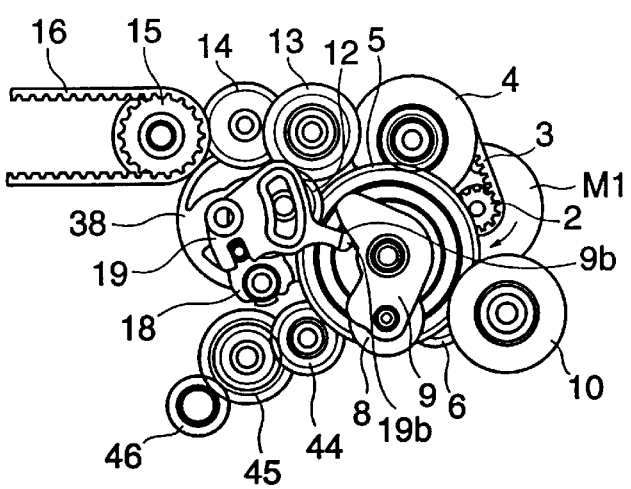

At this time, as shown in FIG. 7E, the planetary gear 8 and the planetary lever 9 also revolve counterclockwise like the planetary gear 6 and the planetary lever 7, but the arm 19b of the second switching lever 19 abuts against the stopper portion 9a of the planetary lever 9 with the planetary gear 6, so that the planetary gear 8 runs idle instead of revolving to a position where it meshes with the gear 12. The film is thus wound at a high speed, and when perforations corresponding in number (for example, eight) to one frame are detected by the photo reflector 26, the first motor M1 is braked to complete the operation of winding the film for one frame.

Next, in FIG. 8A, when the second motor M2 is rotated in the first direction so that the brush 39 of the cam gear 38 is stopped at the shaded portion of the phase substrate 40 (when a second state set forth in relevant claims is entered), a signal indicative of POCH1: High POCH2: Low is output through the brush 39.

In this state, as shown in FIG. 8B, when the first motor rotates in the first direction, the rotation of the pulley 2 is transmitted via the timing belt 3 to the sun gear 5, which thereby rotates clockwise. Thus, the planetary gear 6 and the planetary lever 7 also revolve clockwise. At this time, the arm 18b of the first switching lever 18 has already receded to a location where it does not abut against the stopper portion 7a of the planetary lever 7 with the planetary gear 6, so that the planetary gear 6 meshes with the gear 44. Thus, the rotation of the first motor M1 is transmitted via the gears 45 and 46, the shaft 47, and the worm gears 53 and 54 to the cam gears 55 and 57, which thereby rotate counterclockwise as viewed from the side surface of the mirror box 30. The mirror unit MR is thereby driven so as to pop down from the photographing position to the finder observing position.

Then, when the brush 56 attached to the cam gear 55 reaches the mirror popup stopping phase (CMSP1: Low, CMSP2: High) on the phase substrate 61 shown in FIGS. 6A to 6O and the first motor M1 is then braked and stopped, the mirror unit MR is stopped at the photographing position. Further, when the brush 56 attached to the cam gear 55 reaches the shutter charge completely stopping phase (CMSP1: High, CMSP2: Low) on the phase substrate 61 shown in FIGS. 6A to 6O and the first motor M1 is then braked and stopped, the mirror unit MR is stopped at the finder observing position and the device is brought into the shutter charge completed state, as shown in FIG. 4.

At this time, as shown in FIG. 8C, the planetary gear 8 and the planetary lever 9 also revolve clockwise like the planetary gear 6 and the planetary lever 7, but the arm 19b of the second switching lever 19 abuts against the stopper portion 9a of the planetary lever 9 with the planetary gear 6, so that the planetary gear 8 runs idle instead of revolving to a position where it meshes with the gear 12. Accordingly, no rotation of the first motor M1 is transmitted to the components from the rewinding transmitting gear 12 to the rewinding fork unit 22.

Figure 8D:
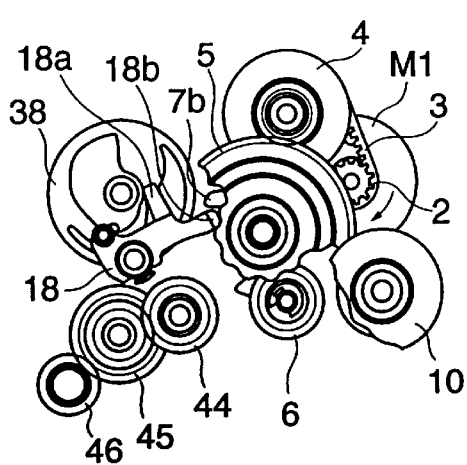
Figure 9A:
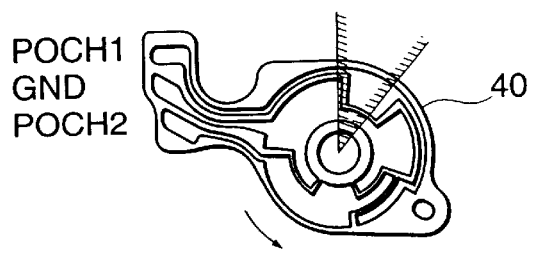
FIGS. 9A to 9B are views useful in explaining the operation of the switching mechanism of the internal mechanism of FIG. 1.
Figure 9B:
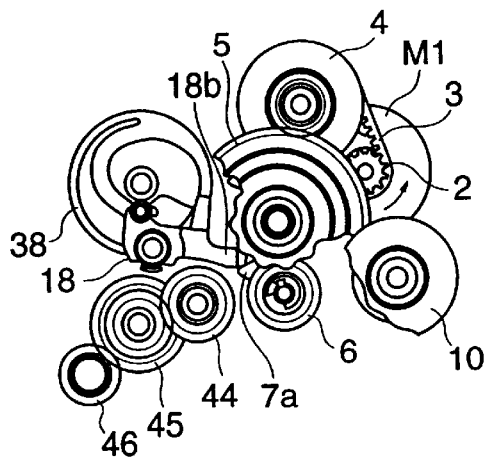
Figure 9C:
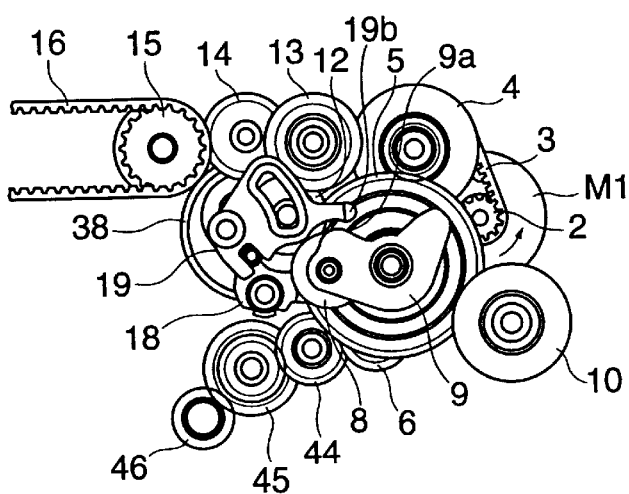

On the other hand, as shown in FIG. 8D, when the first motor M1 rotates in the second direction, the rotation of the pulley 2 is transmitted via the timing belt 3 to the sun gear 5, which thereby rotates counterclockwise. Thus, the planetary gear 6 and the planetary lever 7 also revolve counterclockwise. At this time, the arm 18b of the first switching lever 18 has already advanced into a location where it abuts against the stopper portion 7b of the planetary lever 7 with the planetary gear 6, so that the planetary gear 6 runs idle instead of revolving to a position where it meshes with the gear portion 10a of the gear 10.

Figure 8E:
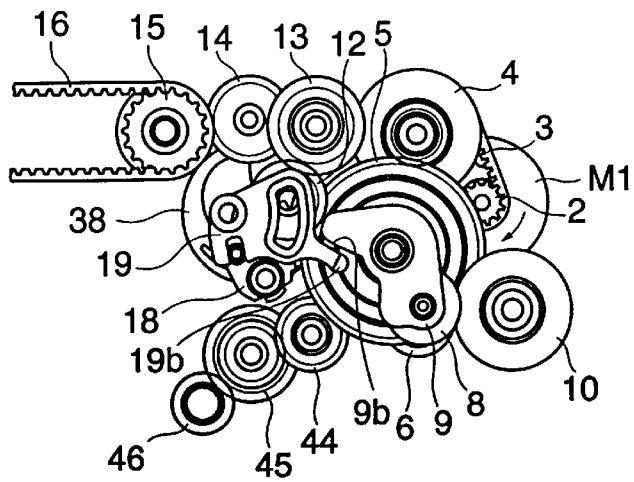

In contrast, as shown in FIG. 8E, the planetary gear 8 and the planetary lever 9 also revolve counterclockwise like the planetary gear 6 and the planetary lever 7, and at this time, the arm 19b of the second switching lever 19 has already receded to a location where it does not abut against the stopper portion 9a of the planetary lever 9 with the planetary gear 6, so that the planetary gear 8 meshes with the gear portion 10b of the gear 10. Thus, the rotation of the first motor M1 is transmitted via the gear 10c to the spool 11, which thereby rotates at a low speed in the film winding direction.

Subsequently, in FIG. 9A, when perforations corresponding in number (for example, eight) to one frame are detected by the photo reflector 26, the first motor M1 is braked to complete the operation of winding the film for one frame.

Next, in FIG. 9A, when the second motor M2 is rotated in the first direction so that the brush 39 of the cam gear 38 is stopped at the shaded portion of the phase substrate 40 (when a third state set forth in relevant claims is entered), a signal indicative of POCH1: High POCH2: High is output through the brush 39.

In this state, as shown in FIG. 9B, when the first motor rotates in the first direction, the rotation of the pulley 2 is transmitted via the timing belt 3 to the sun gear 5, which thereby rotates clockwise. Thus, the planetary gear 6 and the planetary lever 7 also revolve clockwise. At this time, the arm 18b of the first switching lever 18 has already advanced into a location where it abuts against the stopper portion 7a of the planetary lever 7 with the planetary gear 6, so that the planetary gear 6 runs idle instead of revolving to a position where it meshes with the gear 44. Thus, no rotation of the first motor M1 is transmitted to the components from the gear 44 to the cam gears 55 and 57, whereby the mirror driving or shutter charge driving operation is not performed.

Further, at this time, as shown in FIG. 9C, the planetary gear 8 and the planetary lever 9 also revolve clockwise. The arm 19b of the second switching lever 19 has already receded to a location where it does not abut against the stopper portion 9a of the planetary lever 9 with the planetary gear 8, so that the planetary gear 8 meshes with the gear 12. Thus, the rotation of the first motor M1 is transmitted via the gears 13 to 15 and the timing belt 16 to the rewinding fork unit 22, which thereby rotates in a film rewinding direction for a film rewinding operation.

In the phase state shown in FIG. 9A, the first motor M1 does not rotate in the second direction.

By rotation of the second motor M2 in the first direction, the positions of the switching levers 18 and 19 are cyclically switched in the order of the one shown in FIG. 8, the one shown in FIG. 7, the one shown in FIG. 9, and the one shown in FIG. 8.

Thus, if, for example, in the state shown in FIG. 9, the user rewinds and takes out the film from the camera and then rotates the cam gear 38 through a minimum angle (that is, in a minimum period of time) in order to wind a newly loaded film, the switching mechanism can be set in the state shown in FIG. 8. Further, if the power supply battery with lowered voltage is replaced with a new one in the state shown in FIG. 8 where the film winding speed is low, the switching mechanism can be set into the state shown in FIG. 7 by rotating the cam gear 38 through the minimum angle (that is, in the minimum period of time). Specifically, in the present embodiment, the period of time required for the second motor M2 to rotate the cam gear 38 from one phase to its adjacent phase is about 60 ms, and the period of time required to rotate the cam gear 38 from one phase to a phase adjacent to the adjacent one is about 120 ms.

Accordingly, if the film or the battery is replaced with a new one(s) during photographing, the effects of the replacement can be minimized.

In the above description of FIGS. 7 to 9, the first and second switching levers 18 and 19 are driven (phase indexing) by rotation of the second motor M2 of a lower output in the first direction, to thereby select whether the rotation of the relatively large-sized first motor M1 of a higher output is to be transmitted via the first planetary clutch or via the second planetary clutch. In the phase indexing state shown in FIGS. 7 and 8, the first motor M1 is rotated in the first direction to mesh the planetary gear 6 with the gear 44 in order to carry out mirror pop-down driving and shutter charge driving (FIGS. 7B, 7C, 8B, and 8C), whereas the first motor M1 is rotated in the second direction to cause the planetary gear 6 to wind the film at a high speed or cause the planetary gear 8 to wind the film at a low speed (FIGS. 7D, 7E, 8D, and 8E).

Thus, a normal series of photographing (release) operations, that is, the mirror popping-up operation, mirror popping-down and shutter charging operation, and film winding operation are completed by a series of rotations of the first motor M1, i.e. the rotation in the first direction, the rotation in the second direction, and the rotation in the first direction in the mentioned order. Furthermore, as described below, by setting the stopping phase (phase indexing for the switching levers 18 and 19) for the rotation of the second motor M2 in the first direction based on the power supply voltage level, whether the film is to be wound at a high speed or at a low speed can be selected.

Further, for the film rewinding operation, if the second motor M2 is rotated in the first direction to switch the device to the state shown in FIG. 9A and the first motor M1 is then rotated in the first direction, then the film can be rewound by rotation of the first motor M1 in the second direction as shown in FIG. 9B.

Now, the electronic flash popping-up operation and manual popping-down operation will be described with reference to FIG. 10.

Figure 10A:
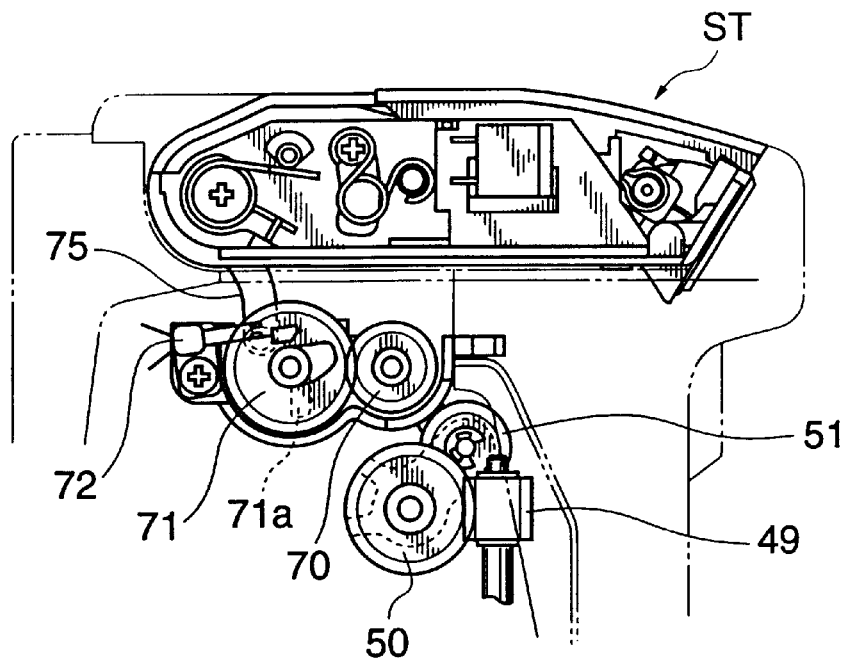
FIGS. 10A to 10D are views useful in explaining the operation of the electronic flash popup mechanism of FIG. 5.
Figure 10B:
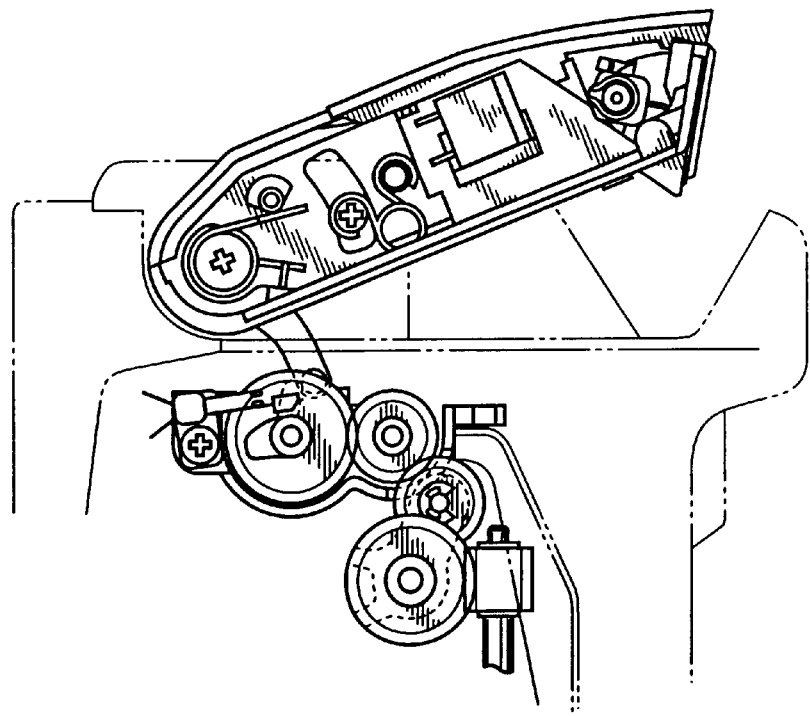

When the second motor rotates in the second direction with the electronic flash unit ST located in the housed position as shown in FIG. 10A, the cam gear 71 is rotated clockwise, and then the cam 71a of the cam gear 71 pushes the pin 75a of the lever 75 to push up the electronic flash unit ST toward the light emission enabled position against the force of the toggle spring 80, as shown in FIG. 10B.

At this time, since the urging force of the torsion spring 78 is set to be always greater than that of the toggle spring 80 as described previously, the pushup of the pin 75a is not absorbed, so that the electronic flash unit ST is displaced by an amount corresponding to the displacement angle of the lever 75.

Figure 10C:
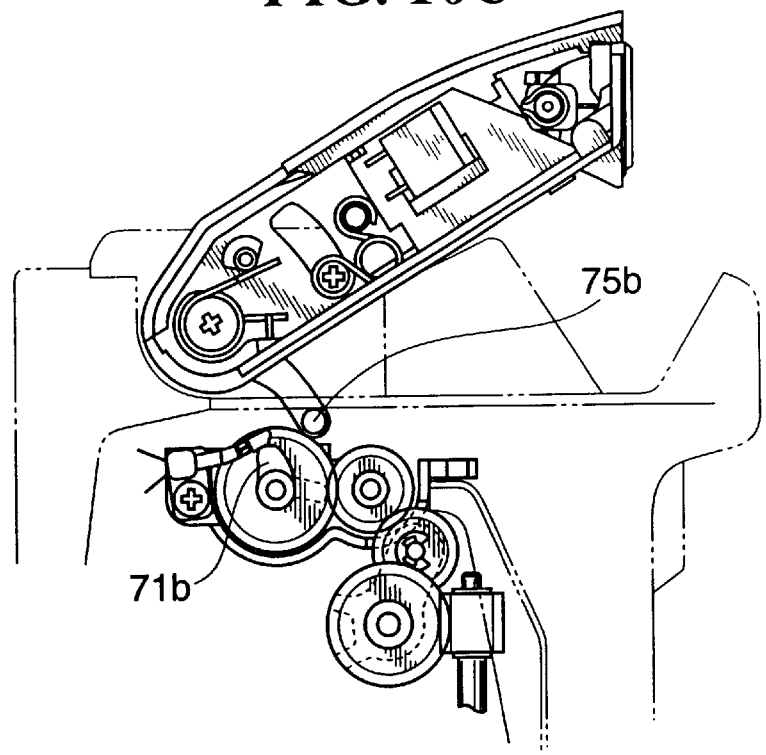

The area where the urging direction of the toggle spring 80 is inverted is set to an intermediate point in an area where the cam 71a of the cam gear 71a pushes the pin 75a of the lever 75, so that beyond the inversion area, the drag force of the toggle spring 80 causes the electronic flash unit ST to be pushed up toward the light emission enabled position. Thus, midway during this operation, the cam gear 71 becomes stopped from undergoing a load required to push up the electronic flash unit ST, and is further rotated clockwise to cause the cam 71b to turn the leaf switch 72 on as shown in FIG. 10C, thus switching an output signal from the leaf switch 72 from High to Low.

Figure 10D:
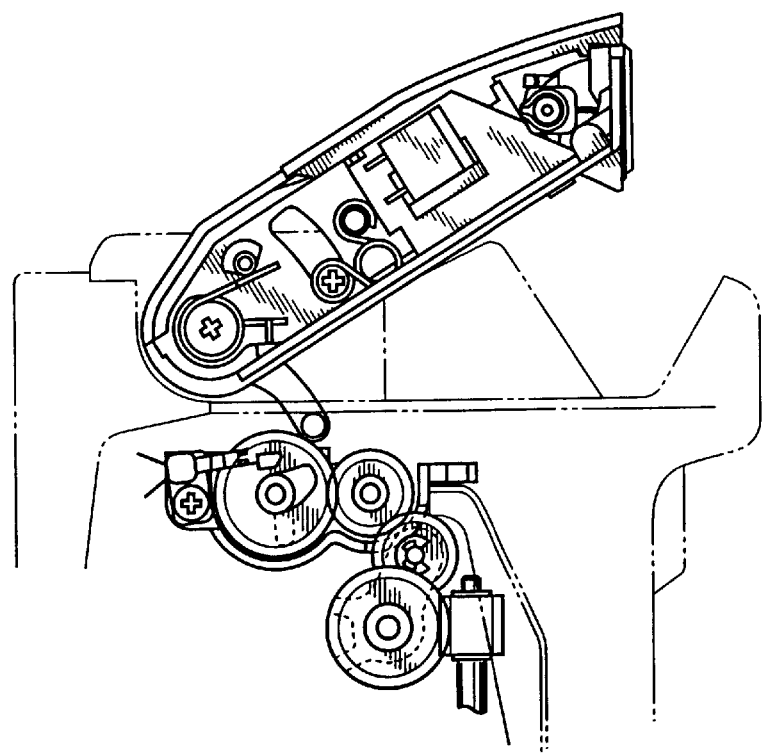

Subsequently, the cam gear 71 further rotates clockwise to cause the cam 71b of the cam gear 71 to turn the leaf switch 72 off as shown in FIG. 10D, thus switching the output signal from the leaf switch 72 from Low to High.

Thus, when the popped-up state of the electronic flash unit ST is detected by an electronic flash popup detecting switch SWSTUP (see FIG. 12), the second motor M2 is stopped to complete the operation of popping up the electronic flash unit ST to the light emission enabled position.

Then, when the photographer manually pushes down the electronic flash unit ST located in the light emission enabled position as shown in FIG. 10D, after the inversion area of the toggle spring 80 is exceeded, the drag force of the toggle spring 80 causes the electronic flash unit ST to be popped down to the housed position, whereby the camera returns into the state shown in FIG. 10A. At this time, the cam 71a of the cam gear 71 has already receded from the pivoting range of the pin 75a of the lever 75, so that no drag force, as otherwise absorbed by the torsion spring 78, is exerted.

Further, in the state shown in FIG. 10A, when the photographer manually pulls up the electronic flash unit ST, after the inversion area of the toggle spring 80 is exceeded, the drag force of the toggle spring 80 causes the electronic flash unit ST to popped up to the light emission enabled position as shown in FIG. 10D, whereby the electronic flash popped-up state is detected by the electronic flash popup detecting switch SWSTUP, similarly to the above described case.

In this manner, the electronic flash popup driving mechanism according to the present embodiment is constructed to deal not only with the automatic popping-up operation based on the driving by the second motor M2 but also with the photographer's manual popping-up operation.

In the present embodiment, the driving load exerted on the electronic flash popup driving system is lighter than that exerted on the mirror and shutter driving system, the film winding driving system, or the film rewinding driving system.

Now, a description will be given of a case where the electronic flash unit ST is driven to pop up by rotation of the second motor M2 in the second direction with the electronic flash unit ST still held in the housed position by the photographer's fingers or the like.

Figure 11A:
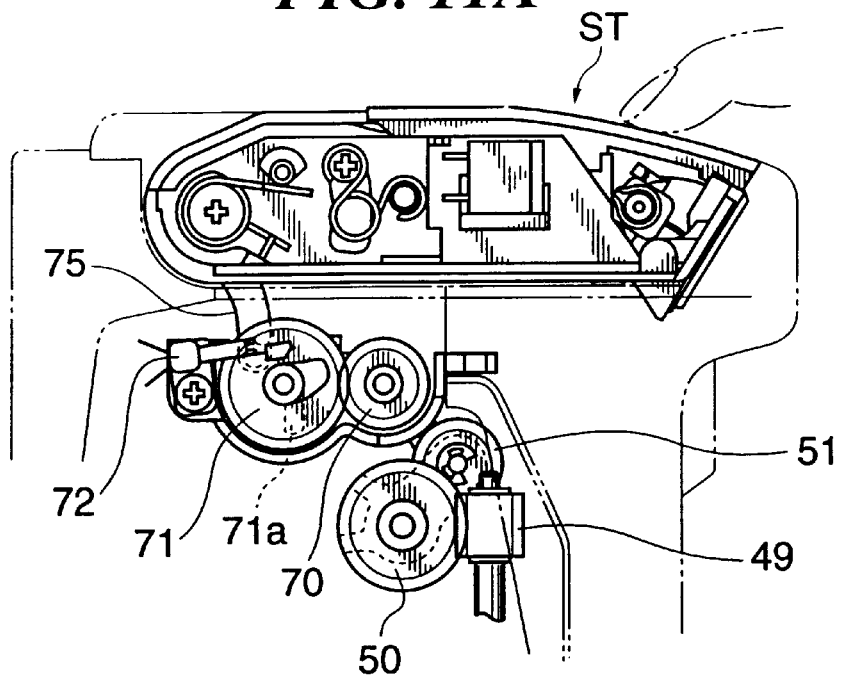
FIGS. 11A to 11C are views useful in explaining the operation of the electronic flash popup mechanism of FIG. 5.
Figure 11B:
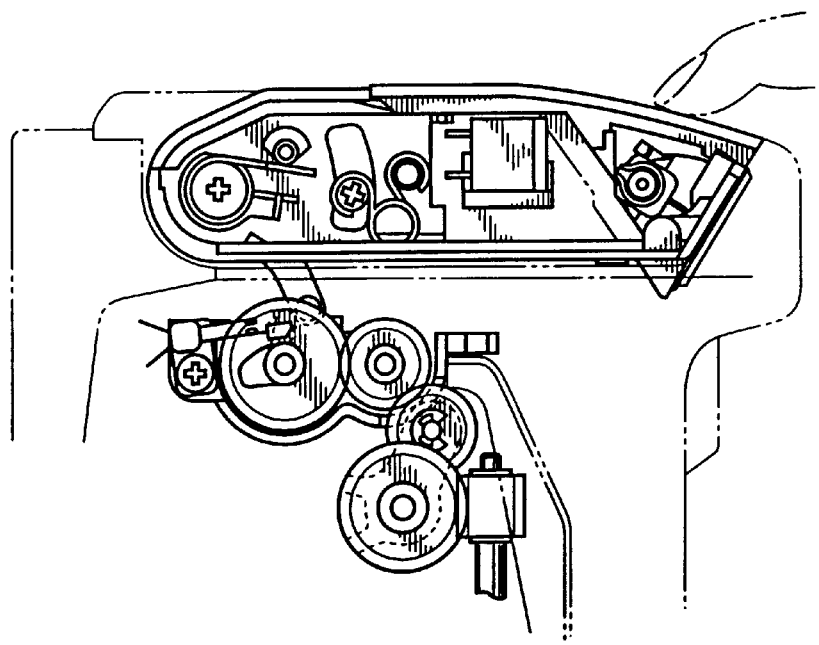

First, in a state shown in FIG. 11A, when the second motor M2 is rotated in the second direction, the cam gear 71 rotates clockwise, and the cam 71a of the cam gear 71 thus attempts to push up the pin 75a. Since, however, the electronic flash unit ST is held in the housed position, the torsion bar 78 absorbs the possible displacement angle of the lever 75 as shown in FIG. 11B.

Figure 11C:
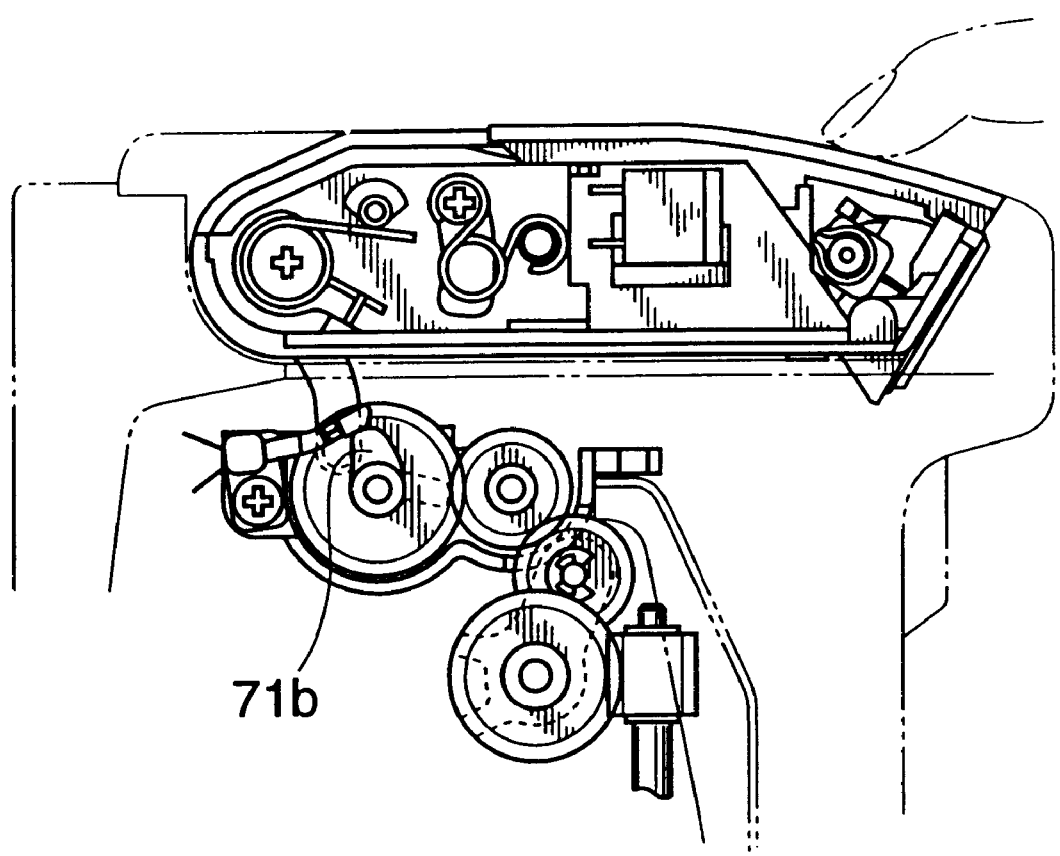

Subsequently, the cam gear 71 continues to rotate clockwise to cause the cam 71b of the cam gear 71 to turn the leaf switch 72 on as shown in FIG. 11C, thus switching the output signal therefrom from High to Low.

As the cam gear 71 further continues to rotate clockwise, the device returns into the state shown in FIG. 11A, and the cam 71b of the cam gear 71 turns the leaf switch 72 off to switch the output signal therefrom from Low to High. The popping-up operation of the electronic flash unit electronic flash ST, however, cannot be ascertained by the popup detecting switch SWSTUP, so that the same operation is repeated further twice, the second motor M2 is subsequently stopped, and an error in the operation of popping up the electronic flash unit ST to the light emission enabled position is then indicated on an external display panel or the like of the camera.

Figure 12:
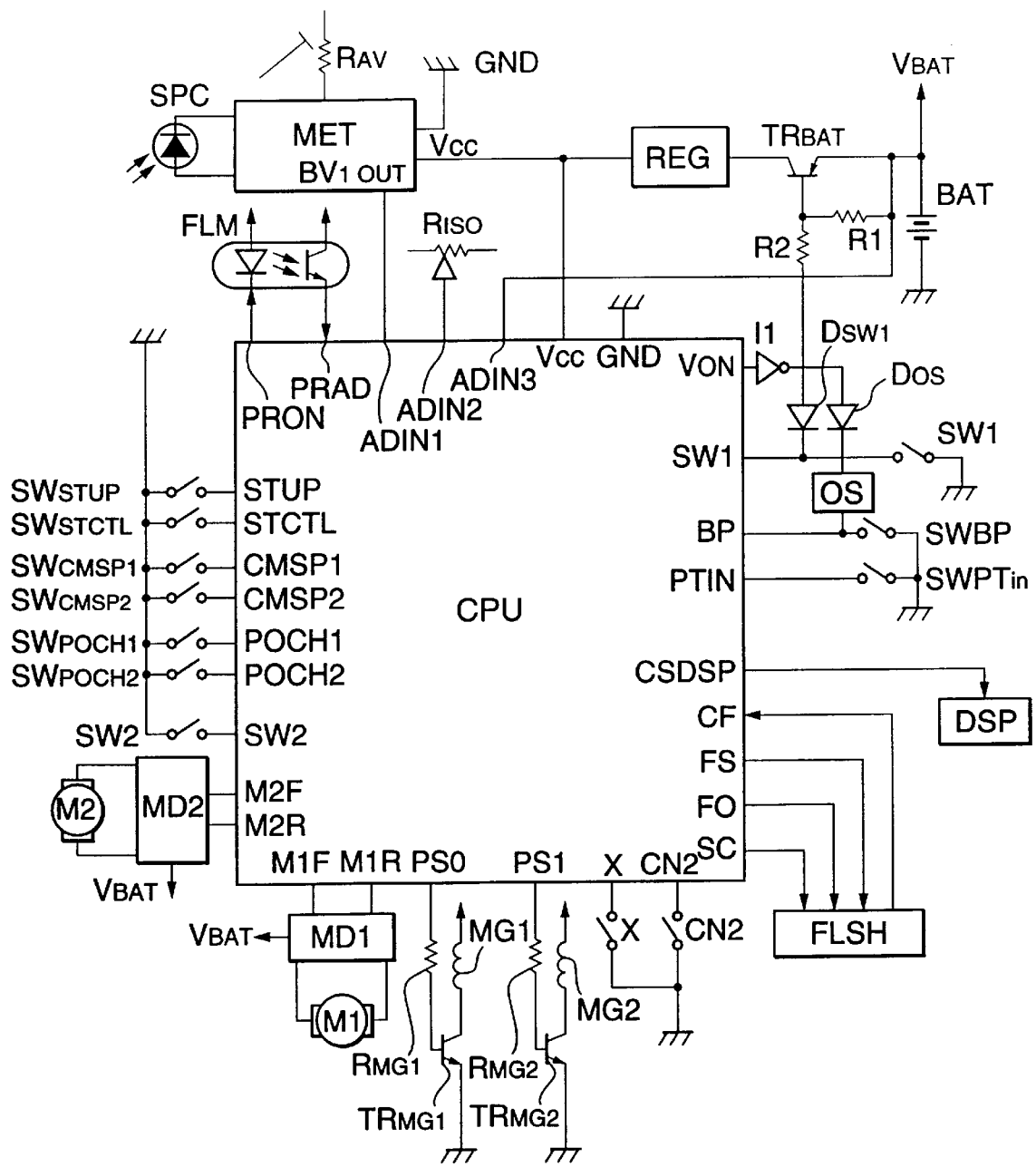
FIG. 12 is a block diagram showing the construction of an electric circuit of the camera.

Next, a control circuit of the camera will be described with reference to FIG. 12. In the figure, reference character CPU denotes a microcomputer, and BAT denotes a battery. Reference character SW1 denotes a photographing preparation switch which is turned on to turn the power supply on in response to a first stroke operation of a release button, not shown, and which also serves to start a light measuring operation or a focus detecting operation for a photographing lens. When the photographing preparation switch SW1 is turned on, this causes a transistor TRBAT to be turned on via a diode DSW1 and a resistor R2, thereby starting power supply from the battery BAT to various circuits. Further, an output from the photographing preparation switch SW1 is supplied to an input port SW1 of the microcomputer CPU.

The transistor TRABAT is also turned on via a diode DOS and the resistor R2 by an operation of a one-shot circuit OS for a certain period of time responsive to turning-on of a rear-cover switch SWBP (closure of a rear cover), hereinafter referred to. The purpose of the turning-on of the transistor TRBAT associated with the closure of the rear cover is to supply power to the microcomputer CPU for film loading when a film is loaded in the camera, followed by closing the rear cover, not shown.

In this connection, the transistor TRBAT is kept on via an inverter I1 and the resistor R2 as long as the microcomputer CPU is operative with an output port Von thereof set to High.

Further, reference character REG denotes a regulator connected to a collector output of the transistor TRBAT to supply a stable fixed voltage Vcc to various circuits (in the figure, the fixed voltage Vcc is supplied to an input port Vcc of the microcomputer CPU and to an analog circuit MET for performing light measuring operations.

The light measuring analog circuit MET is constructed to perform a BV-AV operation using subject brightness information (BV) determined based on an output from a light measuring sensor SPC and RAV corresponding to preset aperture value information (AV) and input results of the BV-AV operation to an AD conversion input port ADIN1 of the microcomputer CPU as an output BV1OUT.

Reference character RISO denotes a variable resistor corresponding to film sensitivity information SV, which inputs the information to an input port ADIN2 of the microcomputer CPU. Reference character VBAT denotes the battery voltage of the battery BAT, which is supplied to an input port ADIN3 of the microcomputer CPU and to a transistor bridge circuit MD, described later.

Reference character SWPTin denotes a film loading detecting switch composed, for example, of a leaf spring arranged in a cartridge chamber of the camera. The film loading detecting switch SWPTin is turned on when a film cartridge is loaded into the cartridge chamber to push the leaf spring, and supplies an output to an input port PTIN of the microcomputer CPU.

Reference character SWBP denotes a rear-cover switch that is turned on when the rear cover is closed and turned off when the latter is opened. An output from the rear-cover switch SWBP is supplied to an input port BP of the microcomputer CPU and the one-shot circuit OS.

Reference numerals SWCMSP1 and SWCMSP2 denote switches corresponding to phase patterns CMSP1 and CMSP2, respectively, on the phase substrate 61 and which are turned on and off in accordance with the sliding of the brush 56 over these phase patterns. Outputs from the switches SWCMSP1 and SWCMSP2 are supplied to input ports CMSP1 and CMSP2, respectively, of the microcomputer CPU. The relationship between the state of the mechanism and the output signals (CMSP1, CMSP2) from the switches SWCMSP1 and SWCMSP2 is as described previously.

Reference characters SWPOCH1 and SWPOCH2 denote switches corresponding to phase patterns POCH1 and POCH2, respectively, on the phase substrate 40 and which are turned on and off in accordance with the sliding of the brush 39 over these phase patterns. Outputs from the switches SWPOCH1 and SWPOCH2 are supplied to input ports POCH1 and POCH2, respectively, of the microcomputer CPU. The relationship between the state of the mechanism and the output signals (POCH1, POCH2) from the switches SWPOCH1 and SWPOCH2 is as described previously.

Reference character SWSTUP denotes an electronic flash popup detecting switch for detecting whether the electronic flash unit ST has been popped up to the light emission enabled position; the electronic flash popup detecting switch SWSTUP is composed of a leaf switch. When the electronic flash unit ST is in the light emission enabled position, the electronic flash popup detecting switch supplies an output to an input port STUP of the microcomputer CPU.

Reference character SWSTCTL denotes the leaf switch 72 for detecting the phase of the cam 71b of the cam gear 71 that drives the electronic flash unit ST to the light emission enabled position, and for supplying an output to an input port STCTL of the microcomputer.

Reference character FLM denotes the photo reflector 26. When the photo reflector 26 is supplied with a signal from an output port PROM of the microcomputer CPU, a floodlight section thereof emits infrared light and a light receiving section thereof detects light reflected from the film surface and supplies a detection signal (High) to an input port PRAD of the microcomputer CPU. The photo reflector 26 is arranged opposite the perforations in the film, and when the infrared light is transmitted through the perforations and does not return to the light receiving section, detection signals Low are output, so that the photo reflector 26 counts these detection signals to detect the number of passed perforations, thus determining the amount of movement of the film.

Reference character DSP denotes a display driving circuit for displaying various information such as photographing information or warnings, in accordance with signals supplied from an output port CSDSP of the microcomputer CPU.

Reference numeral SW2 denotes a release switch that is turned on upon a second stroke operation of the release button to permit a photographing operation to be performed. An output from the release button SW2 is supplied to an input port SW2 of the microcomputer CPU.

Reference numerals MD1 and MD2 denote transistor bridge circuits that control the first and second motors M1 and M2, respectively, as instructed by the microcomputer, so as to rotate them in the first or second direction. The transistor bridge circuit MD1 is connected to output ports M1F and M1R, and the transistor bridge circuit MD2 is connected to output ports M2F and M2R.

Reference numeral MG1 denotes a front-curtain magnet for keeping a front curtain of the shutter unit S in a charged state. The front-curtain magnet MG1 keeps the front curtain in the charged state while it is supplied with power and causes the front curtain to start traveling when the power supply thereto is cut off. Specifically, when an output port PS0 of the microcomputer CPU is set to Low, a transistor TRMG1 is turned off via a resistor RMG1 to cut off power supply to the magnet MG1.

Reference numeral MG2 denotes a rear-curtain magnet for keeping a rear-curtain of the shutter unit S in a charged state. The rear-curtain magnet MG2 keeps the rear curtain in the charged state while it is supplied with power and causes the rear curtain to start traveling when the power supply thereto is cut off. Specifically, when an output port PS1 of the microcomputer CPU is set to Low, a transistor TRMG2 is turned off via a resistor RMG2 to cut off power supply to the magnet MG2.

Reference character FLSH denotes an electronic flash circuit including a main capacitor, a xenon tube, and others and to which a light emitting signal FS, a light emission stopping signal FO, and a charge starting signal SC are supplied from the output ports of the microcomputer CPU. Further, the electronic flash circuit FLSH supplies a charge completing signal CF to an input port of the microcomputer CPU.

Reference character X denotes a switch that is turned on when the front curtain of the shutter unit S completes traveling, to supply a signal to an input port X of the microcomputer CPU. Reference numeral CN2 denotes a switch that is turned on when the rear curtain of the shutter unit S completes traveling, to supply a signal to an input port CN2 of the microcomputer CPU.

Now, the operation of the above described control circuit will be described with reference to flow charts of FIGS. 13 to 20. Pairs of steps shown by numbers in circles between FIGS. 13 and 14, between FIGS. 15 and 16, and between FIGS. 19 and 20 each indicate that they are linked together.

Upon receiving power supply, the microcomputer CPU executes a program to execute power supply retaining control by setting the output port Von to High, while keeping the transistor TRBAT on.

Figure 13A:
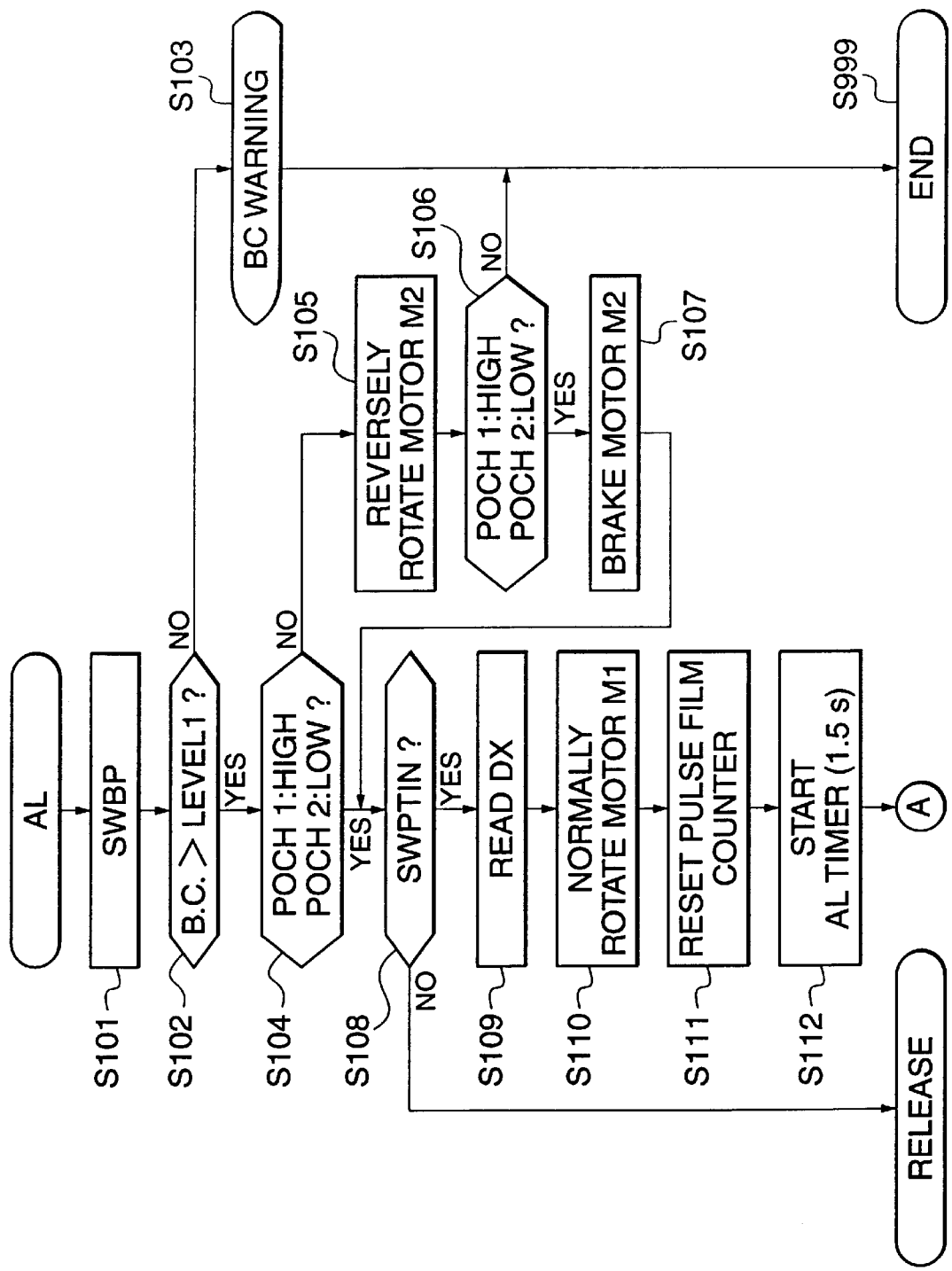
FIGS. 13A and 13B is a flow chart of a film automatic loading process executed by a CPU shown in FIG. 12.
Figure 13B:
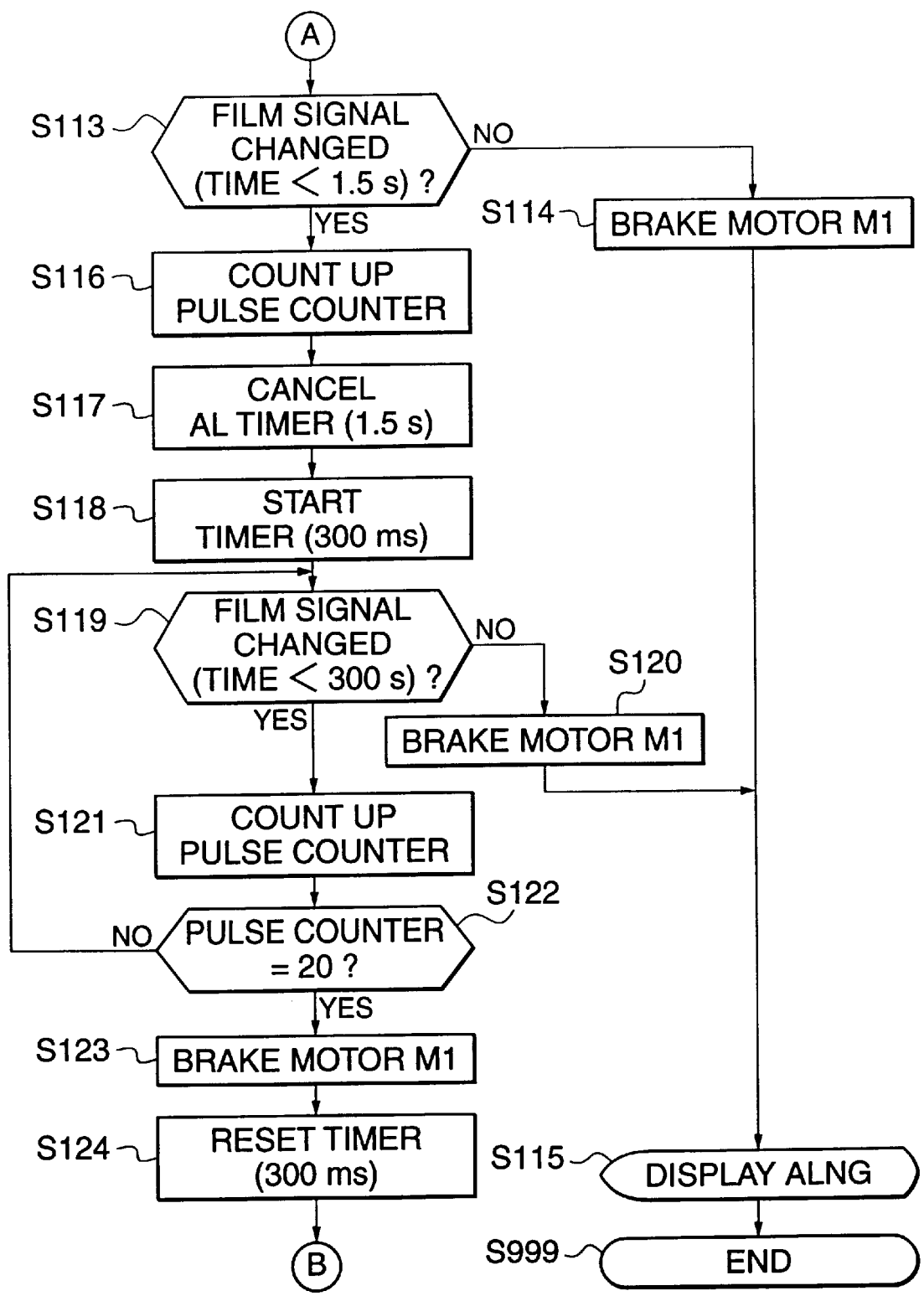
Figure 14:
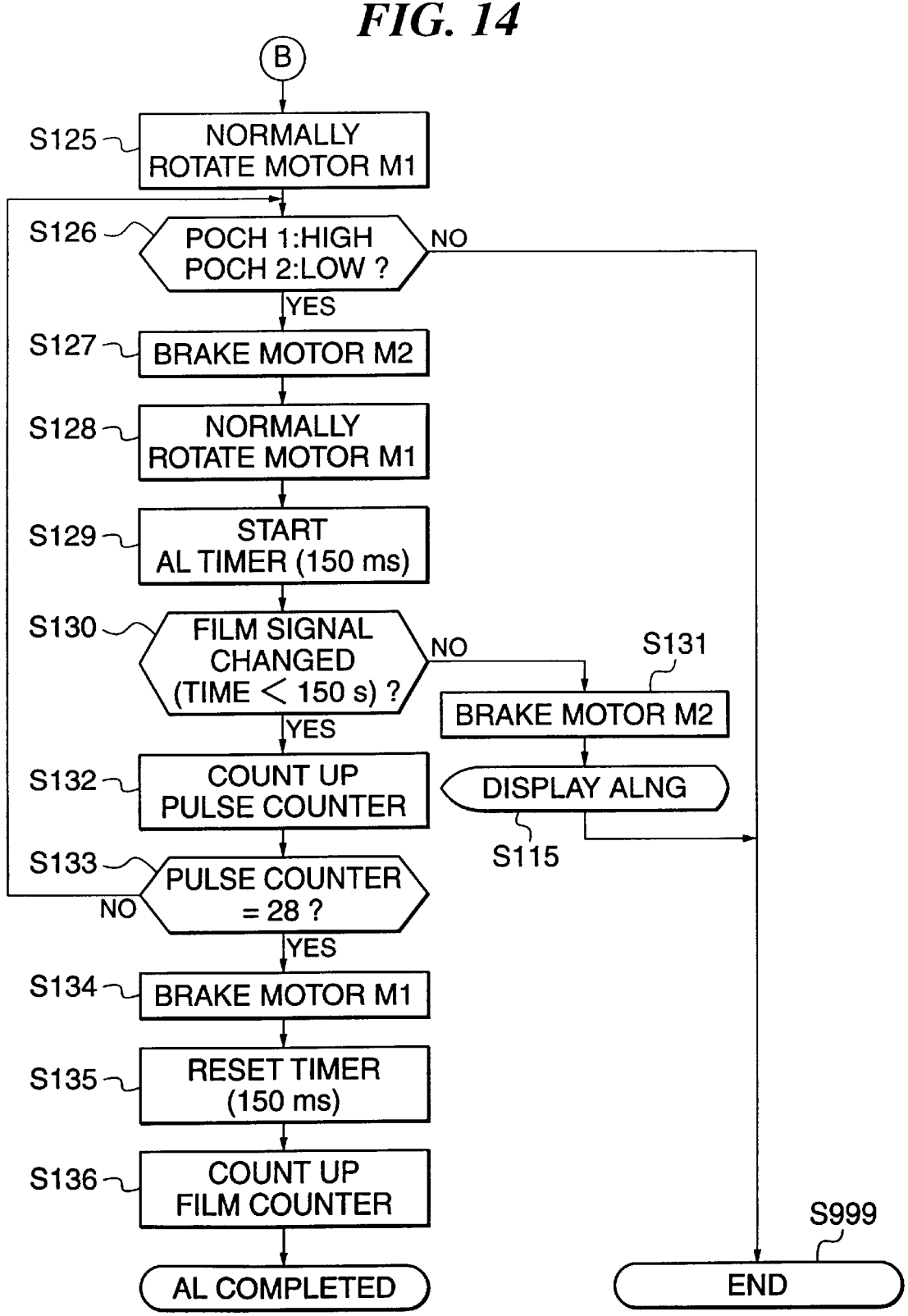
FIG. 14 is a flow chart of the film automatic loading process executed by the CPU shown in FIG. 12.

In FIGS. 13A and 13B, the process starts with an automatic film loading (hereinafter referred to as "AL") routine [AL].

At a step S101, when the rear cover is closed so that the rear cover switch SWBP is turned on, the microcomputer CPU detects this, and the process proceeds to a step S102.

At the step S102, the microcomputer CPU checks the voltage VBAT of the battery BAT based on an analog input to the input port ADIN3 (AD conversion input port). An AD converter in the microcomputer CPU subjects the voltage VBAT to AD conversion. When the voltage is equal to or lower than a predetermined level LELVEL1 corresponding to a voltage at or below which the operation of the camera is inhibited, the process proceeds to a step S103 because the camera may malfunction at such low a voltage. When the voltage exceeds the predetermined level LEVEL1, the process proceeds to a step S104.

At the step S103, the microcomputer CPU outputs a serial signal through the output port CSDSP to the display driving circuit DSP to thereby display a warning indicative of a battery voltage drop. Then, the process proceeds to a step S999.

At the step S999, a [STOP] routine is executed such that the output port Von is set to Low to turn off the transistor TRBAT and further the regulator REG is inactivated to turn off the circuit system power supply. Further, the CPU is set to a standby mode for a predetermined time period. Typically, the power supply Vcc is kept off while the microcomputer CPU is in the standby mode.

The power supply Vcc, however, may remain on even after the standby mode has been terminated. This occurs when the transistor TRBAT is on due to a factor different from the output from the output port Von, specifically, when the one-shot circuit OS is operating due to the turning-on of the photographing preparation (power supply) switch SW1 or the rear cover switch SWBP.

At a step S104, the microcomputer CPU determines whether the switching mechanism is in the low-speed winding state shown in FIG. 8, based on the phase of the cam gear 38. With the signal indicative of POCH1: High, POCH2: Low, the process proceeds to a step S108, and otherwise the process proceeds to a step S105.

At the step S105, the microcomputer CPU rotates the second motor M2 in the first direction so as to set the switching mechanism into the low-speed winding state shown in FIG. 8 while the first motor M1 is rotating in the second direction.

Here, the microcomputer CPU controls the rotation of the second motor M2 by setting the output ports M2F and M2R to "H" and "L", respectively, if the motor is to rotate in the first direction, and by setting the output ports M2F and M2R to "L" and "H", respectively, if the motor is to rotate in the second direction. Further, the microcomputer CPU brakes the second motor M2 by setting both the output ports M2F and M2R to "H".

At a step S106, if the microcomputer CPU determines that rotation of the cam gear 38 has set the phase of the phase substrate 40 to provide the signal indicative of POCH1: High, POCH2: Low to thereby set the switching mechanism into the low-speed winding state shown in FIG. 8, the process proceeds to a step S107. If the signal indicative of POCH1: High, POCH2: Low is not established even after the lapse of a predetermined period of time (for example, 1 sec.), the process proceeds to the step S999 to execute the STOP routine.

At the step S107, when the signal is established at the step S106, the microcomputer CPU brakes the second motor M2, and the process proceeds to a step S108.

At the step S108, the microcomputer CPU determines whether the film cartridge has been loaded in the camera, based on the output from the film loading detection switch SWPTIN. If the film cartridge has been loaded, the process proceeds to the step S103, and otherwise the process proceeds to a [RELEASE] routine. The [RELEASE] routine will be described later.

At a step S109, the microcomputer CPU reads the ISO sensitivity of a DX code on the film cartridge through an output from the variable resistor RISO input to the input port ADIN2 (AD conversion input), and stores this sensitivity.

At a step S110, the microcomputer CPU rotates the first motor M1 in the second direction to wind the film at a low speed, and the process proceeds to a step S111.

Here, the microcomputer CPU controls the first motor M1 by setting the output ports M1F and M1R to "H" and "L", respectively, if the motor is to rotate in the first direction, and by setting the output ports M1F and M1R to "L" and "H", respectively, if the motor is to rotate in the second direction. Further, the microcomputer CPU brakes the second motor M1 by setting both the output ports M1F and M1R to "H".

At a step S111, the microcomputer CPU counts the perforations in the film through the photo reflector 26 (FLM), and resets a pulse counter for storing the count in an EEPROM in the microcomputer CPU and a film counter for showing the number of photographing frames in the film.

At a step S112, the microcomputer CPU sets an internal timer to 1.5 sec. for use as an AL timer.

At a step S113, the microcomputer CPU causes the photo reflector 26 (FLM) to emit light through the output port PRON, and continues to rotate the first motor M1 in the second direction until the first perforation of the film through the input port PRAD is detected. In this case, if the detection of the first perforation, that is, a change in a film signal from the photo reflector 26 fails to occur within 1.5 sec. as clocked by the AL timer, the process proceeds to a step S114. If it occurs within 1.5 sec. as clocked by the AL timer, the process proceeds to a step S116.

At the step S114, the microcomputer CPU brakes the first motor M1.

At a step S115, the microcomputer outputs a serial signal to the display driving circuit DSP through the output port CSDSP to thereby display a warning indicating that the AL is disabled. Then, the process proceeds to the step S999 to execute the [STOP] routine.

At the step S116, the microcomputer CPU counts up the pulse counter of the internal EEPROM.

At a step S117, the microcomputer CPU resets the internal timer to 1.5 sec.

At a step S118, the microcomputer CPU newly sets the internal timer to 300 msec.

At a step S119, as in the step S113, if the next perforation is not detected within 300 msec. clocked by the internal timer, that is, the film signal from the photo reflector 26 fails to change within 300 msec. as clocked by the internal timer, the process proceeds to a step S120. If the signal changes within 300 msec. as clocked by the timer, the process proceeds to a step S121.

At the step S120, the microcomputer CPU brakes the first motor M1. The process then proceeds to the step S115 to cause the display to show that the AL is disabled.

At the step S121, the microcomputer CPU counts up the pulse counter of the internal EEPROM.

At a step S122, the microcomputer CPU determines whether or not the pulse counter of the internal EEPROM has reached 20. If the counter has reached 20, the process returns to the step S119. If the counter has reached 20, the process proceeds to a step S123.

At the step S123, the microcomputer CPU brakes the first motor M1.

At a step S124, the microcomputer CPU resets the internal timer to 300 msec.

At a step S125, the microcomputer CPU rotates the second motor M2 in the first direction so as to set the switching mechanism into the high-speed winding state shown in FIG. 7 while the first motor M1 is rotating in the second direction.

At a step S126, if the microcomputer CPU determines that rotation of the cam gear 38 has set the phase of the phase substrate 40 to provide the signal indicative of POCH1: Low, POCH2: Low to thereby set the switching mechanism in the high-speed winding state shown in FIG. 7, the process proceeds to a step S127. If the signal indicative of POCH1: Low, POCH2: Low is not established even after the lapse of a predetermined period of time (for example, 1 sec.), the process proceeds to the step S999 to execute the STOP routine.

At the step S127, when the signal is established at the step S126, the microcomputer CPU brakes the second motor M2, and the process proceeds to a step S128.

At the step S128, the microcomputer CPU rotates the first motor M1 in the second direction to wind the film at a high speed, and the process proceeds to a step S129.

At the step S129, the microcomputer CPU newly sets the internal timer to 150 msec.

At a step S130, as in the steps S113 and S119, if the microcomputer CPU fails to detect the next perforation within 150 msec. clocked by the internal timer, that is, the film signal from the photo reflector 26 fails to change within 150 msec. as clocked by the internal timer, the process proceeds to a step S131. If the signal changes within 150 msec. as clocked by the timer, the process proceeds to a step S132.

At the step S131, the microcomputer CPU brakes the first motor M1. The process then proceeds to the step S115 to cause the display to show that the AL is disabled.

At the step S132, the microcomputer CPU counts up the pulse counter of the internal EEPROM.

At a step S133, the microcomputer CPU determines whether or not the pulse counter of the EEPROM in the microcomputer CPU has reached 28. If the counter has not reached 28, the process returns to the step S126. If the counter has reached 28, the process proceeds to a step S134.

At the step S134, the microcomputer CPU brakes the first motor M1.

At a step S135, the microcomputer CPU resets the internal timer to 150 msec.

At a step S136, the microcomputer CPU counts up the film counter of the internal EEPROM to write 1 thereto, thus completing the AL.

Figure 15:
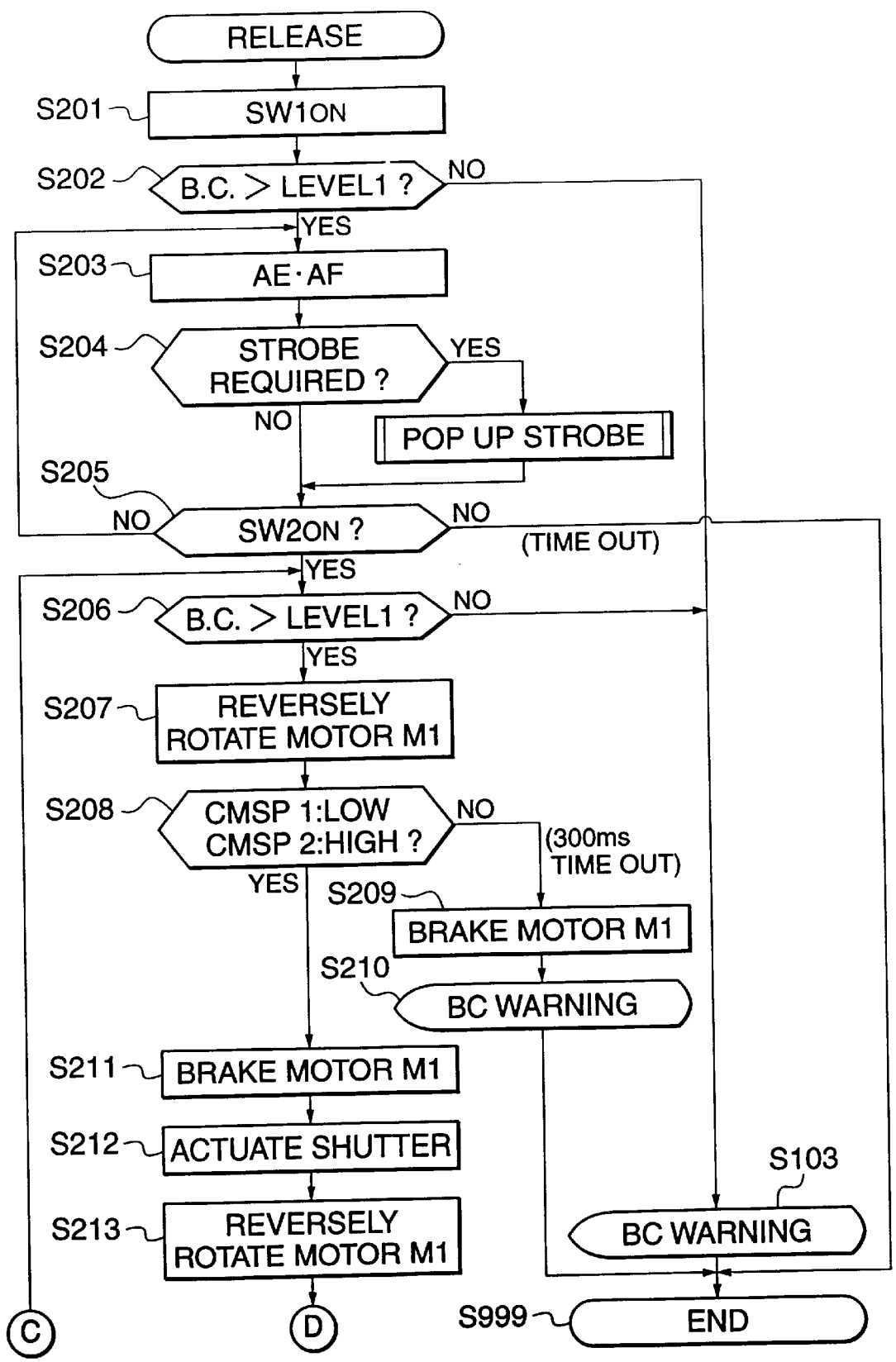
FIG. 15 is a flow chart of a release process executed by the CPU shown in FIG. 12.
Figure 16:
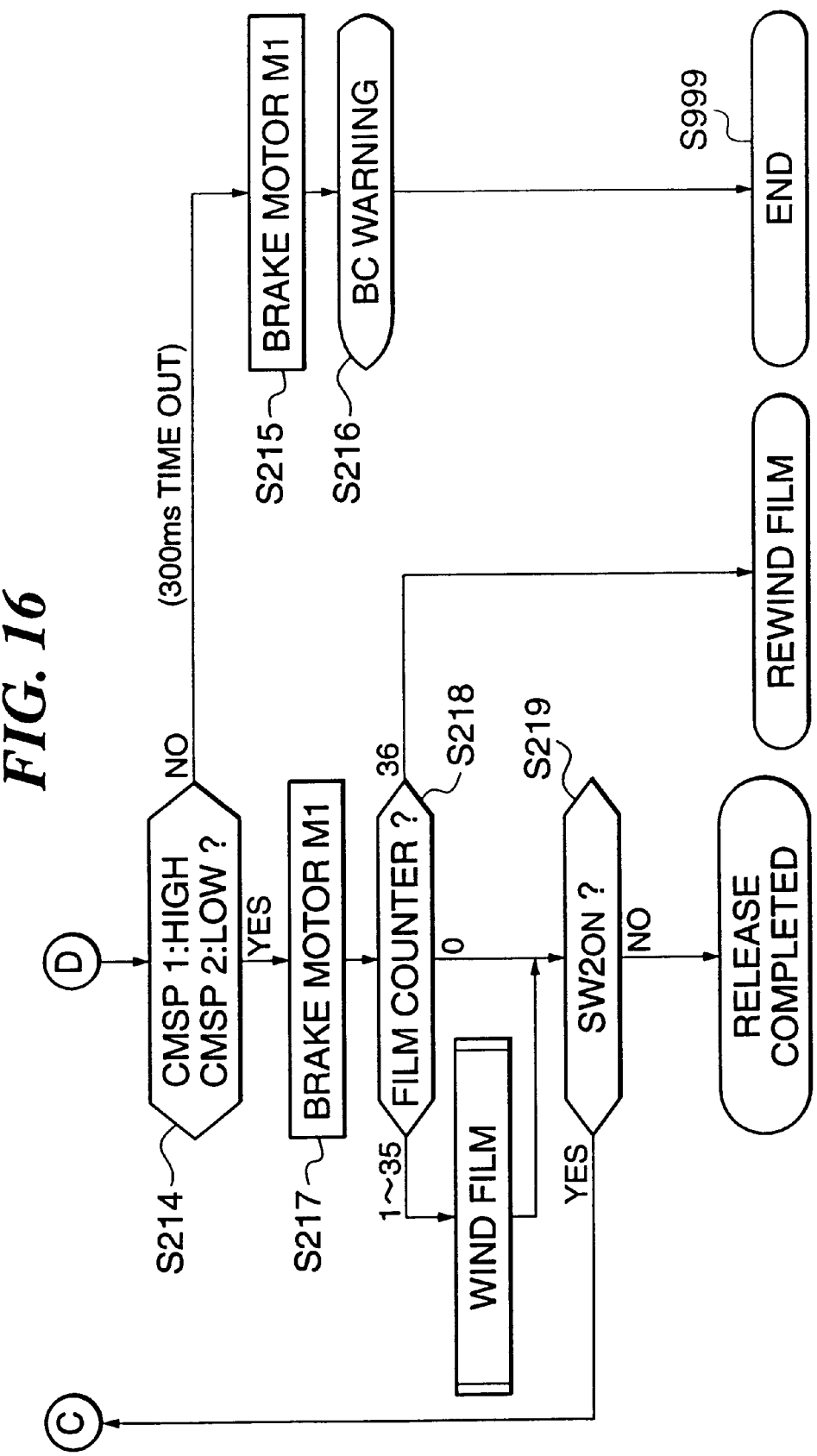
FIG. 16 is a flow chart of a continued part of the release process of FIG. 15.

Next, the [RELEASE] routine for photographing will be described with reference to FIGS. 15 and 16.

At a step S201, when the microcomputer CPU determines that the switch SW1 has been turned on by subjecting the release button, not shown, to the first stroke operation, the process proceeds to a step S202.

At the step S202, as in the step S102, the microcomputer CPU checks the power supply voltage. If the voltage is equal to or lower than the predetermined level LEVEL1 (operation inhibiting voltage), the process proceeds to the step S103. If the voltage exceeds the predetermined level LEVEL1, the process proceeds to a step S203.

At the step S203, the microcomputer CPU performs a light measuring operation based on an output from the light measuring sensor SPC. Specifically, the microcomputer subjects an analog signal from the output port BV1OUT of the light measuring operation circuit MET, to AD conversion to obtain a digital value ADIN1, which is then stored in a register BV1 (BV1=ADIN1). A value BV-AV as an apex value is stored in the register BV1.

Further, the ISO sensitivity of the film is stored in the register SV (SV=ADIN2) at the step S109.

Moreover, a shutter time is obtained based on the information stored in the registers BV1 and SV (TV=BV1+SV). The contents of the register TV are the TV of the apex value.

At a step S204, if the microcomputer CPU determines that the value BV1 obtained at the step S203 is smaller than a predetermined value, that is, the brightness is insufficient, then the process proceeds to a [ELECTRONIC FLASH POPUP] routine in order to execute electronic flash light emission. If the value BV1 is larger than the predetermined value, that is, the brightness is sufficient, the process proceeds to a step S205. The [ELECTRONIC FLASH POPUP] routine will be described later.

At the step S205, when the microcomputer CPU determines that the switch SW2 has been turned on by subjecting the release button, not shown, to the second stroke operation, the process proceeds to a step S206. If the switch SW2 has not been turned on and at the same time the switch SW1 is on or if a predetermined period of time (for example, 6 sec.) has not elapsed after the switch SW1 was turned on, then the process returns to the step S203. After the predetermined period of time has elapsed, the process proceeds to the [STOP] routine.

At the step S206, as in the step S202, the microcomputer CPU checks the power supply voltage. If the voltage is equal to or lower than the predetermined level LEVEL1, the process proceeds to the step S103. If the voltage exceeds the predetermined level LEVEL1, the process proceeds to a step S207.

At the step S207, the microcomputer CPU rotates the first motor M1 in the first direction, and rotates the cam gears 55 and 57 to clear the mirror popping-up and shutter charging cancel operations.

At a step S208, if the microcomputer CPU determines that rotation of the cam gear 55 has set the phase of the phase substrate 61 to provide the signal indicative of CMSP1: Low, CMSP2: High to thereby index the phase for cancellation of mirror popping-up and shutter charging, then the process proceeds to a step S211. If this cannot be detected within a predetermined period of time (for example, 300 msec.), the process proceeds to a step S209.

At the step 209, the microcomputer CPU brakes the first motor M1.

At a step S210, the microcomputer CPU displays a warning indicating that the mirror popping-up operation is disabled, and the process then proceeds to the step S999 to execute the [STOP] routine.

At the step S211, when the signal is established at the step S208, the microcomputer CPU brakes the first motor M1.

At a step S212, the microcomputer CPU converts the apex value obtained at the step S203 into an actual shutter time (actual-time expansion).

The microcomputer CPU then sets the output port PS0 to "L" to cut off the power supply to the magnet MG1 to start the front curtain travelling. Thus, the front curtain travels to expose the film.

Subsequently, the actual shutter time is counted, and once the actual-time counting operation is completed, the microcomputer CPU sets the output port PS1 to "L" and cuts off the power supply to the magnet MG2 to start the rear curtain travelling. Thus, the rear curtain travels to complete the exposure of the film.

When the rear curtain completes traveling and the switch CN2 is turned on, the microcomputer CPU sets the output ports PS0 and PS1 to "H" to supply power to both the magnets MG1 and MG2.

At this time, when electronic flash light emission is determined to be required at the step S204 and if the electronic flash unit ST has been popped up to the light emission enabled position, and the electronic flash popup detecting switch SWSTUP is on, then the microcomputer CPU sets the shutter time to a shutter tuning time. Once the front curtain completes traveling and when the switch X is turned on, the microcomputer CPU supplies a light emission starting signal to the electronic flash circuit FLSH through the output port FS to cause the electronic flash to emit light. Then, in response to an output from a dimming circuit, not shown, the microcomputer CPU supplies a light emission stopping signal to the electronic flash circuit FLSH through the output port FO to stop the electronic flash light emission.

At a step S213, the microcomputer CPU rotates the first motor M1 in the first direction, and rotates the cam gears 55 and 57 to perform the mirror popping-down and shutter charging operations.

At a step S214, if the microcomputer CPU determines that rotation of the cam gear 55 has set the phase of the phase substrate 61 to provide the signal indicative of CMSP1: High, CMSP2: Low to thereby index the phase for the completion of mirror popping-down and shutter charging, then the process proceeds to a step S217. If this cannot be detected within a predetermined period of time (for example, 300 msec.), the process proceeds to a step S215.

At the step 215, the microcomputer CPU brakes the first motor M1.

At a step S216, the microcomputer CPU displays a warning indicating that the mirror popping-down and shutter charging operations are disabled, and the process then proceeds to the step S999 to execute the [STOP] routine.

At the step S217, when the signal is established at the step S208, the microcomputer CPU brakes the first motor M1.

At a step S218, when the microcomputer CPU determines that the film counter shows 0, the process proceeds to the [RELEASE] routine. When the film counter shows a number from 1 to 35, the process proceeds to a [FILM WINDING] routine. When the film counter shows 36, the microcomputer CPU determines that the photographing on the final frame has been completed, and the process proceeds to a [FILM REWINDING] routine.

Then, at a step S219, when the switch SW2 is on, the process proceeds to the step S206. When the switch SW2 is not on, the release process is terminated. The [FILM REWINDING] and [FILM REWINDING] routines will be described later.

Figure 17A:
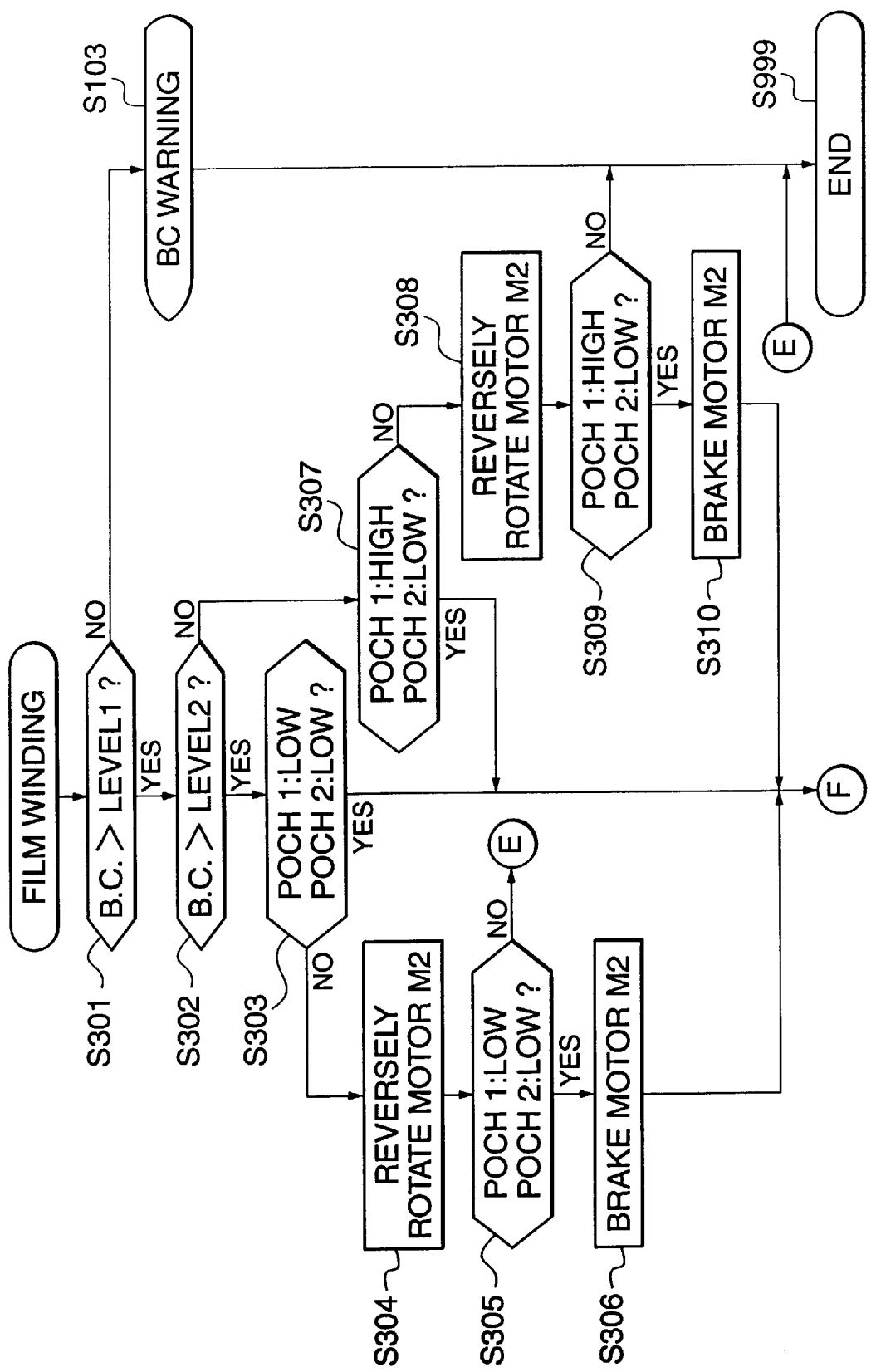
FIGS. 17A and 17B is a flow chart of a film winding process executed by the CPU shown in FIG. 12.
Figure 17B:
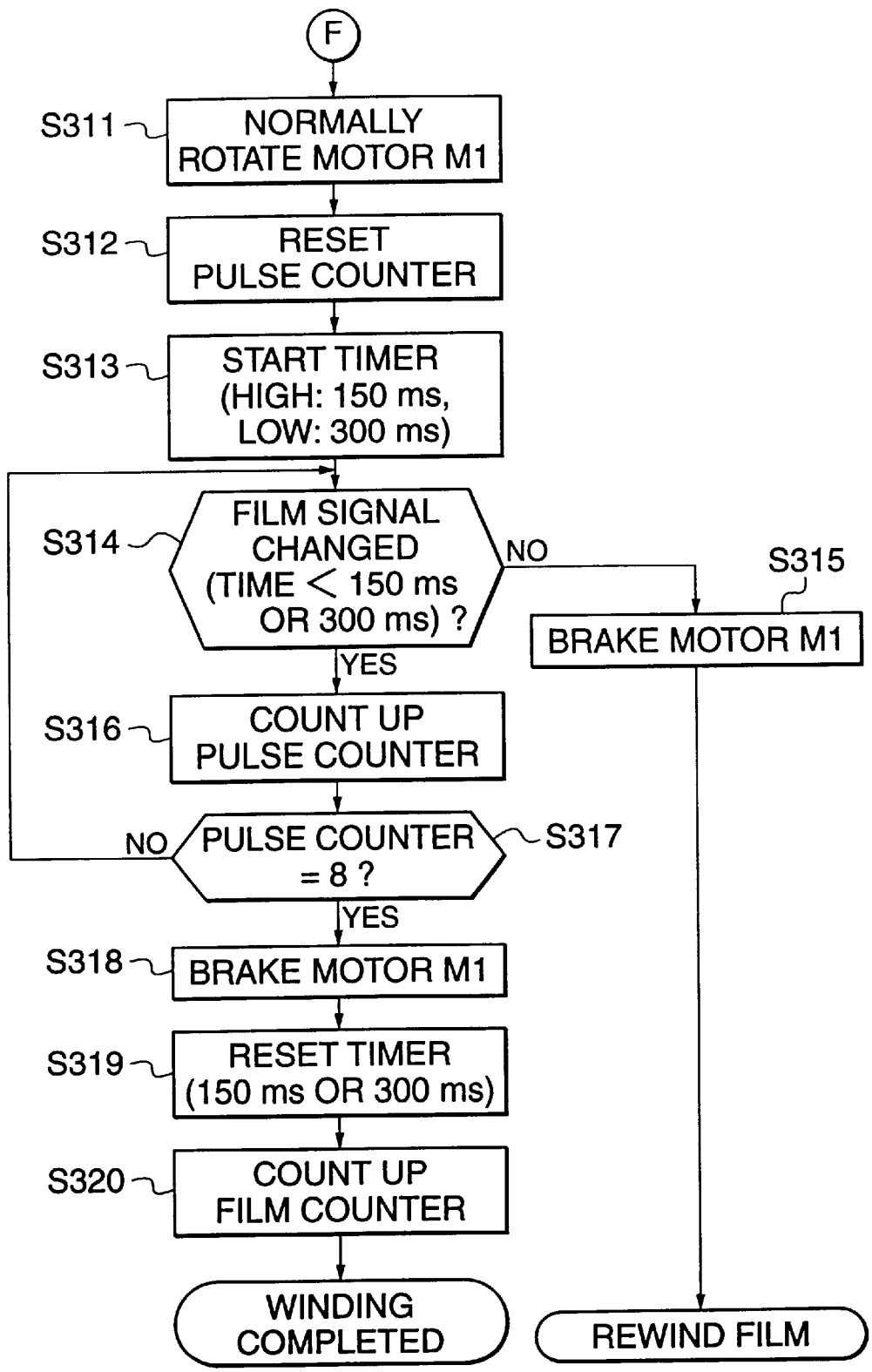

Now, the [FILM WINDING] routine will be described with reference to FIGS. 17A and 17B.

At a step S301, as in the steps S102, S202, and S206, the microcomputer CPU checks the power supply voltage. If the voltage is equal to or lower than the predetermined level LEVEL1, the process proceeds to the step S103. If the voltage exceeds the predetermined level LEVEL1, the process proceeds to a step S303.

At a step S302, the microcomputer CPU further determines whether or not the voltage check level is higher than a predetermined value LEVEL2. If the former is higher than the latter, the microcomputer determines that the power supply is in a high voltage state, and the process proceeds to the step S303. Otherwise the microcomputer CPU determines that the power supply is in a low voltage state, and the process proceeds to a step S307.

At the step S303, the microcomputer CPU determines whether or not the switching mechanism is in the high-speed winding state shown in FIG. 7, based on the phase of the cam gear 38. If the signal indicative of POCH1: Low, POCH2: Low is obtained, the process proceeds to a step S311. If this signal is not obtained, the process proceeds to a step S304.

At the step S304, the microcomputer CPU rotates the second motor M2 in the first direction so as to set the switching mechanism into the high-speed winding state shown in FIG. 7 while the first motor M1 is rotating in the second direction.

At a step S305, if the microcomputer CPU determines that rotation of the cam gear has set the phase of the phase substrate 40 to provide the signal indicative of POCH1: Low, POCH2: Low to thereby set the switching mechanism into the high-speed state shown in FIG. 7, then the process proceeds to a step S306. If the signal indicative of POCH1: Low, POCH2: Low is not obtained even after the lapse of a predetermined period of time (for example, 1 sec.), the process proceeds to the step S999 to execute the [STOP] routine.

At the step S306, when the signal is established at the step S305, the microcomputer CPU brakes the second motor M2, and the process proceeds to the step S311.

At a step S307, the microcomputer CPU determines whether or not the switching mechanism is in the low-speed winding state shown in FIG. 8, based on the phase of the cam gear 38. If the signal indicative of POCH1: High, POCH2: Low is obtained, the process proceeds to the step S311. If this signal is not obtained, the process proceeds to a step S308.

At the step S308, the microcomputer CPU rotates the second motor M2 in the first direction so as to set the switching mechanism into the low-speed winding state shown in FIG. 8 while the first motor M1 is rotating in the second direction.

At a step S309, if the microcomputer CPU determines that rotation of the cam gear has set the phase of the phase substrate 40 to provide the signal indicative of POCH1: High, POCH2: Low to thereby set the switching mechanism into the low-speed state shown in FIG. 8, then the process proceeds to a step S310. If the signal indicative of POCH1: High, POCH2: Low is not obtained even after the lapse of a predetermined period of time (for example, 1 sec.), the process proceeds to the step S999 to execute the [STOP] routine.

At the step S310, when the signal is established at the step S309, the microcomputer CPU brakes the second motor M2, and the process proceeds to the step S311.

At the step S311, the microcomputer CPU rotates the first motor M1 in the second direction to wind the film.

At a step S312, the microcomputer CPU resets the pulse counter of the internal EEPROM which allows the perforations on the film to be detected.

At a step S313, the microcomputer CPU sets a predetermined time (for example, high-speed winding: 150 msec., low-speed winding: 300 msec.) to the internal timer.

At a step S314, as in the steps S119 and S130, if the microcomputer CPU fails to detect the next perforation within the period of time clocked by the above timer, that is, the film signal from the photo reflector 26 fails to change within the period of time clocked by the internal timer, the process proceeds to a step S315. If the signal changes within the period of time clocked by the above timer, the process proceeds to a step S316.

At the step S315, the microcomputer CPU brakes the first motor M1. The process then proceeds to the [FILM REWINDING] routine.

At the step S316, the microcomputer CPU counts up the pulse counter of the internal EEPROM.

At a step S317, the microcomputer CPU determines whether or not the pulse counter of the internal EEPROM has reached 8. If the counter has not reached 8, the process returns to the step S314. If the counter has reached 8, the process proceeds to a step S318. In this case, the eight perforations corresponding to one frame of the film are detected.

At the step S318, the microcomputer CPU brakes the first motor M1. Then, at a step S319, the microcomputer CPU resets the predetermined time to the internal timer.

At a step S320, the microcomputer CPU counts up the film counter of the internal EEPROM, thus completing the winding operation.

Figure 18:
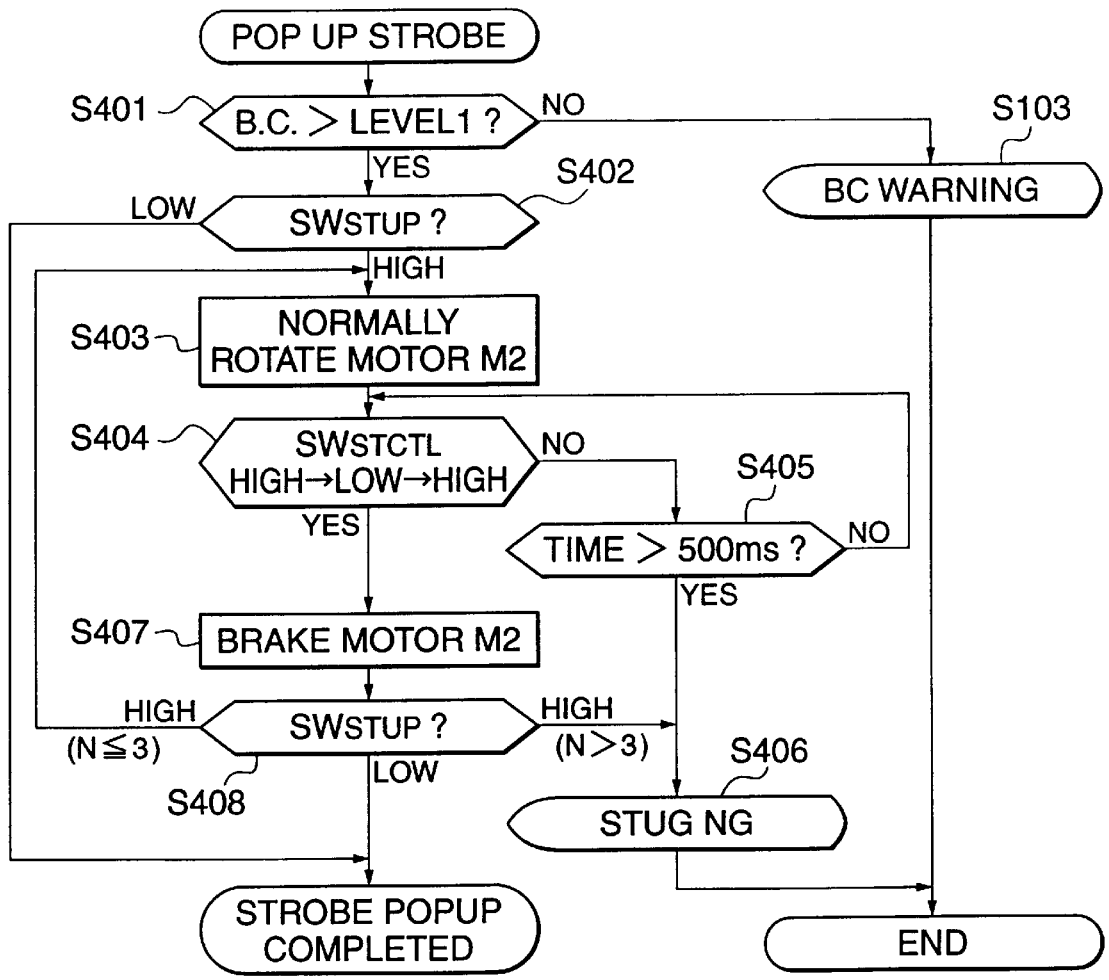
FIG. 18 is a flow chart of an electronic flash popping-up process executed by the CPU shown in FIG. 12.

Next, the [ELECTRONIC FLASH POPUP] routine for driving the electronic flash to pop up to the light emission enabled position will be described with reference to FIG. 18.

At a step S401, as in the step S102, the microcomputer CPU checks the power supply voltage. If the voltage is equal to or lower than the predetermined level LEVEL1, the process proceeds to the step S103. If the voltage exceeds the predetermined level LEVEL1, the process proceeds to a step S402.

With the camera of the present embodiment, the photographer can manually and directly pop up the electronic flash unit ST, so that at the step S402, the microcomputer CPU determines through the electronic flash popup detecting switch SWSTUP whether or not the electronic flash unit ST has already been popped up to the light emission enabled position. If the electronic flash unit ST has been popped up to the light emission enabled position, the microcomputer CPU starts charging a main capacitor in the electronic flash circuit FLSH and then determines that the electronic flash popping-up operation has been completed, and the process then returns to the step S205. If the electronic flash unit has not been popped up to the light emission enabled position yet, the process proceeds to the step S403.

At the step S403, the microcomputer CPU rotates the second motor M2 in the second direction to execute the electronic flash popup driving.

At a step S404, the microcomputer CPU rotates the second motor M2 until the rotation of the, second motor M2 in the second direction causes rotation of the cam gear 71 to perform the operations shown in FIGS. 10A to 10D so that the signal supplied to the input port STCTL of the microcomputer CPU from the switch SWSTCTL (leaf switch 72) is switched from High through Low to High. When the signal is switched in this manner, the process proceeds to a step S407. When the signal is not switched in the above manner, the process proceeds to a step S405.

At the step S405, the microcomputer CPU measures the period of time elapsed from the start of the power supply to the second motor M2. If the measured period of time exceeds a predetermined value (for example, 500 msec.), the process proceeds to a step S406. If the measured period of time does not exceed the predetermined value, the process returns to the step S404.

At a step S406, the microcomputer CPU outputs a serial signal to the display driving circuit DSP through the output port CSDSP to display a warning indicating that the electronic flash popping-up operation has been unsuccessful. The process then proceeds to the [STOP] routine. At a step S407, the microcomputer CPU brakes the second motor, and the process proceeds to a step S408.

At the step S408, the microcomputer determines through the electronic flash popup detecting switch SWSTUP whether or not the electronic flash unit ST has actually been popped up to the light emission enabled position. If the electronic flash unit ST has been popped up to the light emission enabled position (Low), the microcomputer CPU starts charging the main capacitor and determines that the electronic flash propping-up operation has been completed, and the process returns to the step S205. On the other hand, if the electronic flash unit ST has not been popped up to the light emission enabled position (High), the process returns to the step S403 to continue rotating the second motor M2 in the second direction. If the electronic flash popup detecting switch SWSTUP remains High even after three repetitions of the operations from the rotation of the second motor M2 in the second direction (step S403) to the braking (step S407), then the process proceeds to the step S406 to perform the display indicating that the electronic flash popup operation has been unsuccessful.

Figure 19:
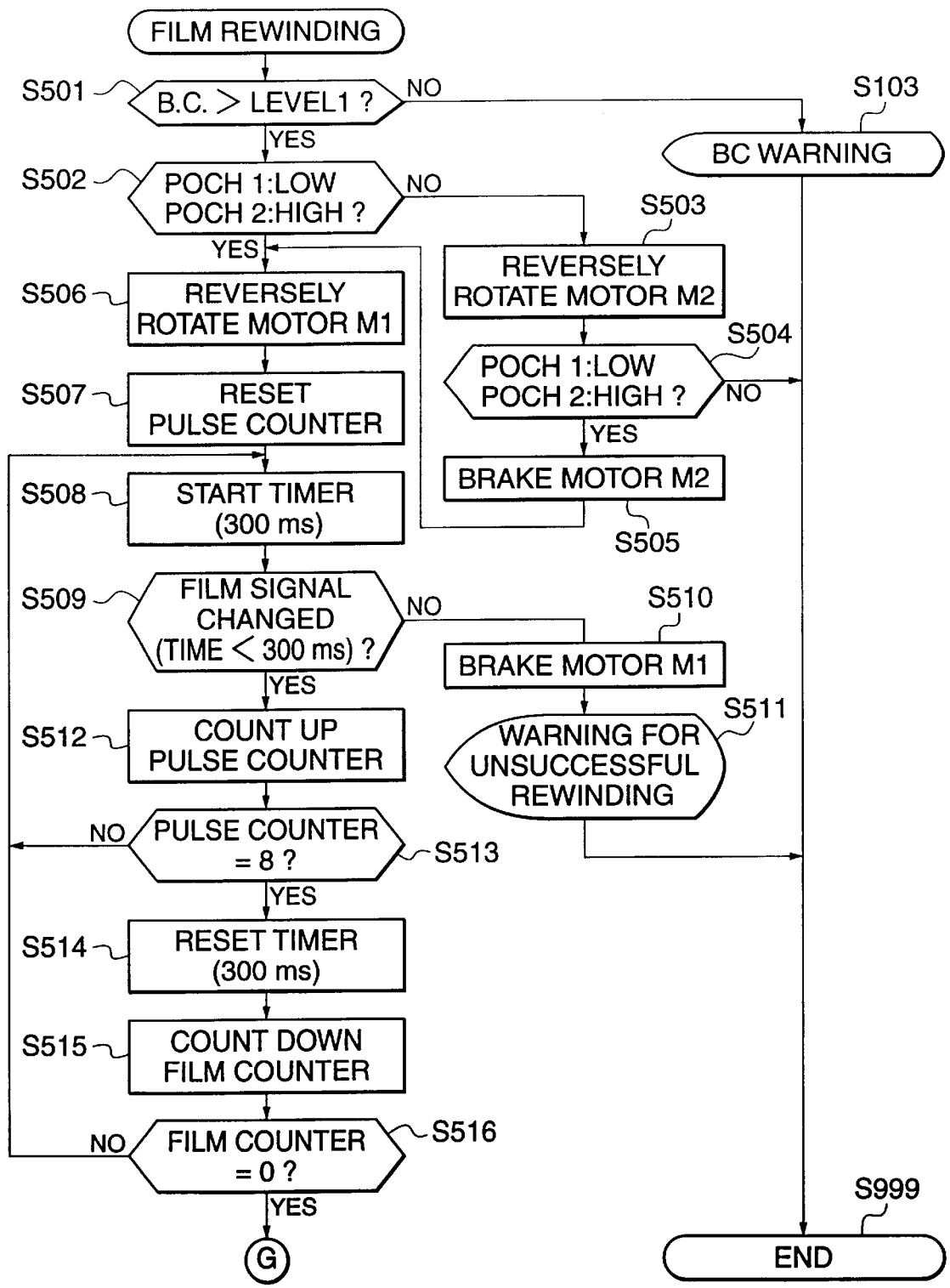
FIG. 19 is a flow chart of a film rewinding process executed by the CPU shown in FIG. 12.
Figure 20:
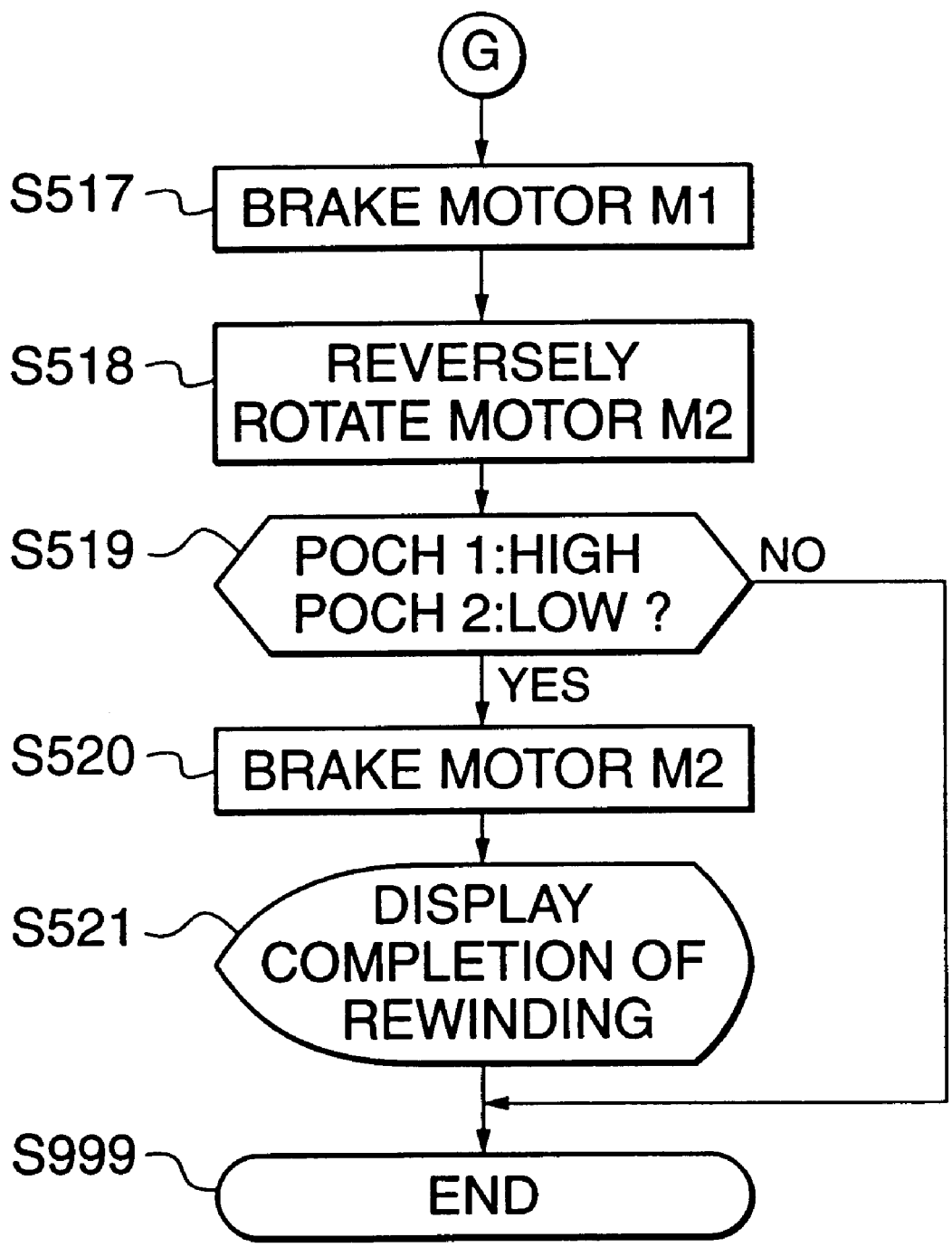
FIG. 20 is a flow chart of a continued part of the film rewinding process of FIG. 19.

Next, the [FILM REWINDING] routine will be described with reference to FIGS. 19 and 20.

At a step S501, as in the step S102, the microcomputer CPU checks the power supply voltage. If the voltage is equal to or lower than the predetermined level LEVEL1, the process proceeds to the step S103. If the voltage exceeds the predetermined level LEVEL1, the process proceeds to a step S502.

At the step S502, the microcomputer CPU determines whether or not the switching mechanism is in the rewinding state shown in FIG. 9, based on the phase of the cam gear 38, to carry out rewinding of the film through rotation of the first motor M1 in the first direction. If the phase of the phase substrate 40 is POCH1: Low, POCH2: High, the process proceeds to a step S506. If the former is not the latter, the process proceeds to a step S503.

At the step S503, the microcomputer CPU rotates the second motor M2 in the first direction to rotate the cam gear 38, so as to set the switching mechanism into the rewinding state shown in FIG. 9 while the first motor M1 is rotating in the first direction.

At a step S504, if the microcomputer CPU determines that rotation of the cam gear has set the phase of the phase substrate 40 to provide the signal indicative of POCH1: Low, POCH2: High to thereby set the switching mechanism into the rewinding state shown in FIG. 9, then the process proceeds to a step S505. If the signal indicative of POCH1: Low, POCH2: High is not obtained even after the lapse of a predetermined period of time (for example, 1 sec.), the process proceeds to the step S999 to execute the [STOP] routine.

At the step S505, when the signal is established at the step S504, the microcomputer CPU brakes the second motor M2.

At the step S506, the microcomputer CPU rotates the first motor M1 in the first direction to rewind the film.

At a step S507, the microcomputer CPU resets the pulse counter of the internal EEPROM used to detect the perforations on the film.

At a step S508, the microcomputer CPU sets 300 msec. to the internal timer.

At a step S509, as in the steps S119, S130, and S314, if the microcomputer CPU fails to detect the next perforation within the period of time (300 msec.) clocked by the above timer, that is, the film signal from the photo reflector 26 does not change within the period of time (300 msec.) clocked by the internal timer, the process proceeds to a step S510. If the signal changes within the period of time (300 msec.) clocked by the above timer, the process proceeds to a step S512.

At the step S510, the microcomputer CPU brakes the first motor M1. The process then proceeds to a step S511.

At the step S511, if any error such as jamming of the film occurs during the rewinding of the film, the microcomputer CPU outputs a serial signal to the display driving circuit DSP through the output port CSDSP to display a warning indicating that the rewinding of the film is malfunctioning. The process then proceeds to the step S999 to execute the [STOP] routine.

At the step S512, the microcomputer CPU counts up the pulse counter of the internal EEPROM.

At a step S513, the microcomputer CPU determines whether or not the pulse counter of the internal EEPROM has reached 8. If the counter has not reached 8, the process returns to the step S508. If the counter has reached 8, the process proceeds to a step S514. In this case, the eight perforations corresponding to one frame of the film are detected.

At the step S514, the microcomputer CPU resets the 300 msec. to the internal timer.

At a step S515, the microcomputer CPU counts down the film counter of the internal EEPROM.

At a step S516, the microcomputer CPU determines whether or not the film counter of the internal EEPROM has reached 0. If the counter has not reached 0, the process returns to the step S508. If the counter has reached 0, the process proceeds to a step S517. In this case, it is detected whether or not the film has been rewound for the frames already undergoing photographing.

At the step S517, the microcomputer CPU brakes the first motor M1 upon the lapse of 2 sec. after the film counter reached 0 at the step S516.

At a step S518, the microcomputer CPU rotates the second motor M2 in the first direction so as to set the switching mechanism into the low-speed winding state shown in FIG. 8 while the first motor M1 is rotating in the second direction.

At a step S519, if the microcomputer CPU determines that rotation of the cam gear has set the phase of the phase substrate 40 to provide the signal indicative of POCH1: High, POCH2: Low to thereby set the switching mechanism into the low-speed winding state shown in FIG. 8, then the process proceeds to a step S520. If the signal indicative of POCH1: High, POCH2: Low is not obtained even after the lapse of a predetermined period of time (for example, 1 sec.), the process proceeds to the step S999 to execute the [STOP] routine.

At the step S520, when the signal is established at the step S519, the microcomputer CPU brakes the second motor M2, and the process proceeds to a step S521. In this manner, the switching mechanism is set into the low-speed winding state shown in FIG. 8 after the film has been rewound and before a new film is loaded.

At the step S521, the microcomputer CPU outputs a serial signal to the display driving circuit DSP through the output port CSDSP to carry out a display indicating that the rewinding operation has been completed. The process then proceeds to the step S999 to execute the [STOP] routine.

The above described internal mechanism and camera control operations are only examples and may be changed arbitrarily.

Further, in the present embodiment, only the operation of popping up the electronic flash to the light emission enabled position is driven by the motor, but the operation of popping down the electronic flash to the housed position may be driven by a motor.

Moreover, in the present embodiment, the fifth driving system is used to pop up the electronic flash, but the fifth driving system may be used as other driving systems with lighter driving loads instead of the electronic flash popup driving system.

Furthermore, the control flow charts of the present embodiment show the case in which the film winding speed is switched depending on the power supply voltage level, but the film winding speed may be switched depending on environmental conditions (temperature or the like) in which the camera is used, that affect the winding and feeding loads on films used.

What is claimed is:

1. A camera comprising:

a film winding driving system;

a film rewinding driving system;

a first motor for driving said film winding driving system and said film rewinding driving system;

a switching mechanism for selectively switching between a winding state in which a driving force of said first motor can be transmitted to said film winding driving system, and a rewinding state in which the driving force of said first motor can be transmitted to said film rewinding driving system;

a second motor for driving said switching mechanism for selective switching between said winding state and said rewinding state; and control means for causing said switching mechanism to select said winding state after causing said switching mechanism to select said rewinding state to carry out rewinding a film, and thereafter terminating control of winding of the film.

2. A camera comprising:

a film winding driving system;

a film rewinding driving system;

a first motor for driving said film winding driving system and said film rewinding driving system;

a switching mechanism for selectively switching between a first state in which a driving force of said first motor can be transmitted to said film winding driving system with a first reduction ratio, a second state in which the driving force of said first motor can be transmitted to said film winding driving system with a second reduction ratio greater than the first reduction ratio, and a third state in which the driving force of said first motor can be transmitted to said film rewinding driving system;

a second motor for driving said switching mechanism for selective switching between said first, second and third states; and control means for causing said switching mechanism to select said second state after causing said switching mechanism to select said third state to carry out rewinding a film, and thereafter terminating control of winding of the film.

3. A camera comprising:

first and second motors;

first and second planetary mechanisms for transmitting a driving force of said first motor;

a mirror disposed to advance into and recede from a photographic optical path;

a shutter;

a mirror and shutter driving system disposed to have the driving force of said first motor transmitted thereto via said first planetary mechanism, for driving said mirror for enabling finder observation when said mirror advances into the photographic optical path, and for driving charging of said shutter;

a first film winding driving system disposed to be connected to said first planetary mechanism to have the driving force of said first motor transmitted thereto via said first planetary mechanism with a first reduction ratio to be driven thereby when said first motor rotates in a second direction;

a film rewinding driving system disposed to have the driving system of said first motor transmitted thereto via said second planetary mechanism when said first motor rotates in said first direction;

a second film winding driving system disposed to be connected to said second planetary mechanism to have the driving force of said first motor transmitted thereto via said second planetary mechanism with a second reduction ratio greater than said first reduction ratio to be driven thereby when said first motor rotates in said second direction;

a switching mechanism disposed to be driven by a driving force of said second motor, for selectively switching between a first state in which the driving force of said first motor can be transmitted to said first film winding driving system, a second state in which the driving force of said first motor can be transmitted to said second film winding driving system, and a third state in which the driving force of said first motor can be transmitted to said film rewinding driving system; and control means for causing said switching mechanism to select said second state after causing said switching mechanism to select said third state to carry out rewinding a film, and thereafter terminating control of winding of the film.

4. A camera comprising:

a film winding driving system;

a film rewinding driving system;

a first motor for driving said film winding driving system and said film rewinding driving system;

a switching mechanism for selectively switching between a winding state in which a driving force of said first motor can be transmitted to said film winding driving system, and a rewinding state in which the driving force of said first motor can be transmitted to said film rewinding driving system;

a second motor for driving said switching mechanism for selective switching between said winding state and said rewinding state;

a film loading chamber;

a cover member for closing and opening said film loading chamber; and control means for detecting closure of said cover member and for causing said switching mechanism to select said winding state upon detection of closure of said cover member.

5. A camera comprising:

a film winding driving system;

a film rewinding driving system;

a first motor for driving said film winding driving system and said film rewinding driving system;

a switching mechanism for selectively switching between a first state in which a driving force of said first motor can be transmitted to said film winding driving system with a first reduction ratio, a second state in which the driving force of said first motor can be transmitted to said film winding driving system with a second reduction ratio greater than the first reduction ratio, and a third state in which the driving force of said first motor can be transmitted to said film rewinding driving system;

a second motor for driving said switching mechanism for selective switching between said first, second and third states;

a film loading chamber;

a cover member for closing and opening said film loading chamber; and control means for detecting closure of said cover member and for causing said switching mechanism to select said second state upon detection of closure of said cover member.

6. A camera comprising:

first and second motors;

first and second planetary mechanisms for transmitting a driving force of said first motor;

a mirror disposed to advance into and recede from a photographic optical path;

a shutter;

a mirror and shutter driving system disposed to have the driving force of said first motor transmitted thereto via said first planetary mechanism, for driving said mirror for enabling finder observation when said mirror advances into the photographic optical path, and for driving charging of said shutter;

a first film winding driving system disposed to be connected to said first planetary mechanism to have the driving force of said first motor transmitted thereto via said first planetary mechanism with a first reduction ratio to be driven thereby when said first motor rotates in a second direction;

a film rewinding driving system disposed to have the driving system of said first motor transmitted thereto via said second planetary mechanism when said first motor rotates in said first direction;

a second film winding driving system disposed to be connected to said second planetary mechanism to have the driving force of said first motor transmitted thereto via said second planetary mechanism with a second reduction ratio greater than said first reduction ratio to be driven thereby when said first motor rotates in said second direction;

a switching mechanism disposed to be driven by a driving force of said second motor, for selectively switching between a first state in which the driving force of said first motor can be transmitted to said first film winding driving system, a second state in which the driving force of said first motor can be transmitted to said second film winding driving system, and a third state in which the driving force of said first motor can be transmitted to said film rewinding driving system;

a film loading chamber;

a cover member for closing and opening said film loading chamber; and control means for detecting closure of said cover member and for causing said switching mechanism to select said second state upon detection of closure of said cover member.

7. A camera as claimed in claim 4, wherein if a film is loaded in said film loading chamber when said control means detects closure of said cover member, said control means causes said film winding driving system to carry out preliminary winding of the film.

8. A camera as claimed in claim 1, wherein said switching mechanism is driven by rotation of said second motor in one direction, for selective switching between said winding state and said rewinding state.

9. A camera as claimed in claim 2, including a rotary member disposed to be rotatively driven by rotation of said second motor in one direction, for being cyclically rotated to a phase that causes said switching mechanism to select said second state, a phase that causes said switching mechanism to select said first state, and a phase that causes said switching mechanism to select said third state.

10. A camera as claimed in claim 2, wherein said control means causes said switching mechanism to select said second state when voltage of power supply to the camera is equal to or lower than a predetermined level, and causes said switching mechanism to select said first state when the voltage is higher than said predetermined level.

11. A camera as claimed in claim 3, wherein in said first state, said switching mechanism permits said first planetary mechanism to be drivingly connected to said first film winding driving system and said mirror and shutter driving system while inhibiting said second planetary mechanism from being connected to said second film winding driving system and said film rewinding driving system; in said second state, said switching mechanism permits said second planetary mechanism to be drivingly connected to said second film winding driving system and said first planetary mechanism to be drivingly connected to said mirror and shutter driving system while inhibiting said first planetary mechanism from being connected to said first film winding driving system and said planetary mechanism from being connected to said film rewinding driving system; and in said third state, said switching mechanism permits said second planetary mechanism from drivingly connected to said film rewinding driving system while inhibiting said first planetary mechanism from being connected to said mirror and shutter driving system.

12. A camera as claimed in claim 3, including a sun gear member disposed to be driven by said first motor, and wherein said first and second planetary mechanisms are disposed to revolve around said sun gear member independently of each other.

13. A camera as claimed in claim 1, wherein said second motor has a smaller output from said first motor.

14. A camera as claimed in claim 1, wherein said second motor has a smaller size than said first motor.

15. A camera as claimed in claim 8, including an electronic flash device, and an electronic flash driving system disposed to have a driving force of said second motor transmitted thereto when said second motor rotates in another direction, for driving said electronic flash device to project into a flash light emission enabled position.

16. A camera comprising:

a film winding driving system;

a film rewinding driving system;

a first motor for driving said film winding driving system and said film rewinding driving system;

a switching mechanism for selectively switching between a first state in which a driving force of said first motor can be transmitted to said film winding driving system with a first reduction ratio, a second state in which the driving force of said first motor can be transmitted to said film winding driving system with a second reduction ratio greater than the first reduction ratio, and a third state in which the driving force of said first motor can be transmitted to said film rewinding driving system; and a second motor for driving said switching mechanism for selective switching between said first, second and third states;

wherein said switching mechanism is driven by rotation of said second motor in one direction, for cyclically selecting said second state, said first state, and said third state in an order mentioned.

17. A camera comprising:

first and second motors;

first and second planetary mechanisms for transmitting a driving force of said first motor;

a mirror disposed to advance into and recede from a photographic optical path;

a shutter;

a mirror and shutter driving system disposed to have the driving force of said first motor transmitted thereto via said first planetary mechanism when said first motor rotates in a first direction, for driving said mirror for enabling finder observation when said mirror advances into the photographic optical path, and for driving charging of said shutter;

a first film winding driving system disposed to be connected to said first planetary mechanism to have the driving force of said first motor transmitted thereto via said first planetary mechanism with a first reduction ratio to be driven thereby when said first motor rotates in a second direction;

a film rewinding driving system disposed to have the driving system of said first motor transmitted thereto via said second planetary mechanism when said first motor rotates in said first direction;

a second film winding driving system disposed to be connected to said second planetary mechanism to have the driving force of said first motor transmitted thereto via said second planetary mechanism with a second reduction ratio greater than said first reduction ratio to be driven thereby when said first motor rotates in said second direction; and a switching mechanism disposed to be driven by a driving force of said second motor, for selectively switching between a first state in which the driving force of said first motor can be transmitted to said first film winding driving system, a second state in which the driving force of said first motor can be transmitted to said second film winding driving system, and a third state in which the driving force of said first motor can be transmitted to said film rewinding driving system;

wherein said switching mechanism is driven by said second motor rotating in one direction, for cyclically selecting said second state, said first state, and said third state in an order mentioned.

18. A camera as claimed in claim 16 or 17, including a rotary member disposed to be rotatively driven by rotation of said second motor in one direction, for being cyclically rotated to a phase that causes said switching mechanism to select said second state, a phase that causes said switching mechanism to select said first state, and a phase that causes said switching mechanism to select said third state.

19. A camera as claimed in claim 16, including control means for causing said switching mechanism to select said second state after causing said switching mechanism to select said third state to carry out rewinding of a film, and thereafter terminating control of winding of the film.

20. A camera as claimed in claim 19, wherein said control means is responsive to loading of a new film into the camera, for causing said film winding driving system to carry out preliminary winding of the new film when said switching mechanism selects said second state.

21. A camera as claimed in claim 16, wherein said control means causes said switching mechanism to select said second state when voltage of power supply to the camera is equal to or lower than a predetermined level, and causes said switching mechanism to select said first state when the voltage is higher than said predetermined level.

22. A camera as claimed in claim 17, wherein in said first state, said switching mechanism permits said first planetary mechanism to be drivingly connected to said first film winding driving system and said mirror and shutter driving system while inhibiting said second planetary mechanism from being connected to said second film winding driving system and said film rewinding driving system; in said second state, said switching mechanism permits said second planetary mechanism to be drivingly connected to said second film winding driving system and said first planetary mechanism to be drivingly connected to said mirror and shutter driving system while inhibiting said first planetary mechanism from being connected to said first film winding driving system and said planetary mechanism from being connected to said film rewinding driving system; and in said third state, said switching mechanism permits said second planetary mechanism from drivingly connected to said film rewinding driving system while inhibiting said first planetary mechanism from being connected to said mirror and shutter driving system.

23. A camera as claimed in claim 17, including a sun gear member disposed to be driven by said first motor, and wherein said first and second planetary mechanisms are disposed to revolve around said sun gear member independently of each other.

24. A camera as claimed in claim 16, wherein said second motor has a smaller output from said first motor.

25. A camera as claimed in claim 16, wherein said second motor has a smaller size than said first motor.

26. A camera as claimed in claim 16, including an electronic flash device, and an electronic flash driving system disposed to have a driving force of said second motor transmitted thereto when said second motor rotates in another direction, for driving said electronic flash device to project into a flash light emission enabled position.

27. A driving device provided in an apparatus for driving a plurality of driving systems by means of motors as driving sources, comprising:
  first and second motors;
  first and second planetary mechanisms for transmitting a driving force of said first motor;
  a first driving system disposed to have the driving force of said first motor transmitted thereto via said first planetary mechanism when said first motor rotates in a first direction;
  a second driving system disposed to have the driving force of said first motor transmitted thereto via said first planetary mechanism when said first motor rotates in a second direction;
  a third driving system disposed to have the driving force of said first motor transmitted thereto via said second planetary mechanism when said first motor rotates in said first direction;
  a fourth driving system disposed to have the driving force of said first motor transmitted thereto via said second planetary mechanism when said first motor rotates in said second direction; and
  a switching mechanism responsive to rotation of said second motor, for switching between transmission of the driving force of said first motor via said first planetary mechanism, and transmission of the driving force of said first motor via said second planetary mechanism.

28. A driving device as claimed in claim 27, wherein said first to fourth driving systems cause execution of operations of said apparatus requiring greater driving loads than a driving load required by an operation of said switching mechanism.

29. A driving device as claimed in claim 27, wherein said switching mechanism is disposed to be driven by rotation of said second motor in a first direction, the driving device including a fifth driving system disposed to have a driving force of said second motor transmitted thereto when said second motor rotates in a second direction.

30. A driving device as claimed in claim 29, wherein said first to fourth driving systems cause execution of operations of said apparatus requiring greater driving loads than a driving load required by an operation of said switching mechanism and a load required by an operation of said apparatus caused to be executed by said fifth driving system.

31. A driving device as claimed in claim 27, including a third planetary mechanism for transmitting a driving force of said second motor, and wherein when said second motor rotates in a first direction, said switching mechanism is driven by a driving force of said second motor transmitted via said third planetary mechanism, for switching between transmission of the driving force of said first motor via said first planetary mechanism, and transmission of the driving force of said first motor via said second planetary mechanism.

32. A driving device as claimed in claim 16, wherein said second motor has a smaller output than said first motor.

33. A driving device as claimed in claim 16, wherein said second motor has a smaller size than said first motor.

34. A driving device as claimed in claim 27, wherein said second driving system and said fourth driving system cause execution of a same operation of said apparatus, a reduction ratio between said first planetary mechanism and said second driving system being different from a reduction ratio between said second planetary mechanism and said fourth driving system.

35. A driving device as claimed in claim 27, wherein said switching mechanism selectively switches between a state in which said first planetary mechanism is permitted to be drivingly connected to said first driving system and said second driving system while said second planetary mechanism is inhibited from being connected to said third driving system and said fourth driving system, a state in which said first planetary mechanism is permitted to be drivingly connected to said first driving system and said second planetary mechanism is permitted to be drivingly connected to said fourth driving system while said first planetary mechanism is inhibited from being connected to said second driving system and said second planetary mechanism is inhibited from being connected to said third driving system, and a state in which said second planetary mechanism is permitted to be drivingly connected to said third driving system while said first planetary mechanism is inhibited from being connected to said first driving system.

36. A driving device as claimed in claim 27, including a sun gear member disposed to be driven by said first motor, and wherein said first and second planetary mechanisms are disposed to revolve around said sun gear member independently of each other.

37. An apparatus having a driving device as claimed in claim 27.

38. A camera for driving a plurality of driving systems by means of motors as driving sources, comprising:
  first and second motors;
  first and second planetary mechanisms for transmitting a driving force of said first motor;
  a first driving system disposed to have the driving force of said first motor transmitted thereto via said first planetary mechanism when said first motor rotates in a first direction;
  a second driving system disposed to have the driving force of said first motor transmitted thereto via said first planetary mechanism when said first motor rotates in a second direction;
  a third driving system disposed to have the driving force of said first motor transmitted thereto via said second planetary mechanism when said first motor rotates in said first direction;

a fourth driving system disposed to have the driving force of said first motor transmitted thereto via said second planetary mechanism when said first motor rotates in said second direction; and a switching mechanism responsive to rotation of said second motor, for switching between transmission of the driving force of said first motor via said first planetary mechanism, and transmission of the driving force of said first motor via said second planetary mechanism.

39. A camera as claimed in claim 38, wherein said first to fourth driving systems cause execution of operations of said apparatus requiring greater driving loads than a driving load required by an operation of said switching mechanism.

40. A camera as claimed in claim 38, wherein said first to fourth driving systems cause execution of a photographing operation and a film feeding operation.

41. A camera as claimed in claim 40, including a mirror disposed to advance into and recede from a photographic optical path, and a shutter, and wherein said first to fourth driving systems cause execution of an operation of driving said mirror for enabling finder observation when said mirror advances into the photographic optical path, operations of charging and releasing said shutter, a film winding operation, and a film rewinding operation.

42. A camera as claimed in claim 38, wherein said switching mechanism is disposed to be driven by rotation of said second motor in a first direction, the driving device including a fifth driving system disposed to have a driving force of said second motor transmitted thereto when said second motor rotates in a second direction.

43. A camera as claimed in claim 42, wherein said first to fourth driving systems cause execution of operations of the camera requiring greater driving loads than a driving load required by an operation of said switching mechanism and a load required by at least one operation of the camera caused to be executed by said fifth driving system.

44. A camera as claimed in claim 43, wherein said fifth driving system causes execution of at least one camera operation other than a photographing operation and a film feeding operation.

45. A camera as claimed in claim 44, including an electronic flash device, and wherein said fifth driving system causes execution of at least one of an operation of driving said electronic flash device to project into a flash light emission enabled position, and an operation of driving said electronic flash device into a housed position.

46. A camera as claimed in claim 38, including a third planetary mechanism for transmitting a driving force of said second motor, and wherein when said second motor rotates in a first direction, said switching mechanism is driven by a driving force of said second motor transmitted via said third planetary mechanism, for switching between transmission of the driving force of said first motor via said first planetary mechanism, and transmission of the driving force of said first motor via said second planetary mechanism.

47. A camera as claimed in claim 38, wherein said second motor has a smaller output than said first motor.

48. A camera as claimed in claim 38, wherein said second motor has a smaller size than said first motor.

49. A camera as claimed in claim 43, including a mirror disposed to advance into and recede from a photographic optical path, a shutter, and an electronic flash device, and wherein said first driving system comprises a driving system for driving said mirror for enabling finder observation when said mirror advances into the photographic optical path, and for driving charging of said shutter, said second and fourth driving systems comprise film winding driving systems that wind a film at different speeds from each other, said third driving system comprises a film rewinding driving system, and said fifth driving system comprises a driving system for driving said electronic flash device to project into a flash light emission enabled position.

50. A camera as claimed in claim 49, wherein a reduction ratio between said first planetary mechanism and said second driving system is different from a reduction ratio between said second planetary mechanism and said fourth driving system.

51. A camera as claimed in claim 38, wherein said switching mechanism selectively switches between a state in which said first planetary mechanism is permitted to be drivingly connected to said first driving system and said second driving system while said second planetary mechanism is inhibited from being connected to said third driving system and said fourth driving system, a state in which said first planetary mechanism is permitted to be drivingly connected to said first driving system and said second planetary mechanism is permitted to be drivingly connected to said fourth driving system while said first planetary mechanism is inhibited from being connected to said second driving system and said second planetary mechanism is inhibited from being connected to said third driving system, and a state in which said second planetary mechanism is permitted to be drivingly connected to said third driving system while said first planetary mechanism is inhibited from being connected to said first driving system.

52. A camera as claimed in claim 38, including a sun gear member disposed to be driven by said first motor, and wherein said first and second planetary mechanisms are disposed to revolve around said sun gear member independently of each other.

53. A camera as claimed in claim 38, having a function of continuous photographing.

54. A driving device provided in an apparatus for driving a plurality of driving systems by means of motors as driving sources, comprising:

first and second motors;

first and second planetary mechanisms for transmitting a driving force of said first motor;

a first driving system for causing execution of an operation of said apparatus via said first planetary mechanism;

a second driving system for causing execution of said operation of said apparatus caused to be executed by said first driving system, via said second planetary mechanism; and a switching mechanism disposed to be driven by a driving force of said second motor, for switching between transmission of the driving force of said first motor to said first driving system via said first planetary mechanism, and transmission of the driving force of said first motor to said second driving system via said second planetary mechanism;

wherein a reduction ratio between said first planetary mechanism and said first driving system when the driving force of said first motor is transmitted to said first driving system via said first planetary mechanism and a reduction ratio between said second planetary mechanism and said second driving system when the driving force of said first motor is transmitted to said second driving system via said second planetary mechanism are different from each other.

55. A driving device as claimed in claim 54, wherein the reduction ratio between said first planetary mechanism and said first driving system is smaller than the reduction ratio between said second planetary mechanism and said second driving system, and wherein when voltage of power supply to the driving device is equal to or lower than a predetermined level, said switching mechanism causes the driving force of said first motor to be transmitted to said second driving system via said second planetary mechanism, and when the voltage is higher than said predetermined level, said switching mechanism causes the driving force of said first motor to be transmitted to said first driving system via said first planetary mechanism.

56. A driving device provided in an apparatus for driving a plurality of driving systems by means of motors as driving sources, comprising:

first and second motors;

first and second planetary mechanisms for transmitting a driving force of said first motor;

a first driving system disposed to have a driving force of said first motor transmitted thereto via said first planetary mechanism when said first motor rotates in a first direction;

a second driving system disposed to have the driving force of said first motor transmitted thereto via said first planetary mechanism when said first motor rotates in a second direction;

a third driving system disposed to have the driving force of said first motor transmitted thereto via said second planetary mechanism when said first motor rotates in said first direction;

a fourth driving system disposed to have the driving force of said first motor transmitted thereto via said second planetary mechanism when said first motor rotates in said second direction, said second driving system and said fourth driving system causing execution of a same operation of said apparatus; and a switching mechanism disposed to be driven by a driving force of said second motor, for switching between transmission of the driving force of said first motor to said second driving system via said first planetary mechanism, and transmission of the driving force of said first motor to said fourth driving system via said second planetary mechanism;

wherein a reduction ratio between said first planetary mechanism and said second driving system when the driving force of said first motor is transmitted to said second driving system via said first planetary mechanism and a reduction ratio between said second planetary mechanism and said fourth driving system when the driving force of said first motor is transmitted to said fourth driving system via said second planetary mechanism are different from each other.

57. A driving device as claimed in claim 56, wherein the reduction ratio between said first planetary mechanism and said second driving system is smaller than the reduction ratio between said second planetary mechanism and said fourth driving system, and wherein when voltage of power supply to the driving device is equal to or lower than a predetermined level, said switching mechanism causes the driving force of said first motor to be transmitted to said fourth driving system via said second planetary mechanism, and when the voltage is higher than said predetermined level, said switching mechanism causes the driving force of said first motor to be transmitted to said second driving system via said first planetary mechanism.

58. A driving device as claimed in claim 55, wherein said switching mechanism selectively switches between a first state in which said first planetary mechanism is permitted to be drivingly connected to said second driving system while said second planetary mechanism is inhibited from being connected to said fourth driving system, and a second state in which said second planetary mechanism is permitted to be drivingly connected to said fourth driving system while said first planetary mechanism is inhibited from being connected to said second driving system, and wherein in said first and second states, said first planetary mechanism is permitted to be drivingly connected to said first driving system.

59. A driving device as claimed in claim 58, wherein said switching mechanism selectively switches between a state in which said first planetary mechanism is permitted to be drivingly connected to said first driving system and said second driving system while said second planetary mechanism is inhibited from being connected to said third driving system and said fourth driving system, a state in which said first planetary mechanism is permitted to be drivingly connected to said first driving system and said second planetary mechanism is permitted to be drivingly connected to said fourth driving system while said first planetary mechanism is inhibited from being connected to said second driving system and said second planetary mechanism is inhibited from being connected to said third driving system, and a state in which said second planetary mechanism is permitted to be drivingly connected to said third driving system while said first planetary mechanism is inhibited from being connected to said first driving system.

60. A driving device as claimed in claim 54, including a sun gear member disposed to be driven by said first motor, and wherein said first and second planetary mechanisms are disposed to revolve around said sun gear member independently of each other.

61. A driving device as claimed in claim 54, wherein said second motor has a smaller output than said first motor.

62. A driving device as claimed in claim 54, wherein said second motor has a smaller size than said first motor.

63. A driving device as claimed in claim 54, wherein when said second motor rotates in a first direction, said switching mechanism is driven by a driving force of said second motor, for switching between transmission of the driving force of said first motor via said first planetary mechanism, and transmission of the driving force of said first motor via said second planetary mechanism, the driving device including a fifth driving system disposed to have the driving force of said second motor transmitted thereto when said second motor rotates in a second direction.

64. An apparatus having a driving device as claimed in claim 54.

65. A camera comprising:

first and second motors;

first and second planetary mechanisms for transmitting a driving force of said first motor;

a first film winding driving system for cause execution of a film winding operation via said first planetary mechanism;

a second film winding driving system for cause execution of a film winding operation via said second planetary mechanism; and a switching mechanism disposed to be driven by a driving force of said second motor, for switching between transmission of the driving force of said first motor to said first film winding system via said first planetary mechanism, and transmission of the driving force of said first motor to said second film winding driving system via said second planetary mechanism;

wherein a reduction ratio between said first planetary mechanism and said first film winding driving system when the driving force of said first motor is transmitted to said first film winding driving system via said first planetary mechanism and a reduction ratio between said second planetary mechanism and said second film winding driving system when the driving force of said first motor is transmitted to said second film winding driving system via said second planetary mechanism are different from each other.

66. A camera as claimed in claim 65, wherein the reduction ratio between said first planetary mechanism and said first film winding driving system is smaller than the reduction ratio between said second planetary mechanism and said second film winding driving system, and wherein when voltage of power supply to the camera is equal to or lower than a predetermined level, said switching mechanism causes the driving force of said first motor to be transmitted to said second film winding driving system via said second planetary mechanism, and when the voltage is higher than said predetermined level, said switching mechanism causes the driving force of said first motor to be transmitted to said first film winding driving system via said first planetary mechanism.

67. A camera for driving a plurality of driving systems by means of motors as driving sources, comprising:

first and second motors;

first and second planetary mechanisms for transmitting a driving force of said first motor;

a first driving system disposed to have a driving force of said first motor transmitted thereto via said first planetary mechanism when said first motor rotates in a first direction;

a second driving system disposed to have the driving force of said first motor transmitted thereto via said first planetary mechanism when said first motor rotates in a second direction;

a third driving system disposed to have the driving force of said first motor transmitted thereto via said second planetary mechanism when said first motor rotates in said first direction;

a fourth driving system disposed to have the driving force of said first motor transmitted thereto via said second planetary mechanism when said first motor rotates in said second direction; and a switching mechanism disposed to be driven by a driving force of said second motor, for switching between transmission of the driving force of said first motor to said second driving system via said first planetary mechanism, and transmission of the driving force of said first motor to said fourth driving system via said second planetary mechanism;

said second driving system and said fourth driving system causing execution of a film winding operation;

wherein a reduction ratio between said first planetary mechanism and said second driving system when the driving force of said first motor is transmitted to said second driving system via said first planetary mechanism and a reduction ratio between said second planetary mechanism and said fourth driving system when the driving force of said first motor is transmitted to said fourth driving system via said second planetary mechanism are different from each other.

68. A camera as claimed in claim 67, wherein the reduction ratio between said first planetary mechanism and said second driving system is smaller than the reduction ratio between said second planetary mechanism and said fourth driving system, and wherein when voltage of power supply to the driving device is equal to or lower than a predetermined level, said switching mechanism causes the driving force of said first motor to be transmitted to said fourth driving system via said second planetary mechanism, and when the voltage is higher than said predetermined level, said switching mechanism causes the driving force of said first motor to be transmitted to said second driving system via said first planetary mechanism.

69. A camera as claimed in claim 67, including a mirror disposed to advance into and recede from a photographic optical path, and a shutter, and wherein said first driving system comprises a driving system for driving said mirror for enabling finder observation when said mirror advances into the photographic optical path, and for driving charging of said shutter, and said third driving system comprises a film rewinding driving system.

70. A camera as claimed in claim 67, wherein said switching mechanism selectively switches between a first state in which said first planetary mechanism is permitted to be drivingly connected to said second driving system, and a second state in which said second planetary mechanism is permitted to be drivingly connected to said fourth driving system, and wherein in said first and second states, said first planetary mechanism is permitted to be drivingly connected to said first driving system.

71. A camera as claimed in claim 70, wherein said switching mechanism selectively switches between a state in which said first planetary mechanism is permitted to be drivingly connected to said first driving system and said second driving system while said second planetary mechanism is inhibited from being connected to said third driving system and said fourth driving system, a state in which said first planetary mechanism is permitted to be drivingly connected to said first driving system and said second planetary mechanism is permitted to be drivingly connected to said fourth driving system while said first planetary mechanism is inhibited from being connected to said second driving system and said second planetary mechanism is inhibited from being connected to said third driving system, and a state in which said second planetary mechanism is permitted to be drivingly connected to said third driving system while said first planetary mechanism is inhibited from being connected to said first driving system.

72. A camera as claimed in claim 65, including a sun gear member disposed to be driven by said first motor, and wherein said first and second planetary mechanisms are disposed to revolve around said sun gear member independently of each other.

73. A camera as claimed in claim 65, wherein said second motor has a smaller output than said first motor.

74. A driving device as claimed in claim 65, wherein said second motor has a smaller size than said first motor.

75. A camera as claimed in claim 65, wherein when said second motor rotates in a first direction, said switching mechanism is driven by a driving force of said second motor, for switching between transmission of the driving force of said first motor via said first planetary mechanism, and transmission of the driving force of said first motor via said second planetary mechanism, the camera including a fifth driving system disposed to have the driving force of said second motor transmitted thereto when said second motor rotates in a second direction.

76. A camera as claimed in claim 75, including an electronic flash device, and wherein said fifth driving system comprises a driving system for causing execution of an operation of driving said electronic flash device to project into a flash light emission enabled position.

* * * * *

UNITED STATES PATENT AND TRADEMARK OFFICE
CERTIFICATE OF CORRECTION

PATENT NO.    : 6,529,688 B2
DATED         : March 4, 2003
INVENTOR(S)   : Shoji Kaihara et al.

It is certified that error appears in the above-identified patent and that said Letters Patent is hereby corrected as shown below:

Column 9,
Line 34, delete "continues" and insert -- continuous --.

Column 14,
Line 14, delete "60" and insert -- 6O --.

Signed and Sealed this

Twenty-first Day of October, 2003

JAMES E. ROGAN
*Director of the United States Patent and Trademark Office*